(12) United States Patent
Di Trapani

(10) Patent No.: US 10,317,044 B2
(45) Date of Patent: Jun. 11, 2019

(54) ARTIFICIAL ILLUMINATION DEVICE COMPRISING LIGHT-EMITTER/COLLIMATOR PAIR ARRAY

(71) Applicant: CoeLux S.r.l., Como (IT)

(72) Inventor: Paolo Di Trapani, Cavallasca (IT)

(73) Assignee: CoeLux S.r.l., Como (IT)

( * ) Notice: Subject to any disclaimer, the term of this patent is extended or adjusted under 35 U.S.C. 154(b) by 0 days.

(21) Appl. No.: 15/724,419

(22) Filed: Oct. 4, 2017

(65) Prior Publication Data
US 2018/0259155 A1    Sep. 13, 2018

Related U.S. Application Data

(63) Continuation of application No. 14/711,554, filed on May 13, 2015, now Pat. No. 9,791,130, which is a
(Continued)

(51) Int. Cl.
*F21V 9/02* (2018.01)
*F21S 8/06* (2006.01)
(Continued)

(52) U.S. Cl.
CPC .................. *F21V 9/02* (2013.01); *F21S 8/06* (2013.01); *F21V 5/004* (2013.01); *F21V 5/007* (2013.01);
(Continued)

(58) Field of Classification Search
CPC . F21V 9/02; F21V 5/004; F21V 5/007; F21V 5/008; F21S 8/06; G02B 6/0046
See application file for complete search history.

(56) References Cited

U.S. PATENT DOCUMENTS 3,302,016 A    1/1967  Larraburu
7,575,358 B2   8/2009  Suzuki et al.
(Continued)

FOREIGN PATENT DOCUMENTS

CN    102341641 A    2/2012
EP      1744197 A2   1/2007
(Continued)

OTHER PUBLICATIONS

Notice of Allowance, counterpart Korean Patent Application No. 10-2015-7014394, dated Aug. 29, 2017, 3 pages total (including English translation of 1 page).
(Continued)

*Primary Examiner* — Alan B Cariaso
(74) *Attorney, Agent, or Firm* — DiBerardino McGovern IP Group LLC

(57) ABSTRACT

An artificial illumination device for generating natural light similar to that from the sun and the sky comprises a direct-light source comprising a first emitting surface and configured to produce, from primary light, direct light exiting the first emitting surface into a direct-light direction at low divergence, the direct-light source comprising a plurality of pairs of a first light-emitting device positioned upstream the first emitting surface and configured to emit the primary light and a collimator configured to collimate the primary light emitted by the first light-emitting device along the direct-light direction; and a diffused-light generator configured to cause diffused light at a second emitting surface. Both co-operate to form outer light at the outer emitting surface comprising a first light component propagating within a low divergence cone along the direct light direction and a second light component propagating along directions outside the low divergence cone wherein the first light component has a correlated color temperature lower
(Continued)

than a CCT of the second light component so that an observer sees, when looking towards the first emitting surface, a bright spot surrounded by a bluish background which mimics the sky.

19 Claims, 31 Drawing Sheets

Related U.S. Application Data continuation of application No. PCT/EP2013/073893, filed on Nov. 14, 2013, and a continuation of application No. PCT/EP2012/072648, filed on Nov. 14, 2012.

(51) Int. Cl.
| | | |
|---|---|---|
| *F21V 5/00* | (2018.01) | |
| *F21V 8/00* | (2006.01) | |
| *F21W 121/00* | (2006.01) | |
| *F21Y 105/10* | (2016.01) | |
| *F21Y 115/10* | (2016.01) | |

(52) U.S. Cl.
CPC ............ *F21V 5/008* (2013.01); *G02B 6/0046* (2013.01); *F21W 2121/00* (2013.01); *F21Y 2105/10* (2016.08); *F21Y 2115/10* (2016.08)

(56) References Cited

U.S. PATENT DOCUMENTS

| | | | |
|---|---|---|---|
| 8,068,285 | B1 | 11/2011 | Flynn |
| 8,469,550 | B2 | 6/2013 | Di Trapani et al. |
| 9,022,589 | B2 | 5/2015 | Minami |
| 9,476,567 | B2 | 10/2016 | Seuntiens et al. |
| 9,791,130 | B2* | 10/2017 | Di Trapani ............... F21V 9/02 |
| 2005/0051706 | A1 | 3/2005 | Witney et al. |
| 2006/0228070 | A1* | 10/2006 | Davis ................. G02B 6/29311 |
| | | | 385/16 |
| 2009/0284685 | A1 | 11/2009 | Yamaguchi |
| 2010/0061090 | A1 | 3/2010 | Bergman et al. |
| 2010/0118540 | A1 | 5/2010 | Destain et al. |
| 2010/0322275 | A1 | 12/2010 | Ishii et al. |
| 2011/0194270 | A1 | 8/2011 | Di Trapani et al. |
| 2011/0241549 | A1* | 10/2011 | Wootton ................. F21S 8/006 |
| | | | 315/117 |
| 2012/0014085 | A1 | 1/2012 | Minami |
| 2012/0206050 | A1* | 8/2012 | Spero ...................... B60Q 1/04 |
| | | | 315/152 |
| 2013/0003341 | A1 | 1/2013 | Kubo et al. |
| 2014/0133125 | A1 | 5/2014 | Di Trapani et al. |
| 2015/0109773 | A1 | 4/2015 | Li et al. |
| 2015/0184812 | A1 | 7/2015 | Van Bommel et al. |
| 2015/0316231 | A1 | 11/2015 | Di Trapani |
| 2015/0330607 | A1* | 11/2015 | Di Trapani ........ G02B 19/0066 |
| | | | 362/608 |
| 2016/0363777 | A1 | 12/2016 | Flynn et al. |
| 2017/0051893 | A1 | 2/2017 | Di Trapani |
| 2017/0074486 | A1 | 3/2017 | Flynn et al. |

FOREIGN PATENT DOCUMENTS

| | | | |
|---|---|---|---|
| EP | 2442015 | A1 | 4/2012 |
| EP | 2549178 | A1 | 1/2013 |
| GB | 2450192 | C | 12/2008 |
| JP | 2002184206 | A | 6/2002 |
| JP | 2006228589 | A | 8/2006 |
| JP | 2010067441 | A | 3/2010 |
| JP | 2012059584 | A | 3/2012 |
| WO | 2007123134 | A1 | 11/2007 |
| WO | 2008096545 | A1 | 8/2008 |
| WO | 2009156347 | A1 | 12/2009 |
| WO | 2009156348 | A1 | 12/2009 |
| WO | 2010122468 | A1 | 10/2010 |
| WO | 2011115030 | A1 | 9/2011 |
| WO | 2012091975 | A1 | 7/2012 |
| WO | 2012140579 | A2 | 10/2012 |
| WO | 2014076217 | A1 | 5/2014 |
| WO | 2014076218 | A1 | 5/2014 |

OTHER PUBLICATIONS

Office Action issued by the State Intellectual Property Office (SIPO) in counterpart Chinese Patent Application No. 201280078131.0, dated Oct. 10, 2016, 5 pages.

Examination Second Division, Office Action in counterpart Japanese Patent Application No. 2015-542172, dated Aug. 23, 2016, 20 pages total (including English translation of 10 pages).

International Search Report, issued by A. Jacobs, International Patent Application No. PCT/EP2013/073893, dated Jan. 27, 2014, 7 pages.

Written Opinion, issued by A. Jacobs, International Patent Application No. PCT/EP2013/073893, dated Jan. 27, 2014, 8 pages.

International Preliminary Report on Patentability, issued by Agnes Wittmann-Regis, International Patent Application No. PCT/EP2013/073893, dated May 28, 2015, 9 pages.

International Search Report, issued by A. Jacobs, International Patent Application No. PCT/EP2012/072648, dated May 23, 2013, 5 pages.

Written Opinion, issued by A. Jacobs, International Patent Application No. PCT/EP2012/072648, dated May 23, 2013, 5 pages.

International Preliminary Report on Patentability, issued by A. Jacobs, International Patent Application No. PCT/EP2012/072648, dated May 23, 2013, 11 pages.

First Office Action, counterpart Chinese Application No. 201710331362.2, dated Mar. 4, 2019, 5 pages total.

* cited by examiner

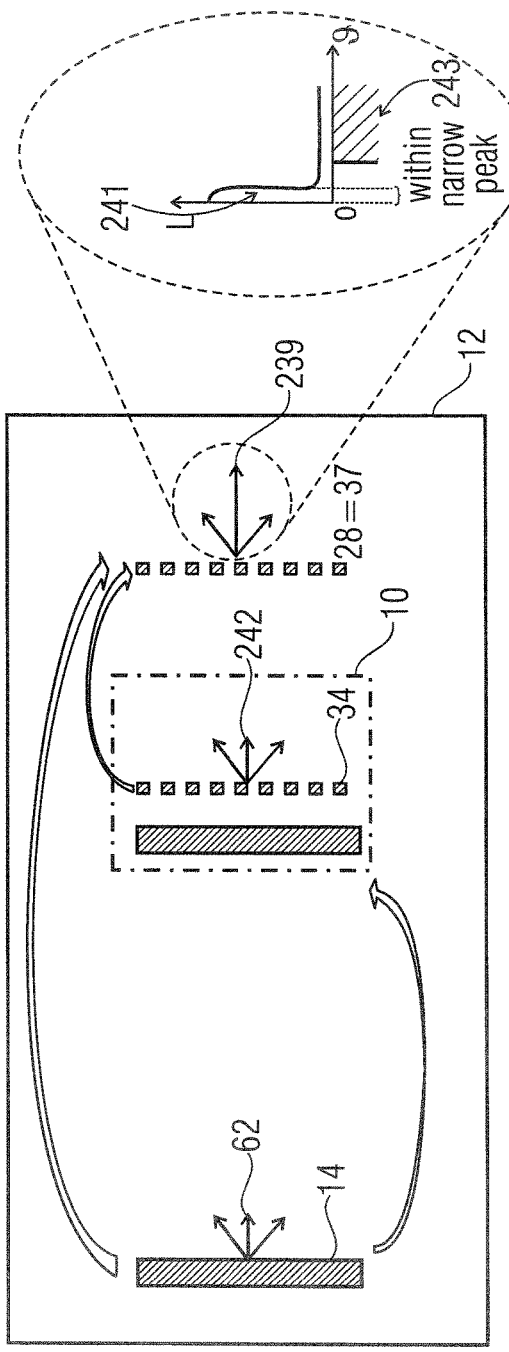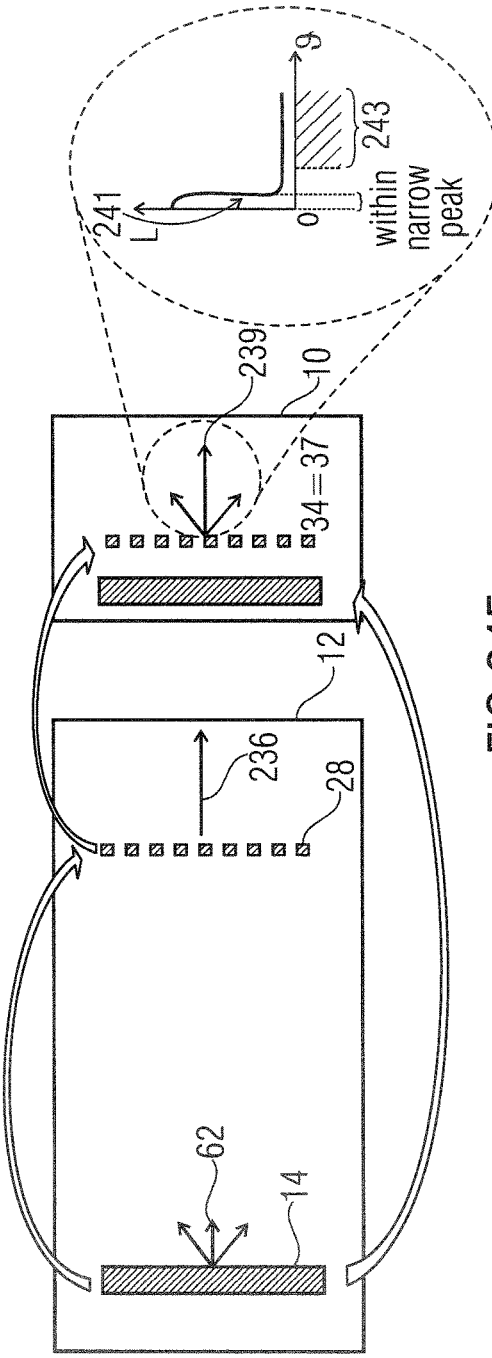

ARTIFICIAL ILLUMINATION DEVICE COMPRISING LIGHT-EMITTER/COLLIMATOR PAIR ARRAY

CROSS-REFERENCE TO RELATED APPLICATIONS

This application is a continuation of U.S. application Ser. No. 14/711,554, filed May 13, 2015, which is a continuation of International Application No. PCT/EP2013/073893, filed Nov. 14, 2013, and additionally claims priority from International Application No. PCT/EP2012/072648, filed Nov. 14, 2012. All three applications are incorporated herein by reference in their entirety.

BACKGROUND OF THE INVENTION

The present invention is concerned with artificial illumination devices which realize the perception of the natural light from the sun and the sky.

More precisely, the perception of the natural light from the sky and the sun is related both to the capacity of the illumination device to illuminate an ambient with effects very similar to the effects that would manifest in the same room if an aperture with sky and sun beyond it, i.e. a window, would be positioned at the same place, and also to the appearance of the device itself when directly viewing at it, which creates the visual appearance of infinite depth for the sky and infinite position of the sun sources.

Therefore the aims which the embodiments of the present invention fulfill may be divided into two main categories, related to
- the illumination of an ambient by the light emitted by the artificial illumination device;
- the visual appearance of the illumination device itself.

For the requirement concerning the illumination of an ambient for the perception of natural light from sky and sun, reference can be made to artificial illumination devices described in WO 2009/156347 A1 submitted by the same Applicant. One of these artificial illumination devices, for example, is shown in FIG. 25. Same comprises a broadband, spot like, light source 902 and a Rayleigh scattering panel 906 placed at a certain distance from the source 902. The panel 906 separates the light rays from the source 902 into a transmitted component 907 with Correlated Color Temperature (CCT) lower than that of the source 902, and into a diffused component 905 with higher CCT, the difference in CCT being due to the fact that the scattering efficiency increases with the inverse of the fourth power of the wavelength in the addressed Rayleigh regime.

As long as the light source 902 is small in comparison to the panel 906, the direct light 907 is able to cast object shadows, which are bluish under the diffused cold light caused by the panel 906. More precisely, the angle of penumbra is here given by the ratio of the source's 902 size and the source-object distance. Notably, this angle can be easily made similar to that from the real sun (0.5°) in real installations. Moreover, the observer who sees the source through the panel perceives it as a bright spot of low CCT, surrounded by a luminous background of high CCT, as it occurs when he/she observes the sun and the sky.

However, in spite of the small angle of penumbra, the rays 907 forming the direct light component are by far not parallel, as light is from natural illumination by the sun, since they all diverge from the single source. Notably, this circumstance prevents object shadows from having parallel orientations, as it occurs in the case of the natural sun. In fact each object casts onto an illuminated plane a shadow which is oriented toward the projection of the source 902 onto said illuminated plane. For example, in the typical case where the light source 902 is positioned along the normal of the illuminated plane (e.g. a floor or a wall) passing through the center of the diffuser 906, shadows of elongated objects with axis perpendicular to said plane are oriented toward the center of the illuminated scene, contrary to what occurs in nature. This fact thus prevents these illumination devices from faithfully achieving the visual characteristics of an ambient illuminated by natural light.

Moreover, these devices do not properly satisfy the requirements concerning the visual appearance of the illumination device itself when directly viewing at it. In fact, an observer who sees the source through the panel 906 does not see it at infinity, but at the given spatial position at which the light source 902 is positioned. The divergence of the direct-light rays 907 implies that neither the direction under which the spot of the artificial sun is seen nor the aperture angle (penumbra) is fixed, but they depend on the observer's position and on his/her distance from the source. Such visual cues prevent the observer to naturally interpret the light source as located at infinite distance, i.e. the visual cues prevents the sky and sun scene from being perceived as having infinite depth, the source itself defining the limit depth of the scene. All these circumstances make the resulting effect not natural, in the sense that it differs from the effect produced by the actual sky and sun. A prevailing infinite depth perception of the sun and sky images generated by the illumination device when viewing directly at it is thus one of the aims concerning the visual appearance of the present invention.

The presence of intra-conflicts in the visual perception cues afflicts for example a further artificial illumination device presented in the above mentioned WO 2009/156347 A1, shown in FIG. 26. In this layout the light source 902 is made of an extended array of white light light-emitting diodes (LEDs) 910, with each single LED 910 comprising a blue/UV emitter, a phosphor and a collimating dome lens so that each LED 910 generates a white light cone with limited divergence, i.e. with a divergence smaller than the divergence of the light scattered by the Rayleigh panel 906. In this case, the Rayleigh panel 906 is positioned almost in contact with the extended light source 902 which allows for the illumination device to be very compact. The illumination device of FIG. 26 thus provides direct and diffused light components with the necessitated CCTs.

However, as will be further described in the following, such illumination device depicted in FIG. 26 features an intra-conflict between two different planes perceived by an observer. These planes are the real image of the LED 910 array and the virtual image of the sun spot at infinity.

Another artificial illumination device presented in the above mentioned WO 2009/156347 A1, is shown in FIG. 27. As an optical collimation element, a lens 980 is positioned at a certain distance from the light source exemplarily constituted as a laser diode 982 and a (remote) phosphor 984. The lens 980, which also contains a nanodiffuser, is antireflection coated in order to optimize transmission of the "warm" component of the radiation preventing reflections which could reduce the efficiency of the device and direct part of this component to the outer area (the outer portion of the beam), reducing the contrast. Furthermore, the device of FIG. 27 comprises a reflector 986 (e.g. reflecting chamber or reflecting box housing the phosphor source 984 and having an aperture where the lens 980 is positioned) so as to retrieve the backward traveling "cold" diffused-light component back-scattered by the nanodiffusing particles, thereby redirecting the back-scattered diffused light outward. The illumination device of FIG. 27 thus provides direct and diffused light components with the necessitated CCTs.

However, such illumination device depicted in FIG. 27 features an intra-conflict between at least two different planes perceived by an observer. These planes are those of the real image of the lens 980 and the virtual image of the phosphor source 984, wherein said virtual-image plane is not even perceived at infinite distance, as for the case of the device in FIG. 26. In addition, similarly to the case of FIG. 25, the device in FIG. 27 casts shadows featured by typical radially symmetric outwardly pointing behavior resulting from an illumination using a single light source at a limited distance.

A further artificial illumination device presented in the aforementioned WO pamphlet is shown in FIG. 28. Here, a light source 990 and the chromatic diffuser 992 are totally separated and spaced apart from each other with the chromatic diffuser forming a window of a wall 994 of a house 996. However, due to the arrangement chosen, shadows cast by the device of FIG. 28 show the typical radially symmetric outwardly pointing behavior resulting from an illumination using a single light source at a limited distance. Last but not least, the ambient light which enters the observer's eyes from the chromatic diffuser without stemming from light source 990, but from ambient light, i.e. from the environment external to the house, spoils the sky/sun impression of the observer.

Accordingly, it is an object of the present invention to provide an artificial illumination device for synthesizing natural light to illuminate an ambient as the actual sky and sun do, in particular by forming shadows that are parallel, sharp and more bluish than the rest of illuminated scene, and to make an observer experience an infinite visual depth perception of a sky and sun image when he/she directly looks at said artificial illumination device, without inter- and intra-conflicts among visual perception cues.

SUMMARY

According to an embodiment, an artificial illumination device for generating natural light similar to that from the sun and the sky with making an observer experience a visual infinite depth perception of a sky and sun image when an observer directly looks at said artificial illumination device may have: a direct-light source having a first emitting surface and configured to produce, from a primary light, a direct light that exits the first emitting surface into a direct-light direction at low divergence, the direct-light source having a plurality of pairs of a first light-emitting device positioned upstream the first emitting surface and configured to emit the primary light and a collimator configured to collimate the primary light emitted by the first light-emitting device along the direct-light direction; and a diffused-light generator configured to cause diffused light at a second emitting surface, wherein one of the first emitting surface and the second emitting surface is positioned downstream with respect to the other and forms an outer emitting surface of the artificial illumination device or both the first emitting surface and the second emitting surface coincide to form the outer emitting surface of the artificial illumination device, wherein the artificial illumination device is configured such that the direct-light source and the diffused-light generator co-operate to form outer light at the outer emitting surface which has a first light component which propagates within a low divergence cone along the direct light direction and a second light component which propagates along directions outside the low divergence cone wherein the first light component has a correlated color temperature which is lower than a CCT of the second light component so that an observer sees, when looking towards the first emitting surface, a bright spot surrounded by a bluish background which mimics the sky, the bright spot having lower CCT, corresponding to the sun and moving, when the observer moves relatively to the first emitting surface as if the bright spot stemmed from an object positioned at infinity.

According to another embodiment, a system may be made up by a juxtaposition of a plurality of the artificial illumination devices as mentioned above so that the direct light direction is equal for the plurality of the artificial illumination devices.

According to still another embodiment, a method for generating natural light similar to that from the sun and the sky may use a direct-light source and a diffused-light generator, wherein the direct-light source has a first emitting surface and configured to produce, from a primary light, a direct light that exits the first emitting surface into a direct-light direction at low divergence, the direct-light source having a plurality of pairs of a first light-emitting device positioned upstream the first emitting surface and configured to emit the primary light and a collimator configured to collimate the primary light emitted by the first light-emitting device along the direct-light direction, wherein the diffused-light generator is configured to cause diffused light at a second emitting surface, wherein one of the first emitting surface and the second emitting surface is positioned downstream with respect to the other and forms an outer emitting surface or both the first emitting surface and the second emitting surface coincide to form the outer emitting surface, wherein the direct-light source and the diffused-light generator co-operate to form outer light at the outer emitting surface which has a first light component which propagates within a low divergence cone along the direct light direction and a second light component which propagates along directions outside the low divergence cone wherein the first light component has a correlated color temperature which is lower than a CCT of the second light component so that an observer sees, when looking towards the first emitting surface, a bright spot surrounded by a bluish background which mimics the sky, the bright spot having lower CCT, corresponding to the sun and moving, when the observer moves relative to the first emitting surface, relative to the first emitting surface as if the bright spot stemmed from an object positioned at infinity.

According to some embodiments, an artificial illumination device generates natural light similar to that from the sun and the sky. The artificial illumination device includes a direct-light source having a first emitting surface and configured to produce, from a primary light, a direct light that exits the first emitting surface into a direct-light direction at low divergence. The direct-light source includes a plurality of pairs of a first light-emitting devices positioned upstream of the first emitting surface and configured to emit the primary light. The direct-light source also includes a collimator configured to collimate the primary light emitted by the first light-emitting device along the direct-light direction. The artificial illumination device also includes a diffused-light generator configured to cause or produce diffused light at a second emitting surface. One of the first emitting surface and the second emitting surface is positioned downstream with respect to the other and forms an outer emitting surface of the artificial illumination device, or both the first emitting surface and the second emitting surface coincide to form the outer emitting surface of the artificial illumination device. The artificial illumination device is configured such that the direct-light source and the diffused-light generator co-operate to form outer light at the outer emitting surface, which comprises a first light component, which propagates within a low divergence cone along the direct light direction and a second light component, which propagates along directions outside the low divergence cone. The first light component has a correlated color temperature (CCT) that is lower than a CCT of the second light component so that an observer sees, when looking towards the first emitting surface, a bright spot surrounded by a bluish background which mimics the sky. The bright spot has a lower CCT, and corresponds to the sun and is moving, when the observer moves relative to the first emitting surface as if the bright spot stemmed from an object positioned at infinity.

Implementations can include one or more of the following features. For example, the diffused light can have a CCT that is higher than a CCT of the direct light. The direct light can have a CCT that is greater than or equal to the CCT of the first light component. The diffused-light generator can include a diffused-light source that includes a second light-emitting device, where the diffused-light source is configured to emit the diffused light independently from the direct-light source. The diffused-light source can include an edge-illuminated scattering diffuser or an OLED. A CCT of at least one of the direct-light source or the diffused-light source can be controllable.

The diffused-light generator can include a diffuser positioned so as to be lit by the direct-light or the primary light or an intermediate light evolving from the primary light and resulting in the direct-light, and configured to scatter the direct-light or the primary light or the intermediate light by which the diffuser is lit, with a scattering efficiency that is higher for shorter wavelengths within the visible wavelength region than compared to longer wavelengths. The diffuser can include a solid matrix of a first material having a dispersion of nanoparticles of a second material configured to obtain a light-scattering efficiency that is higher for shorter wavelengths within the visible wavelength region than compared to longer wavelengths. The dispersion of nanoparticles features a gradient in the nanoparticle area concentration across a second emitting surface, the gradient being tailored for improving a luminance uniformity of the diffused light over the second emitting surface relative to a uniformity of an illuminance of the direct-light or the primary light or the intermediate light by which the diffused-light generator is lit.

The direct-light source can be configured such that the narrow peak in the angular distribution forces the two eyes of an observer looking at the direct-light source to be aligned along parallel directions so that the observer sees the bright spot under a narrow visual cone angle, the spot being perceived at infinite distance both with respect to binocular-convergence and motion-parallax depth cues.

The artificial illumination device can include an absorber upstream from the first emitting surface and made of light-absorbing material arranged so that the first emitting surface has a total reflectance factor $\eta_r$ less than or equal to 0.4.

The artificial illumination device can include an absorber made of light-absorbing material positioned downstream from the first light-emitting device and upstream from the first emitting surface and configured to substantially absorb light rays that cross the first emitting surface in an upstream direction and that, in the absence of the absorber would not be directed toward the first light-emitting device.

The diffused-light generator can be positioned downstream from the first emitting surface. The direct-light source can be configured to produce the direct light such that the direct light exits the first emitting surface with a luminance profile that has a narrow peak in the angular distribution around the direct-light direction, the narrow peak being subtended by a solid angle smaller than 0.2 steradians (sr).

The plurality of pairs can be positioned in juxtaposition with the collimators of the pairs abutting each other so that the collimators form a joint surface. For each pair, a collimators' aperture can be greater than 300 cm$^2$.

The artificial illumination device can include a coffered ceiling structure positioned downstream of the outer emitting surface, wherein the coffered ceiling structure has a first periodicity that is an integer multiple or unit fraction of a second periodicity at which the pairs of the plurality of pairs are arranged along the outer emitting surface. The direct-light direction can be oblique to a normal of the outer emitting surface. The direct light direction can be oblique with respect to more than 90% of the outer surface of the coffered ceiling structure. An outer surface of the coffered ceiling structure can have an absorption coefficient for visible light less than 50%. A projection of the coffered ceiling structure onto the first emitting surface along the direct-light direction can cover less than 50% of an area spanned by the first emitting surface. The coffered ceiling structure can protrude, perpendicular to the first emitting surface, by less than a period length of the coffered ceiling structure from the first emitting surface.

The artificial illumination device can include a dark box having a top face coinciding an aperture of the collimators and a bottom face into apertures of which the first light-emitting devices are integrated. An internal surface of the dark box can be formed by a light-absorbing material and the light-absorbing material can have an absorption coefficient for visible light greater than 90%.

The collimator can be a Fresnel lens. The first light-emitting device can include an LED.

The artificial illumination device can include a freeform concentrator or a freeform lens configured to flatten an illuminance distribution of the primary light onto the collimator. A freeform lens can be positioned between the first light-emitting device and the collimator, the freeform lens being configured to flatten an illuminance distribution of the primary light onto the collimator.

The first light-emitting device can have a circular aperture.

The direct-light source can include a micro-optics beam-homogenizer layer positioned downstream the pairs' collimators, wherein the micro-optics beam-homogenizer layer is configured to reduce a stray light component of light pre-collimated by the pairs' collimators. The micro-optics beam-homogenizer layer can include a 2-dimensional array of microlenses and a light-absorbing layer perforated by a 2-dimensional array of pinholes positioned and extending downstream the 2-dimensional array of microlenses so that each microlens has a pinhole associated therewith that is positioned at a distance to the respective microlens corresponding to a focal length of the respective microlens and at a direction coincident with the direct light direction. The ratio between a diameter $D_m$ and a focal length $f_m$ of the microlenses can be $D_m/f_m<2)\tan(7.5°)$, and the diameter can be $D_m<5$ mm.

The microlenses can have a circular aperture.

The micro-optics beam-homogenizer layer can include a channel separation structure configured to reduce cross-talk between neighboring pairs of microlenses and the associated pinholes.

Space between the microlenses can include a material that absorbs light impinging onto the space between the lenses. A pitch of the arrays of microlenses and pinholes can be below 5 mm.

The micro-optics beam-homogenizer layer can include a 2-dimensional array of microlenses and a channel separation structure of a 2-dimensional array of micro-channels extending downstream the 2-dimensional array of microlenses so that each microlens has a micro-channel associated therewith, which extends, from the respective microlens, into the direct-light direction. A ratio between a diameter $D_m$ of the microlenses and a focal length $f_m$ of the microlenses can be $D_m/f_m<2\cdot\tan(7.5°)$, wherein $D_m<5$ mm, and wherein for each microlens, an output aperture of the associated micro-channel is spaced apart from the respective microlens, at a distance l with $0.5\ f_m<l<1.2\ f_m$.

The micro-optics beam-homogenizer layer can include a first 2-dimensional array of microlenses of focal length $f_{m1}$, a second 2-dimensional array of microlenses of focal length $f_{m2}$, and an absorbing layer perforated by an array of pinholes arranged between the first and second arrays of micro lenses so as to form an array of telescopes distributed over a plane parallel to a plane of the first emitting surface and having their telescope axis parallel to each other and parallel to the direct light direction. In each telescope, the respective pinhole, the respective microlens of the first 2-dimensional array and the respective microlens of the second 2-dimensional array can be arranged along the telescope axis with a distance between the respective pinhole and the respective microlens of the first 2-dimensional array being $f_{m1}$, and a distance between the respective pinhole and the respective microlens of the second 2-dimensional array being $f_{m2}$, wherein $f_{m2}<\gamma\ f_{m1}$, for $\gamma<1$.

A downstream-facing outer surface of the array of telescopes can include an anti-reflection coating.

The micro-optics beam-homogenizer layer can include a 2-dimensional tandem lens array.

The artificial illumination device can include a low-angle white-light diffuser configured to subject an angular characteristic of a luminance profile at which the direct light exits the first emitting surface to blur filtering with a filter impulse response HWHM of lower than 10° degrees. The low-angle white-light diffuser can include a random distribution of micro-refractors formed in an outer surface of a transparent-layer material, or a dispersion of transparent micro-particles in a transparent bulk material with a refractive-index mismatch between the transparent micro particles and the transparent bulk material.

A downstream-facing outer surface of the pairs' collimators can include an anti-reflection coating. The direct-light source can include an angularly selective filter configured to absorb light divergent relative to the direct-light direction by more than a predetermined threshold.

In some embodiments, a system can be made-up by a juxtaposition of a plurality of the artificial illumination devices in accordance with the above description so that the direct light direction is equal for the plurality of the artificial illumination devices.

In some embodiments, a method is performed for generating natural light similar to that from the sun and the sky, using a direct-light source; and a diffused-light generator. The direct-light source can include a first emitting surface and be configured to produce, from a primary light, a direct light that exits the first emitting surface into a direct-light direction at low divergence, the direct-light source including a plurality of pairs of a first light-emitting devices positioned upstream from the first emitting surface and configured to emit the primary light and a collimator configured to collimate the primary light emitted by the first light-emitting device along the direct-light direction. The diffused-light generator can be configured to cause or produce diffused light at a second emitting surface. One of the first emitting surface and the second emitting surface can be positioned downstream with respect to the other and forms an outer emitting surface or both the first emitting surface and the second emitting surface coincide to form the outer emitting surface. The direct-light source and the diffused-light generator can co-operate to form outer light at the outer emitting surface that includes a first light component that propagates within a low divergence cone along the direct light direction and a second light component that propagates along directions outside the low divergence cone. The first light component can have a correlated color temperature (CCT) that is lower than a CCT of the second light component so that an observer sees, when looking towards the first emitting surface, a bright spot surrounded by a bluish background that mimics the sky, the bright spot having a lower CCT, corresponding to the sun, and moving, when the observer moves relative to the first emitting surface, relative to the first emitting surface as if the bright spot stemmed from an object positioned at infinity.

BRIEF DESCRIPTION OF THE DRAWINGS

Embodiments of the present invention are described below with respect to the figures, among which:

FIG. 14b shows a view onto the upstream face of the beam-homogenizer layer of FIG. 14a;

FIG. 14c shows the view onto the downstream face of the beam-homogenizer layer of FIG. 14a;

FIG. 24a-f schematically show artificial illumination devices and the direct-light source thereof according to different embodiments in generic terms with focus onto the interrelationship between direct and diffused light and their contribution to the outer light at the outer emitting surface;

DETAILED DESCRIPTION OF THE INVENTION

Figure 1:
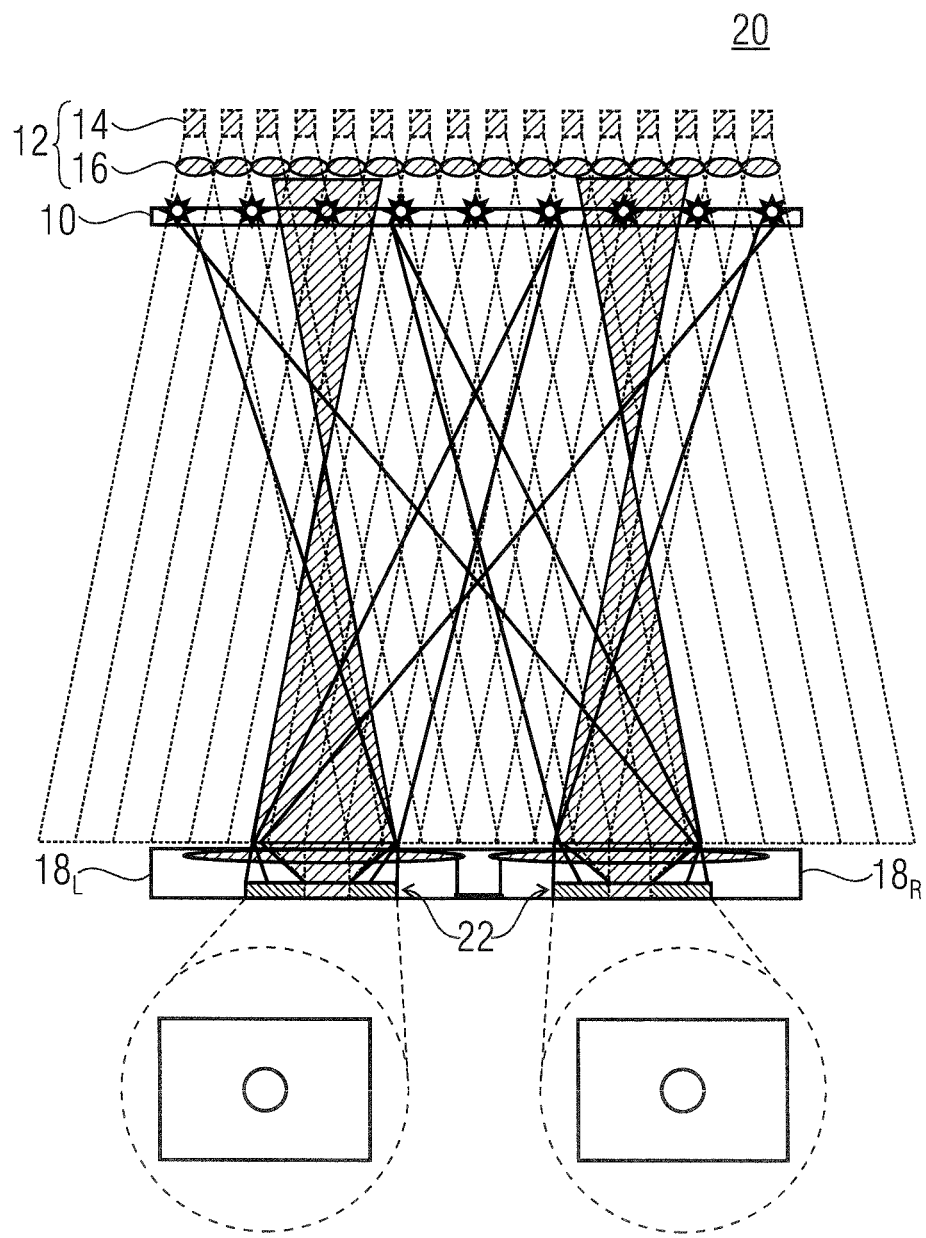
FIG. 1 schematically shows an array of pairs of first light-emitting devices and collimating lenses as an example for a direct-light source, combined with a diffused-light generator, wherein observer's eyes are shown as looking onto the artificial illumination device thus obtained.

As already introduced, the perception of natural illumination from sky and sun relies on the one side on the light emitted by the illumination device, which should feature a direct-light component highly collimated with low CCT, mimicking the light from the sun, and a higher CCT diffused-light component, mimicking the illumination effect of the sky, such that the direct-light component is able to cast sharp parallel shadows of the objects illuminated by the illumination device and the diffused-light component gives a bluish color to such shadows. On the other side, the perception of natural illumination from sky and sun relies on the perception of infinite depth of the sky and sun images when directly viewing at the illumination device itself.

The capability of an observer to evaluate the distance of objects, and therefore the depth of the views that constitute a three-dimensional scenery, is based on multiple physiological and psychological mechanisms connected to focusing, binocular disparity and convergence, motion parallax, luminance, size, contrast, aerial perspective, etc. Some mechanisms may gain significance compared to the others according to both the observing conditions (e.g, whether the observer is moving or still, watching with one or two eyes, etc.) as well as the characteristics of the scenery, these latter depending, for example, on whether objects with known size, distance or luminance are present, serving as a reference to evaluate how distant the observed element of the scenery is. Notably, these mechanisms hold both in the case of real images and of virtual images. More specifically, visual discomfort or eye strain may arise when conflicts exist between two or more different image planes simultaneously perceived at different depths by an observer because of one single visual perception cue, or two or more competing different high-level visual perception cues.

In other words, the inventors noticed indeed that the visual perception of depth is determined by a series of visual cues such as:

Accommodation, i.e. the movement of ciliary muscles to adapt the eye lens to focus a scene; accommodation is most effective for distances of a few meters;

Binocular convergence, i.e. the fact that the axis of two eye balls of an observer converge onto the same object, i.e. converge onto the plane where the object is positioned.

Motion parallax, i.e. the apparent relative motion of objects against a background seen by a moving observer; strong cues to depth from motion parallax can be obtained even from only very slight body sway;

Aerial perspective, i.e. the fact that objects at a great distance away have lower luminance contrast and color saturation due to light scattering by the atmosphere. Moreover, the colors of distant objects are shifted toward the blue end of the spectrum;

Binocular disparity, i.e. the fact that each eye of an observer registers its own image of the same scene; by using such two different images seen from slightly different angles, the observer is able to triangulate the distance to an object with a high degree of accuracy.

Autostereograms, 3D movies and stereoscopic photos employ this visual perception cue to obtain depth perception of a bi-dimensional scene;

Depth from motion, i.e. the dynamical change of object size;

Perspective, i.e. the property of parallel lines converging at infinity;

Relative size between known objects;

Occlusion of objects by others.

It has been found out that the infinite depth perception of sky and sun images, which represents one of the requirements for the illumination device to appear as the actual sky and sun do in nature, is realized when it is coherently supported in particular by the synergistic action of binocular convergence, motion parallax and accommodation visual depth perception cues, i.e. no conflict exists between these above mentioned visual perception cues. Aerial perspective gives also a further contribution in the perception of an infinite depth of sky and sun image.

The inventors also noticed that visual perception conflicts may arise for two main reasons:

ambiguity between two or more different depth planes depending on one single visual perception cue, which will be called intra-conflict;

conflict between information deriving from different visual perception cues, which will be called inter-conflict.

The absence of intra- and inter-conflicts between visual depth perception cues is fundamental in order to induce a natural perception of infinity depth of both sun and sky. Furthermore avoiding the lack of congruence among cues prevents from eye strain and discomfort, while increases viewing comfort.

Figure 26:
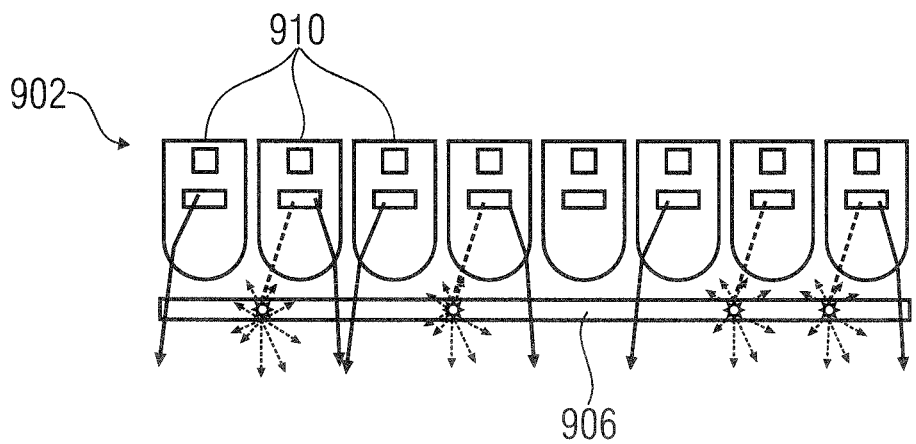
FIG. 26 schematically show a further known artificial illumination device.

For example, reference is made to the already mentioned artificial illumination device shown in FIG. 26. In particular, when directly viewing at the light source 902, two competing images are simultaneously perceived by an observer. The first image, owing to the inherent transparency of the Rayleigh panel, is the real image of the LED array, the finite distance of which is supported in particular by accommodation and binocular convergence onto the LED array plane, and motion parallax. The second image is the virtual image of a bright spot surrounded by a bluish background, which is perceived at infinity. This second image is given by the fact that, as long as each LED 910 shines a circular symmetric light cone having divergence and orientation identical to those of all other LEDs, the group of LEDs 910 seen by each eye form a circular spot at the retina of the eyes of the observer. In other words, the LEDs 910 are seen under a cone with a fixed direction being given by the LED alignment direction which is, in the case of FIG. 26, perpendicular to the panel 906, and with fixed angular aperture which coincides with the LED divergence cone angle. Notably, each of the observer's eyes sees its own group of illuminated LEDs 910 under the given direction and cone angle. These bright spots are perceived by binocular convergence at infinite distance, this being the setting which produces identical and equally centered images of such round spots on the retinas, as normal vision necessitates. The size of this bright spot depends on the angular divergence of the light emitted by each single LED element 910.

Since the light source 902 does not contain any mechanism which prevents the first image plane, i.e. the plane of the real image of the array of LEDs 910, to be seen by an observer who directly looks at the light source 902, a visual perception conflict arises between the two above mentioned images perceived at different planes. This conflict, which for example may be explained as an intra-conflict determined by binocular convergence, thus prevents the observer to perceive the appearance of natural sky and sun. Notably, such perception conflict makes the device in FIG. 26 unfit for solving the technical problem at the base of the present invention. In other terms, the conflict arises because the observer sees the warm, direct-light component not only from the round bright spot, but also from the entire LED array. In fact, even if most of the light from the LEDs is shined inside their divergence cone, a non-negligible portion is still shined outside of it (e.g. because of the scattering occurring inside the dome-LED device 910, and because of the fact that the dome lens is by far not an imaging optical component), which makes an illuminated LED clearly visible as a luminous object from almost any angle of observation.

The background light produced by the LEDs at large angles, i.e. outside the LED divergence cone, is by far not uniform and follows the LED pitch periodicity. Such absence of uniformity is interpreted by the inventors as the main reason which makes the first image of the LED array at finite distance to prevail onto the second image of the bright spot at infinite distance, even in the case where the average luminance due to LED at large angle is much lower with respect to the bright spot, and even if it is weaker with respect to the uniform luminance of the diffused-light generator, too. In fact, the human eye is made to be very sensitive to luminance spatial gradients, and particularly to luminance spatial periodic modulations.

Figure 25:
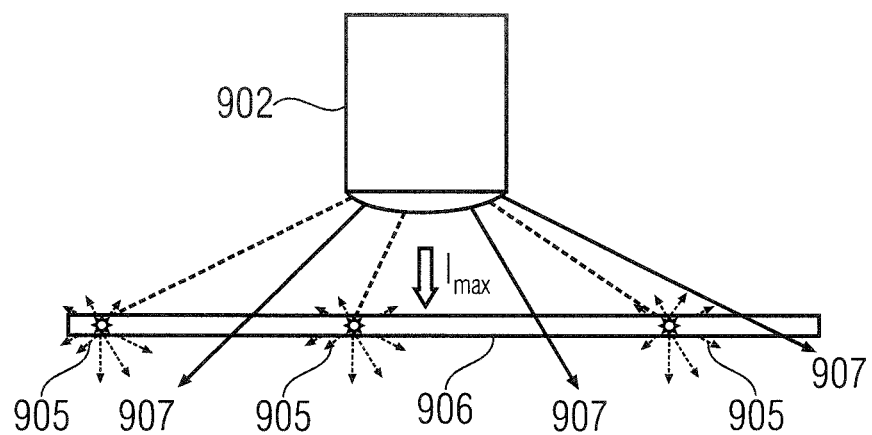
FIG. 25 schematically shows a cross section of a known artificial illumination device.

Moreover, the background light produced by the LEDs at large angles substantially spoils the color quality of the diffused light with respect, e.g., to the case of the embodiment described in FIG. 25, in the sense that the resulting color differs substantially from the color of light from a clear sky.

The fact that the observer clearly sees the overall LED array beyond the panel unavoidably spoils both the uniformity and the color of the background, since contribution to the background from the LED source easily overcomes that from the Rayleigh panel itself.

As a consequence, neither the color nor the virtually infinite depth perception of the natural sky and sun scenery are reproduced by the device of FIG. 26.

Moreover, the minimum divergence achievable by commercial, dome-equipped LEDs is typically of the order of a few tens of degrees, i.e. a much larger figure than the 0.5° value featuring the actual sun beam divergence. This limit causes for the light source 902 an angle of penumbra by far larger than the natural one. As a consequence, shadows of objects but those having huge size are not formed at all, whilst the sharpness of said large-object shadows is anyway very weak. The LED light-beam divergence may be reduced, e.g. to values as low as 6° to 7°, by using larger collimators, e.g. the commercially available TIR (total internal reflection) lenses, or CPC (compound parabolic concentrator) reflectors. This option, however, does not help in supporting the perception of infinite depth, these large collimators leading to a very coarse pixelation which is even easier to be spotted by the eye than standard LED domes.

Indeed, a further problem of the light source 902 depicted in FIG. 26 detrimental in the visual appearance of the natural sky and sun is the perceivable pixelation of the bright spot, i.e. on the angle under which such bright spot is observed. In fact, highly collimated LEDs lead to lens (and thus pitch) sizes that are usually much larger than the standard dome, i.e. of about 1 cm or more, which causes the bright spot to be formed by very few pixels, i.e. LED/lens pairs, where the number decreases with the decrease in LED divergence both because of the lower cone angle under which the spot is observed and because of the increase of the lens size. In this circumstance the virtual image which corresponds to an infinite depth plane splits into two substantially different pixelated images which make the perception of the LED array plane to prevail over the infinite depth image. Such circumstance thus prevents an observer to spontaneously perceive an infinite depth for the sun image.

Furthermore, the effect of the ambient light, i.e. of the light which comes from the ambient lit by the illumination device or some other light sources and which, crossing the Rayleigh scattering panel 906 into upstream/reverse direction, lights again the LED 910 array, as well as the effect of the light which is reflected or diffused back by the Rayleigh panel 906 toward the LED array should be considered. This light, which typically comes from all of the directions, i.e. is diffuse, provides an undesired contribution which further increases the visibility of the LED array. In other terms, the device of FIG. 26 is not black even when it is switched off, as it happens when light feedback from the ambient does not play a role.

Summarizing, the device of FIG. 26 fails in solving the technical problem at the base of the present invention because it fails in the requirement of visual appearance as the actual sky and sun when an observer directly views at the device itself, since it triggers visual perception cue conflicts between concurring visual planes, these planes being for example the real image of the LED 910 array and the virtual image of a bright spot corresponding to the sun. Moreover, it also fails in properly representing the image corresponding to the sun due to the large cone angle under which the bright spot is perceived and the clearly perceivable pixelation of such virtual image.

Figure 27:
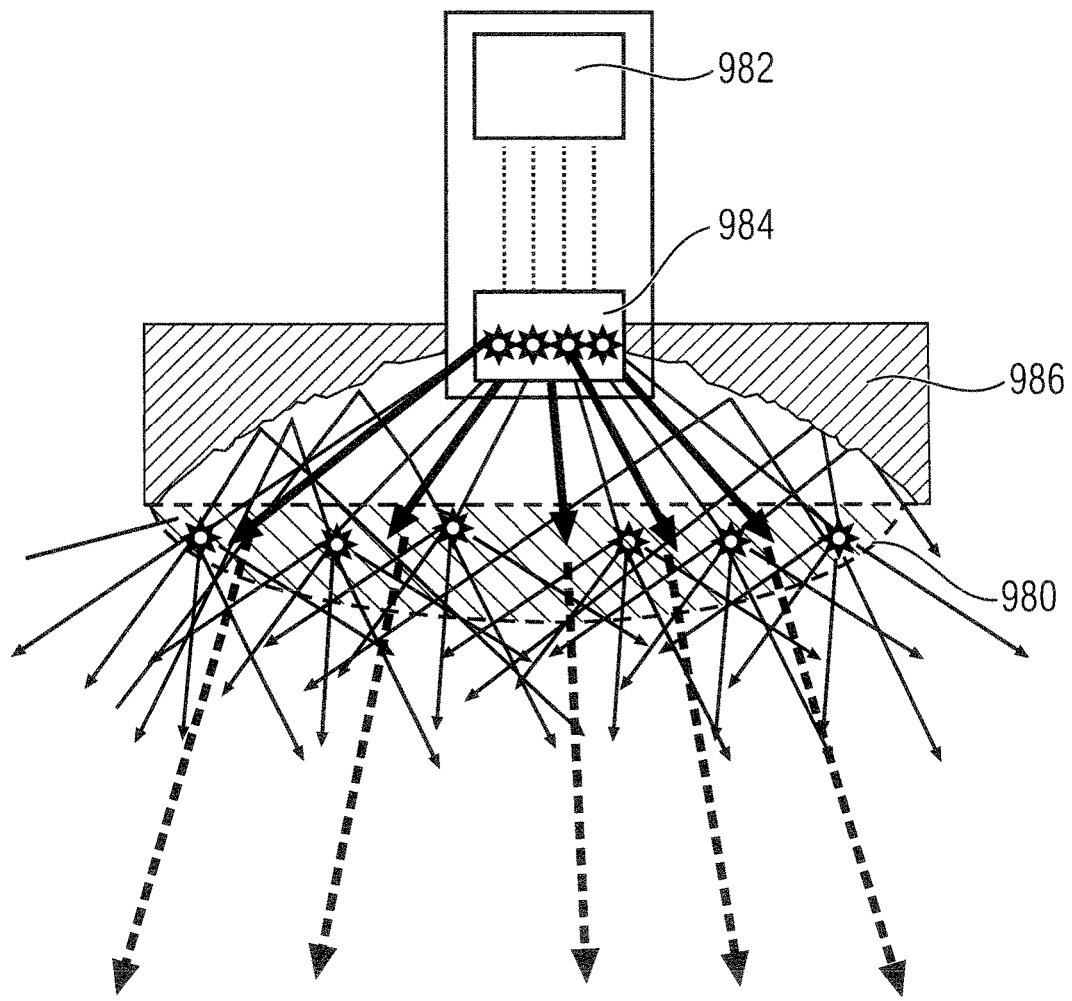
FIGS. 27,28 schematically show further known artificial illumination devices.

As a further example of the occurrence of conflicts among visual cues which prevent a device to produce a visual experience of infinite depth reference is made to the already mentioned embodiment depicted in FIG. 27. In this respect it is worth mentioning that the embodiment is optimized for maximizing the luminous efficiency by directing as much as possible of both direct and diffused light in the forward direction by means of the usage of a single optical element, instead of two, to perform both collimation and Rayleigh scattering. To increase throughput, an antireflection coating and a reflecting chamber to redirect backscattered light in the forward direction, are provided. Notably, no efforts are made in the device of FIG. 27 in order to generate a warm (e.g. low CCT) direct light with minimum divergence, which would necessitate the warm-light source 984 to be positioned at a focal distance from the lens 980. In contrast, as it is apparent from FIG. 27, the source 984 is positioned much closer to lens, the goal being maximizing the amount of light collected by the lens and not that of generating parallel rays.

Owing to the small distance of the source 984 from the lens, the warm light exiting the circumferential portion of the lens is much weaker than the central one, due to the longer ray-path length from phosphor to lens and the larger inclination angle (each ray contribution to illuminance is proportional to the inverse of the square of said path length times the cosine of the incident angle). In practice, assuming an average incidence angle of 60° on the outer portion of the lens, said difference may lead to warm-light luminance variation across the lens as a factor 8, which induces a strong spatial modulation in the luminosity of the Rayleigh diffuser. Unevenness is here further increased because the diffuser thickness decreases where the illuminance (from source 984) gets smaller.

Therefore, the device shown in FIG. 27 still suffers from several problems, including but not limited to visual cue conflicts, which prevent the observer from gaining a natural feeling about the artificial illumination. In fact, the small distance between the warm-light source 984 and the lens causes the source's virtual image to appear at finite distance, differently from what occurs for the natural image of the sun. Moreover the uneven illumination of the (lens) Rayleigh diffuser causes an uneven sky-luminance profile, which in turn forces visual cues to trigger the formation of the luminous-lens' real-image at the device plane, determining a cue conflict between said real and virtual image planes. In addition, the same close distance between source and lens leads the device in FIG. 27 to cast shadows featured by typical radially symmetric outwardly pointing behavior, differently from the case of the real sun. Finally, the reflector box 986 shines toward the observer several luminous contributions, i.e. light coming directly from the source 984, light reflected from the two lens-air interfaces, light back-scattered from the nanodiffusers as well as light coming from the illuminated scene downstream of the lens and crossing the lens in upstream direction. As a consequence, the reflector box further prevents any possible large depth visual experience, by creating an uneven and luminous background beyond the Rayleigh diffuser, at intermediate position between lens's and source's image planes. Notably, due to the contribution of light from the source 984 and from the ambient to the reflected background, with color different from that of Rayleigh scattered light, the reflector box 986 causes the color of the diffused light to depart from the actual color of sky light, thus spoiling the natural appearance of the sky and hindering possible positive effects related to the aerial perspective in deepening the perceived depth. In summary, the device of FIG. 27 fails in solving the technical problem at the base of the present invention because it fails both in the requirement of visual appearance as the actual sky and sun when an observer directly views at the device itself and in the requirement of illuminating an ambient as it is done by the sky and the sun.

In order to further clarify the mechanism by which the virtual image of the bright spot may be formed at infinite distance in the case of an array of identical sources, the inventors of the present invention abstracted the structure shown in FIG. 26 as illustrated in FIG. 1. That is, a diffused-light generator 10 is positioned downstream relative to a direct-light source 12 composed of a 2-dimensional array of first light-emitting devices 14 with each first light-emitting device 14 having a collimator 16 associated therewith so as to collimate light output by the respective first light-emitting device 14. The diffused-light generator 10 may be a Rayleigh-like diffuser or may, as will be outlined in more detail below, alternatively or additionally comprise a diffused-light source which is at least partially transparent to the collimated light generated by direct-light source 12. FIG. 1 also illustrates the observer's eyes 18L and 18R looking into the direction of the artificial illumination device generally indicated with reference sign 20. In FIG. 1, the eyes 18L and 18R will naturally be set to infinity since due to binocular vision the observer will naturally try to have two sun images in the same position on the respective retina 22. Due to the diffused-light generator 10 being placed close to the plane of collimators 16, the eyes 18L and 18R will see a round sun in a blue sky environment. Notably, by walking in the room the eye will see the apparent sun crossing the panel as it happens in reality. If the source angular spectrum is not flat-top but bell shaped, the sun image will not be sharp, but blurred. It is reminded that FIG. 1 concerns only the formation of the virtual image of the bright spot at infinite distance, while not considering the real image of the LED array which is formed by eye accommodation and convergence onto the LED array plane and contributes in preventing the device represented in FIG. 26 from guaranteeing a natural visual appearance of sky and sun.

The concept—or embodiment—of FIG. 1 will be adopted by more detailed embodiments described below. As will get clear from the description below, an artificial illumination device according to FIG. 1 and the corresponding sub-embodiments described hereinafter is able to generate natural light similar to that from the sun and the sky, comprising a direct-light source 12 comprising, in turn, a first emitting surface and configured to produce, from a primary light, a direct light that exits the first emitting surface into a direct-light direction at low divergence, the direct-light source 12 comprising an array of pairs of a first light-emitting device positioned upstream the first emitting surface and configured to emit the primary light and a collimator configured to collimate the primary light emitted by the first light-emitting device along the direct-light direction; and a diffused-light generator 10 configured to cause diffused light 242 at the second emitting surface 34. As it will be described below, one of the first emitting surface and the second emitting surface is positioned downstream with respect to the other and forms an outer emitting surface of the artificial illumination device or both the first emitting surface and the second emitting surface coincide to form the outer emitting surface of the artificial illumination device. The direct-light source 12 and the diffused-light generator 10 co-operate to form outer light at the outer emitting surface which comprises a first light component 241 which propagates within a low divergence cone along the direct light direction and a second light component 243 which propagates along directions outside the low divergence cone wherein the first light component has a correlated color temperature which is lower than a CCT of the second light component so that an observer sees, when looking towards the first emitting surface, a bright spot surrounded by a bluish background which mimics the sky, the bright spot having lower CCT, corresponding to the sun and moving, when the observer moves relatively to the first emitting surface as if the bright spot stemmed from an object positioned at infinity.

Figure 2A:
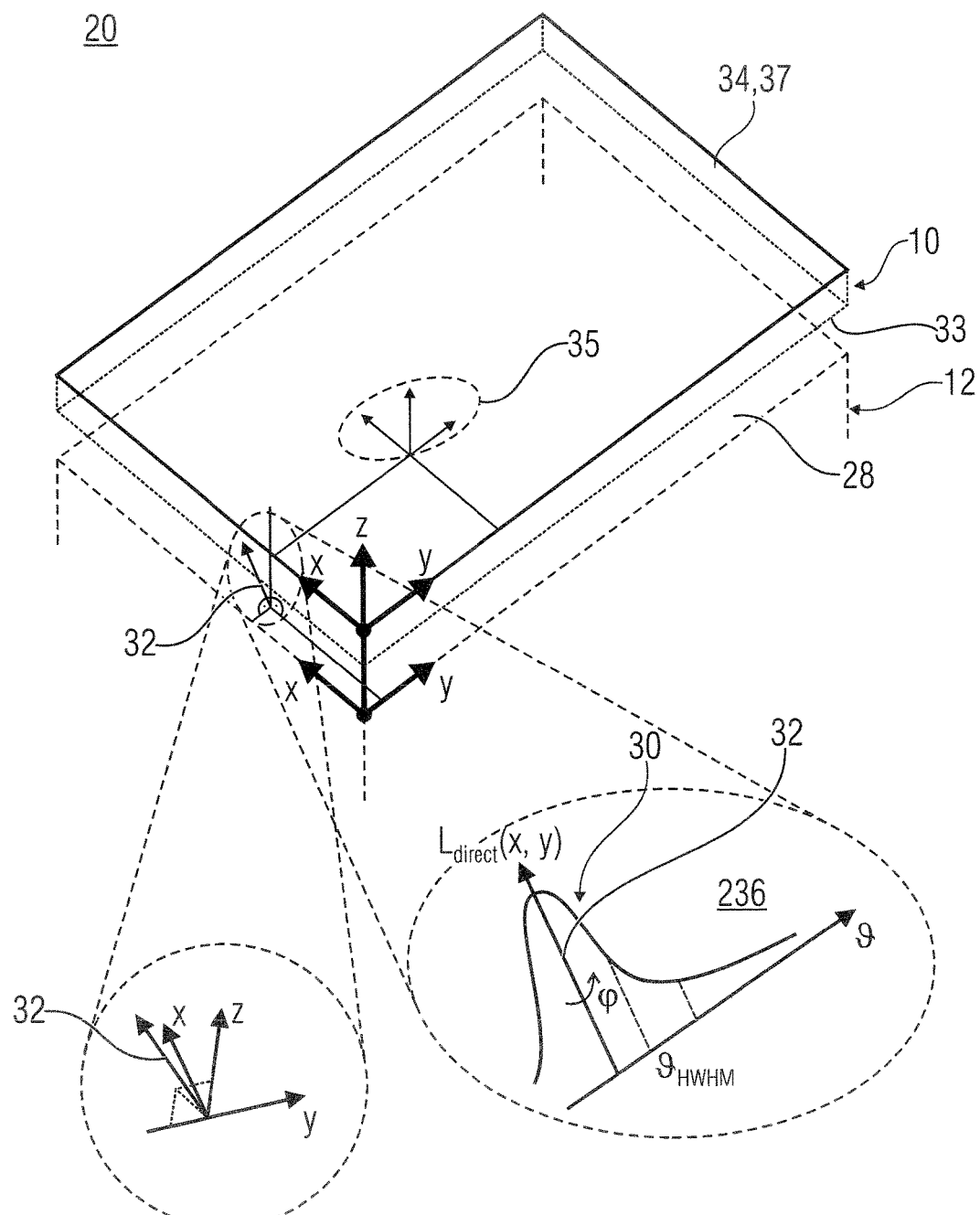
FIG. 2a schematically show an artificial illumination device in accordance with an embodiment with additionally schematically showing the luminance profile of the direct light.

FIG. 2a illustrates advantageous characteristics of embodiments according to the present invention, and illustrates as to how embodiments of the present invention are capable of illuminating an ambient as the sun and the sky do through a window,
with guaranteing at the same time a visual appearance of the illumination device that guarantees the experience of virtually infinite depth as the sky and the sun do in nature when they are observed through a window.

In other terms, FIG. 2a illustrates an artificial illumination device 20 for generate natural light as the sun and the sky, i.e. having a luminance profile and an appearance similar to that of the light from the sun and the sky, and advantageous characteristics thereof.

The artificial illumination device of FIG. 2a comprises a direct-light source. Merely a first emitting surface 28 of the direct-light source is shown for sake of alleviating the understanding of FIG. 2. However, as became clear from FIG. 1 and will get clear from the following figures, not shown), the direct-light source comprises a first light-emitting device configured to emit primary light and positioned upstream relative to the first emitting surface. The direct-light source 12 is configured to produce from the primary light a direct light 236 which exits the first emitting surface 28 with a luminance profile $L_{direct}(x, y, \vartheta, \varphi)$ which is uniform (e.g. with respect to the spatial dependence) across the first emitting surface 28 and has a narrow peak 30 (i.e. with respect to the angular dependence) along a direct light direction 32, wherein x and y are the transverse coordinates along axes x and y spanning the first emitting surface 28, $\vartheta$ is the polar angle measured relative to the direct-light direction 32, and $\varphi$ is the azimuthal angle. Although the term "narrow" is rendered more clear below, in general it might be interpreted as saying that $L_{direct}(x, y, \vartheta, \varphi)$ has a peak subtended by a solid angle which is significantly smaller than $2\pi \cdot sr$, e.g. smaller than 0.4 sr, advantageously smaller than 0.3 sr, more advantageously smaller than 0.2 sr.

Moreover, the artificial illumination device of FIG. 2a also comprises a diffused-light generator 10 which is also not shown for illustration positioned downstream the first emitting surface 28. The diffused-light generator 10 comprises a second emitting surface 34 and an input surface 33 facing opposite to the second emitting surface, and is configured to be, at least partially, transparent to the light impinging onto the input surface 33. Moreover, the diffused-light generator 10 is configured to emit a diffused light 35 from the second emitting surface 34, wherein said diffused light 35 is the component of the outer light which exist the second emitting surface 34 being scattered in virtually all forward directions and being uniform or at least weakly dependent on the spatial coordinates x,y. For example, the diffused-light generator 10 is configured to emit a diffused light over a solid angle which is at least 4 times larger, advantageously 9 times larger, more advantageously 16 times larger than the solid angle subtending the narrow peak 30.

In addition, the device of FIG. 2a is configured so that the direct light 236 produced by the direct-light source 12 has a CCT which is lower than a CCT of the diffused light 35 (e.g. at least 1.2 times lower, advantageously 1.3 times lower, more advantageously 1.4 times lower). Owing to the fact that the diffused-light generator 10 is at least partially light-transparent, at least a portion of the direct light 236 propagates downstream the second emitting surface 34. As a consequence, the outer light comprises a first light component which propagates along directions contained within the narrow peak 30 (for example along at least 90% of the directions subtending the narrow peak 30, i.e. 90% of the directions with polar angle smaller than the HWHM polar angle of the narrow peak) and a second light component which propagates along directions spaced apart from the narrow peak 30, e.g. directions spanning at least 30%, advantageously 50%, most advantageously 90% of the angular region outside the cone with axis directed along direction 32 and half-aperture 3 times larger than the HWHM polar angle of the narrow peak, wherein the first light component has a CCT which is lower than a CCT of the second light component (e.g. at least 1.2 times lower, preferably 1.3 times lower, more advantageously 1.4 times lower).

Figure 2B:
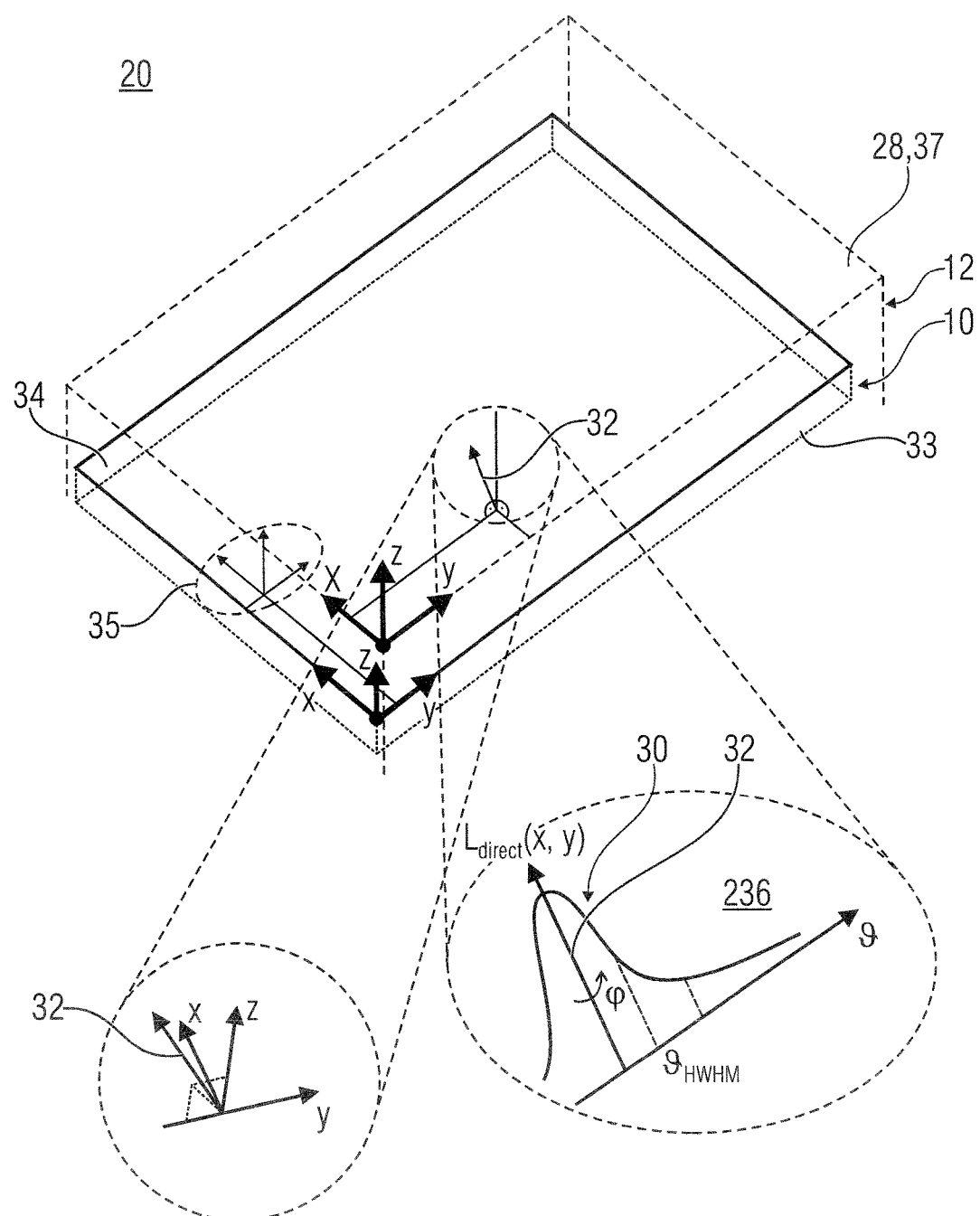
FIG. 2b schematically shows an artificial illumination device in accordance with an embodiment with additionally schematically showing the luminance profile of the direct light.

FIG. 2b shows that the mutual positions of the first emitting surface 28 and the second emitting surface 34 may be inverted relative to the case of FIG. 2a. In other words, in case of FIG. 2a, the second emitting surface 34 forms the outer surface 37 of the device 20, whereas in case of FIG. 2b, the first emitting surface 28 forms the outer surface 37 of the device 20.

Specifically, FIG. 2b shows that an artificial illumination device may comprise a direct-light source (not shown), which in turn comprises a first light-emitting device 14 (not shown) configured to emit primary light (not shown) and a first emitting surface 28 positioned downstream the direct-light source, wherein said direct-light source 12 is configured to produce from the primary light a direct light 236 which exits the first emitting surface 28 with a luminance profile $L_{direct}(x, y, \vartheta, \varphi)$ which is uniform (e.g. with respect to the spatial dependence) across the first emitting surface 28 and has a narrow peak 30 (i.e. with respect to the angular dependence) along a direct light direction 32. A diffused-light generator 10 (not shown) is positioned downstream the first light-emitting device and upstream the first emitting surface 28 (i.e. positioned inside the direct-light source 12) and configured to be, at least partially, transparent to the primary light, i.e. to the light impinging onto the input surface 33, and emit a diffused light 35 from a second emitting surface 34, wherein said diffused light 35 is the component of the light which exists the second emitting surface 34 being scattered in virtually all forward directions and being uniform or at least weakly dependent on the spatial coordinates x,y. Therefore, in FIG. 2b the first emitting surface 28 is positioned downstream the second emitting surface 34, and the luminance profile $L_{direct}(x, y, \vartheta, \varphi)$ is the luminance at the first emitting surface 28 wherein the diffused-light generator 10 is physically removed from the system. In FIG. 2b, the illumination device is configured so that the primary light 14 has a CCT which is lower than a CCT of the diffused light 35 (e.g. at least 1.2 times lower, advantageously 1.3 times lower, more advantageously 1.4 times lower). Owing to the fact that the diffused-light generator 10 is at least partially light-transparent, the outer light at the first emitting surface 28 comprises a first light component which propagates along directions contained within the narrow peak 30 and a second light component which propagates along directions spaced apart from the narrow peak 30, wherein the first light component has a CCT which is lower than a CCT of the second light component.

It is further possible that differing from the embodiment of FIG. 2b the first emitting surface 28 may coincide with the second emitting surface 34. In other terms, the embodiment comprises a dichroic optical element which assures both the functionalities of the diffused-light generator 10 and of the first emitting surface 28, as for example the functionality of generating a diffused-light component with CCT higher than the CCT of the primary light 14 and the functionality of collimating the complementary light component having CCT lower (e.g. at least 1.2 times lower, advantageously 1.3 times lower, more advantageously 1.4 times lower) than the CCT of the primary light, respectively, as for the lens 980 in FIG. 27. In this case the property of generating a luminance profile $L_{direct}(x, y, \vartheta, \varphi)$ which is uniform (e.g. with respect to the spatial dependence) and has a narrow peak 30 (i.e. with respect to the angular dependence) along a direct light direction 32 should be attributed to the case of a direct-light source 12 which comprises an optical element identical to the dichroic optical element but without the functionality of the diffused-light generator.

It is also possible that the process of transforming the primary light into the direct light (e.g. the collimation process) is performed by a few optical elements positioned upstream of the first emitting surface 28, and wherein the diffused-light generator 10, positioned upstream of the first emitting surface 28, is neither directly lit by the primary nor by the direct light, but it is lit by an intermediate light evolving from the primary light and resulting in the direct-light at the first emitting surface 28. Also in this case, $L_{direct}(x, y, \vartheta, \varphi)$'s performances has to be verified with having physically removed the diffused-light generator from the illumination device.

An artificial illumination device formed in accordance with FIGS. 2a and 2b may thus be described as comprising:
a direct-light source 12; and
a diffused-light generator 10,
wherein the direct-light source 12 comprises a first light-emitting device 14 configured to emit a primary light, and a first emitting surface 28 positioned downstream the first light-emitting device,
wherein the diffused-light generator 10 is at least partially light-transparent and is positioned downstream the first light-emitting device and comprises a second emitting surface 34 and is configured to cause diffused light 35 at the second emitting surface 34,
wherein the direct-light source 12 is configured so that, with the diffused-light generator 10 being removed if positioned upstream the first emitting surface 28, the direct-light source 12 produces from the primary light a direct light 236 that exits the first emitting surface 28 with a luminance profile which is uniform across the first emitting surface 28 and has a narrow peak 30 in the angular distribution around a direct-light direction 32,
wherein one of the first emitting surface 28 and the second emitting surface 34 is positioned downstream with respect to the other and forms an outer emitting surface of the artificial illumination device or both the first emitting surface 28 and the second emitting surface 34 coincide to form the outer emitting surface of the artificial illumination device,
wherein the artificial illumination device is configured such that the direct-light source 12 and the diffused-light generator 10 co-operate to form outer light at the outer emitting surface which comprises a first light component which propagates along directions contained within the narrow peak 30 (for example along at least 90% of the directions subtending the narrow peak 30) and a second light component which propagates along a directions spaced apart from the narrow peak 30 (for example along directions spanning at least 30%, advantageously 50%, most advantageously 90% of the angular region outside the cone with axis directed along direction 32 and half-aperture 3 times larger than the HWHM polar angle of the narrow peak),
wherein the first light component has a CCT which is lower than a CCT of the second light component, for example 1.2 times lower, advantageously 1.3 times lower, most advantageously 1.4 times lower.

FIGS. 2a and 2b, thus, showed a direct-light source featured by a luminance profile $L_{direct}(x, y, \vartheta, \varphi)$ which is at the same time uniform with respect to the spatial coordinates, and narrowly peaked with respect to the angular coordinate, and a diffused-light generator which is at least partially light-transparent, wherein the actual features of $L_{direct}(x, y, \vartheta, \varphi)$ are, as explained above, critical with respect to the visual perception cues.

It is noticed that the uniformity of $L_{direct}(x, y, \vartheta, \varphi)$ (with respect to the spatial coordinates) should be sufficient to avoid visual perception cue conflicts. In fact, the inventors noticed that a uniform luminance profiles cannot lead to a depth perception different from an infinite depth perception for any among the accommodation, binocular-convergence and motion parallax visual cues. Moreover, the narrow peak 30 in the $L_{direct}(x, y, \vartheta, \varphi)$ angular profile plays a key role in the visual appearance of a prevailing infinite depth perception.

Indeed, the presence of a uniform luminance profile along spatial coordinates with a sharp angular peak generates, similarly to the setup depicted in FIG. 1, a virtual image supported by binocular convergence at infinity. Such uniformity overcomes the evident limitations of the embodiment in FIG. 26, since the real image of the LED array is determined by the non-spatially uniform luminance due for example to the LED elements pitch.

It is noted that a peak 30 in the angular profile of the spatially uniform $L_{direct}(x, y, \vartheta, \varphi)$ further improves an infinite depth perception. In fact, an observer's visual attention is preferentially attracted by the plane where the highest luminance, the highest contrast and the highest spatial frequency (provided that it is smaller than the frequency corresponding to the angular resolution limit) occur. In other terms, the binocular convergence sets the eyes in order to avoid sharp and bright images to be differently positioned on the two retinas, with respect to correlated positions. Therefore the narrow peak in the $L_{direct}(x, y, \vartheta, \varphi)$ angular profile, as long as it is perceived by the two eyes from the same direction (which follows from $L_{direct}$ spatial uniformity and the fact that it is peaked along direct light direction 32) forces the two eyes to be aligned along parallel directions, supporting infinite depth perception of a bright spot representing the sun. Notably, this happens independently of the actual direction along which both the axes of the eye balls are aligned, i.e. even if the eyes are oriented so that the $L_{direct}$ peak creates a spot far from the center of eyes' retinas. In other words, the effect occurs as long as the bright and narrow spot is in the visual field, no matter if it is in the center or on a side.

Moreover, due to the already mentioned fact that an observer's visual attention is preferentially attracted by the plane where the highest luminance, the highest contrast and the highest spatial frequency (below resolution limit) occur, also eye accommodation in the case of the embodiment of FIG. 2 is prevailingly brought to an infinite plane, this being the virtual plane at which the highest luminance, contrast and spatial frequency occur because of the narrow angular peak 30 in the luminance $L_{direct}(x, y, \vartheta, \varphi)$.

The spatial uniformity of $L_{direct}(x, y, \vartheta, \varphi)$ ensures also an infinite depth perception for the visual cue of motion parallax, since a moving observer experiences the virtual image due to any angular structure of $L_{direct}(x, y, \vartheta, \varphi)$, e.g the narrow peak 30 which represents the sun, as moving together with him/her as very far away objects appear to move in reality.

Moreover, the characteristics of the luminance profile as above-described result not to depend on the number of observers and their relative position with respect to the source, in the sense that each single observer experiences the same infinite depth perception coherently supported by visual perception cues.

The luminance profile $L_{direct}(x, y, \vartheta, \varphi)$ of the light exiting the first emitting surface 28 of the direct-light source 12 therefore ensures the absence of intra- and inter-conflicts between visual depth perception cues, this being fundamental in order to induce a natural perception of infinity depth of both sun and sky.

It is noted that the capacity of $L_{direct}(x, y, \vartheta, \varphi)$ of determining infinite depth perception typically increases with the increase of the contrast between peak and background in the luminance angular profile, i.e. a dark background strongly supports a prevailing infinite depth perception, in presence of a bright angular peak.

It is also pointed out that a dark background further improves the prevailing infinite depth perception with respect to a brighter one since the lower the average luminance value of these non-uniform structures is with respect to the main narrow angular peak, the lower the visibility of possible non-uniformities in the background luminance profile is. In other terms, a non-uniformity in a dark background determines much weaker visual perception cue conflicts than a non-uniformity of an intense background, for the same relative amplitude of fluctuations with respect to the average value of the background, where dark or intense are to be intended with respect to the luminance of the narrow angular peak 30.

It is also noticed that the request of $L_{direct}(x, y, \vartheta, \varphi)$ being at the same time uniform in the (x,y) profile and peaked in the $(\vartheta,\varphi)$ profile is contradictory for the case of FIG. 26, since uniformity in the (x,y) profile demands for a minimization of the collimators' size down to the micro-optics regime, so that fluctuations become unperceivable, whilst the narrow peak in the $(\vartheta,\varphi)$ profile demands for a maximization of the collimators' size, e.g. in order to remove the inherent divergence of the LED sources.

The narrow angular peak 30 along the direct-light direction 32 ensures parallel shadows with a sharp penumbra. The diffused-light generator 10 ensures on one side that in FIG. 2 the ambient is illuminated as the natural sky and sun, by providing a higher CCT diffused light component which tinges shadows in a bluish color as it happens for natural light entering an actual window. On the other side, the diffused-light generator 10 affects also the visual appearance of the device itself when directly looking at it. In fact, the diffused-light generator 10 creates a diffuse luminous bluish background around the low CCT bright spot determined by the luminance of the direct-light source. This luminous background, instead of spoiling the infinite depth perception as it would happen for a white or a gray luminous background, further supports the infinite depth perception because of the synergistic action between the aerial perspective visual cue and the other visual cues, already described, supported by the direct-light source alone.

With respect to said synergistic action, i.e. with respect to the depth perceived by the observer when looking at the diffused-light generator 10 while also having the bright spot representing the sun on a side of the visual field, the inventors notice the key role played by the three concurrent effects of the narrow peak in the $L_{direct}$ angular profile, of the spatial uniformity and smooth angular dependence of the diffused-light emitted from the second emitting surface 34 and of the high value of the diffused-light CCT (with respect to the direct light CCT). In fact, the spatial uniformity and smooth angular dependence of the diffused light alone would leave the perceived distance of the source of the diffused light as undetermined, i.e. it would be difficult for an observer to estimate the distance between him/her and the second emitting surface 34 except for the frames or similar portions where uniformity vanishes. Under such circumstances, the presence of any minor detail which directs the observer's attention to the diffused-light generator physical plane (e.g. the presence of scratches onto the diffuser surface) would create a prevailing depth perception focused onto the second emitting surface 34. In contrast, the narrow peak in the $L_{direct}$ angular profile forces the eyes to converge at infinity. As a consequence, the plane from which the diffused light is perceived to be originated is dragged to infinity as well. This happens because when the observer looks at a uniform background, the distance of which is per se not defined, the convergence, accommodation and motion parallax visual perception cues remain settled by the single defined structure in the scene, represented in this case by the narrow angular peak 30 in the $L_{direct}$. It has been found out that in the case of FIG. 2 this effect is substantially enhanced when the diffused light has the color and the luminance (with respect to the ambient) similar to that of the sky, as it occurs for a diffuser operating in Rayleigh scattering regime. In fact, in this case the observer's habit of perceiving the sky as a distant object enforces, from a psychological point of view, the infinite depth perception. In other terms, the aerial perspective further contributes in dragging the background to infinite distance. Finally it can be noticed that the outlined dragging of the bluish background to infinite distance was not observed for the device in FIG. 26, since in that case the perceivable pixelation drags the plane of emission of the diffused light onto the LED array plane.

As it will turn out from the specific embodiments outlined below, the artificial illumination device 20 may be constructed so as to be "compact" in the sense defined herein below: considering the smallest volume Q encompassing the direct-light source 12, being T the length of the (cylindrical) projection of Q onto a line parallel to the direction 32 and being U the maximum distance between any two points on the first emitting surface 28, the direct-light source 12 is configured so that the width of the narrow peak 30 in the $L_{direct}$ angular profile is much smaller than arctan(U/2/T), i.e. 2 times, advantageously 4 times, more advantageously 6 times smaller than 2 arctan(U/2/T), which means that by no means the narrow peak 30 can be obtained by simply positioning a light emitter far away from surface 28.

Figure 3A:
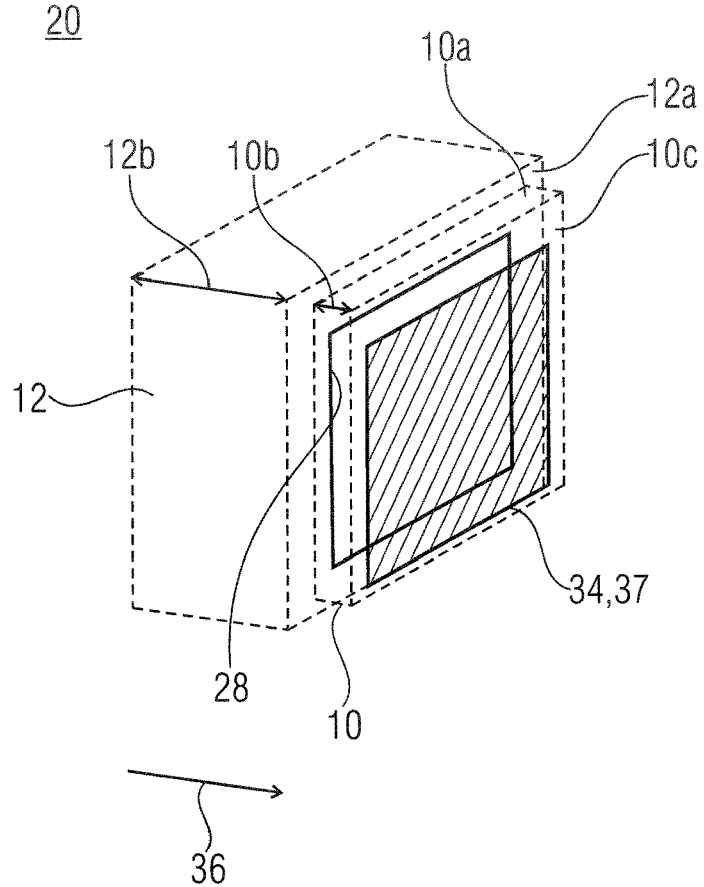
FIG. 3a,b show 3-dimensionally a schematic of an arrangement of a direct-light source and a diffused-light generator in accordance with the embodiments of FIGS. 2a and 2b, respectively.

Light illumination devices according to embodiments of the present invention may also be compact in the further sense that, as shown in FIG. 3a,b, the direct-light source 12 may be accommodated within a cuboid, the area of the ground face 12a of which is equal to or greater than the area of the first emitting surface and the height 12b of which is smaller than a maximum width of the first emitting surface 28. The ground face 12a may comprise the first emitting surface 28 or may be placed parallel thereto with the first emitting surface 28 completely residing within the cuboid. Just in order to give examples, the area of the first emitting surface 28 may be greater than 10 cm×10 cm. The area of the ground face 12a may be smaller than 1.1 times the area of the first emitting surface 28. The aforementioned maximum width may be defined as the minimum distance between any two points of the first emitting surface 28.

Figure 3B:
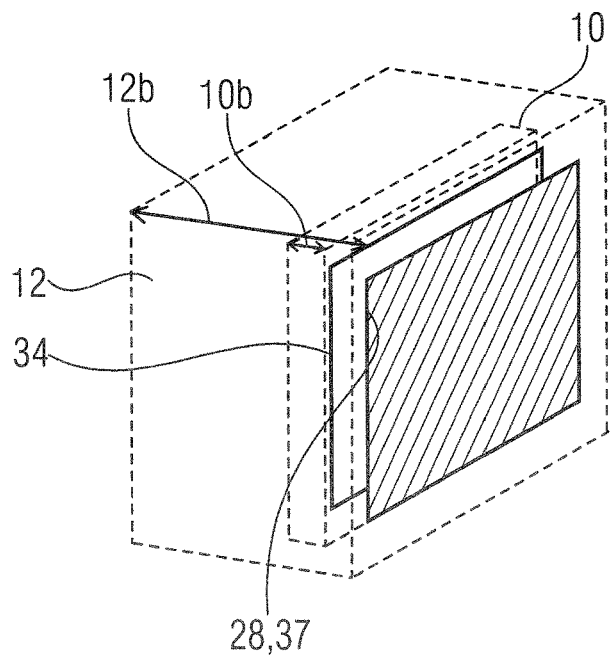

In the case of the embodiments further outlined below, the diffused-light generator 10 does not accommodate much space. For example, the diffused-light generator 10 may be arranged within a cuboid having its ground face 10a in the same plane as the first emitting surface 28 and extending into the downstream direction 36 by a height 10b, as shown in FIG. 3a. The area of ground face 10a may be equal to or smaller than ground face 12a and the same applies to height 10b which may be smaller than or equal to height 12b. The top face 10c opposite to ground face 10a may comprise the second emitting surface 34 or the latter may be contained within the cuboid of the diffused-light generator 10. Advantageously, the area of the second emitting surface 34 is approximately equal to the area of the first emitting surface 28 such as, for example, +/−10% of the area of the first emitting surface 28. As said before, the ground faces of the cuboids of generator 10 and source 12 may exceed the areas of the surfaces 34 and 28. The height 10b may be smaller than 10% of the aforementioned maximum width of first emitting surface 28 or smaller than 10 cm irrespective of the maximum of first emitting surface 28. The downstream direction 36 may, for example, be defined to point into the direction 32 into which the direct light generated by direct-light source 12 is emitted from the first emitting surface 28. As said, this direction 32 may be parallel to the normal of first emitting surface 28. FIG. 3b corresponds to the sequential arrangement between surfaces 28 and 34 of FIG. 2b. Here, the cuboid of generator 10 may be completely contained within the direct-light source's cuboid.

As a consequence of the direct-light source ability to produce the direct light such that same exits the first emitting surface 28 with a luminance profile $L_{direct}$ which is uniform across the first emitting surface 28 and has the narrow peak 30 around the direct-light direction 32, it follows that: 1) the direct-light direction 32 is substantially constant all over the first emitting surface 28, 2) the divergence is small, and 3) the divergence is substantially constant over all the first emitting surface 28. As to what extent "small" and "substantial" may be obeyed is explained in more detail herein below. In any case, with reference to FIG. 4, due to the direct light generated by the direct-light source 12 obeying these constraints, an observer 38 who looks at the direct-light source and its first emitting surface 28, respectively, sees a bright spot 40 under a narrow visual cone angle 42, the spot being perceived at infinite distance with respect to binocular-convergence, accommodation and motion parallax depth cues. In other words, the observer 38 sees, when looking towards the first emitting surface 28, a bright spot 40 which, when the observer moves relative to the first emitting surface, moves relative to the first emitting surface 28 as if the bright spot 40 stemmed from an object positioned at infinity.

In order to define the aforementioned constraints to be obeyed with respect to the aforementioned uniformity and the sharpness of the peak by the luminance profile of the light generated by the direct-light source 12 at the first emitting surface 28, one could differentiate between the inner direct-light component on the one hand, which contributes to the formation of the narrow peak, and the surrounding more divergent component on the other hand, which leads to the formation of a residual background, and between possible variations of the luminance profile within smaller areas and greater areas, i.e. almost the whole area of the first emitting surface 28, relating to the binocular-convergence and motion-parallax depth cues. The constraints are defined herein below.

In particular, the direct-light source 12 emits light with uniform intensity across the first emitting surface 28 at single, given direction 32 with respect to the emitting surface's normal z, with very low, advantageously circular symmetric, divergence cone and low background outside such divergence cone, where both the divergence and the background are also uniform across the panel. In this regard, $L_{direct}(x, y, \vartheta, \varphi)$ shall denote the luminance of the direct light as generated by the direct-light source at a dark environment, i.e. without any light originating or reflected from outside the direct-light source, where x, y, $\vartheta$ and $\varphi$ are as defined before. It is submitted that in expressing the luminance in function of the spatial and angular coordinates one should account for the actual angular resolution of the detector and its distance from the source, which in turn determines the detectable spatial resolution. In the context of the present invention, it is assumed an angular resolution of 0.07°, which approximates the typical naked eye angular resolution, and a spatial resolution of 1 mm, which corresponds to an observation distance of about 1 m. Therefore all the constraints concerning the luminance profiles described in the context of the present invention should be intended as referred to the above mentioned resolutions, in the sense that variations that eventually occur at higher angular or spatial frequencies (i.e. which could be detected with higher angular resolution and/or at closer distance) are not relevant for the purpose of the present invention. The constraints may be such that:

far from direction 32, i.e. for polar angles $\vartheta > 3\vartheta_{HWHM}$, where $\vartheta_{HWHM}$ is the HWHM (half width half maximum) of a mean polar-angle distribution being an average over the luminance profile $L_{direct}$ over all positions (x,y) in the first emitting surface and all azimuthal directions $\varphi$, the luminance profile $L_{direct}$ drops below 10%, advantageously below 1%, most advantageously below 0.1% of an absolute maximum of $L_{direct}$ over all positions and angles, and close to direction 32, i.e. for polar angle $\vartheta \leq \vartheta_{HWHM}$, the luminance profile $L_{direct}$ is weakly dependent from the azimuthal coordinate $\varphi$; e.g. for each position (x,y), the $\vartheta,\varphi$ region outside which $L_{direct}$ drops below 10% of the maximum is substantially a cone with circular base, which allows the observer to perceive a round spot when looking at the source into direction 32; quantitatively, the difference between max and min polar angles of said region normalized to the half sum of the same quantities may be below 0.5, advantageously below 0.2, most advantageously below 0.1 for any position in the sample;

wherein $\vartheta_{HWHM} \leq 2.5°$, advantageously $\vartheta_{HWHM} \leq 1.5°$, more advantageously $\vartheta_{HWHM} \leq 0.5°$.

In formulas, this means:

$$L_{direct}(x, y, \vartheta, \varphi) \leq k \cdot L_{max} \quad \text{for } (x, y) \in A, \varphi \in [0; 2\pi[ \text{ and } \vartheta > 3\vartheta_{HWHM}$$

$$2\frac{\vartheta_{max}(x, y) - \vartheta_{min}(x, y)}{\vartheta_{max}(x, y) + \vartheta_{min}(x, y)} \leq h \quad \text{for } \varphi \in [0; 2\pi[, (x, y) \in A \text{ and } \vartheta \leq \vartheta_{HWHM}$$

wherein
A denotes the area of the first emitting surface 28,
$\vartheta_{HWHM} \leq 2.5°$, advantageously $\vartheta_{HWHM} \leq 1.5°$, more advantageously $\vartheta_{HWHM} \leq 0.5°$,
k=0.1, advantageously k=0.01, most advantageously k=0.001,
h=0.5, advantageously h=0.2, most advantageously h=0.1
and wherein the following definitions hold true:

$$L_{max} \equiv \max_{x,y,\varphi,\vartheta}(L_{direct}(x, y, \vartheta, \varphi))$$

$$L_{mean\ polar\ angle\ distr}(\vartheta) \equiv \frac{1}{2\pi}\frac{1}{A}\int_{\varphi \in [0;2\pi[}\int_{(x,y) \in A} L_{direct}(x, y, \vartheta, \varphi)\,d\varphi\,dx\,dy$$

$$\vartheta_{HWHM} \equiv HWHM(L_{mean\ polar\ angle\ distr}(\vartheta))$$

$$\vartheta_{min}(x, y) \equiv \min\{\vartheta\ |\ \forall \vartheta' > \vartheta, \exists \varphi, L_{direct}(x, y, \vartheta', \varphi) \leq 0.1 \cdot L_{max}\}$$

$$\vartheta_{max}(x, y) \equiv \max\{\vartheta\ |\ \forall \vartheta' > \vartheta, \exists \varphi, L_{direct}(x, y, \vartheta', \varphi) \leq 0.1 \cdot L_{max}\}$$

Putting more focus on the uniformity of the residual direct-light background far from direction 32, the request on $L_{direct}$ is to show minimal spatial amplitude fluctuations for polar angle 4 greater than $3\vartheta_{HWHM}$; e.g. the ratio between a standard deviation of said luminance spatial fluctuations and the luminance average value may not exceed the value of 0.3, advantageously not exceed the value of 0.1, within any 10 mm diameter spatial circular areas and for at least 90% of the first emitting surface, and may not exceed the value of 0.4, advantageously not exceed the value of 0.3, more advantageously not exceed the value of 0.2, within the entire at least 90% of the first emitting surface, for any fixed azimuthal angle $\varphi$ and for any fixed polar angle $\vartheta$ greater than $3\vartheta_{HWHM}$;

as far as direct-light uniformity close to direction 32 is concerned, the request on $L_{direct}$ is of not exhibiting spatial fluctuations in a (local) polar angle leading to (local) maximum luminance with standard deviation larger than 20% of $\vartheta_{HWHM}$ within spatial areas of 5 cm diameter, advantageously 10 cm diameter, more advantageously 20 cm diameter, and does not exhibit spatial fluctuations in the (local) polar angle leading to (local) maximum luminance with standard deviation larger than $\vartheta_{HWHM}$ within the entire at least 90% of the entire first emitting surface, wherein $\vartheta_{HWHM} \leq 2.5°$, advantageously $\vartheta_{HWHM} \leq 1.5°$, most advantageously $\vartheta_{HWHM} \leq 0.5°$.

Described in formulas, the just mentioned constraints could be formulated as $$\sigma_{x,y}(L_{direct}(x, y)|_{\vartheta,\varphi}) \leq j \cdot \mu_{x,y}(L_{direct}(x, y)|_{\vartheta,\varphi}),$$

for (x, y)$\in A_{10\ mm}$ (X,Y), $\forall \varphi \in [0; 2\pi[$ and $\forall \vartheta > 3\vartheta_{HWHM}$, with j=0.3, advantageously j=0.1

$$\sigma_{x,y}(L_{direct}(x, y)|_{\vartheta,\varphi}) \leq g \cdot \mu_{x,y}(L_{direct}(x, y)|_{\vartheta,\varphi}),$$

for (x, y)$\in A_{90\%}$, $\forall \varphi \in [0; 2\pi[$ and $\forall \vartheta > 3\vartheta_{HWHM}$, with g=0.4, advantageously g=0.3, more advantageously g=0.2.

$$\sigma_{x,y}\left(\operatorname*{argmax}_{\vartheta} L_{direct}(\vartheta, \varphi)\Big|_{x,y,}\right) \leq 0.2 \cdot \vartheta_{HWHM} \quad \text{for}(x, y) \in A_{diam}(X, Y),$$

$$\sigma_{x,y}\left(\operatorname*{argmax}_{\vartheta} L_{direct}(\vartheta, \varphi)\Big|_{x,y,}\right) \leq \vartheta_{HWHM} \quad \text{for}(x, y) \in A_{90\%}$$

wherein all (X,Y)$\in A_{90\%}$, $\vartheta_{HWHM} \leq 2.5°$, advantageously $\vartheta_{HWHM} \leq 1.5°$, most advantageously $\vartheta_{HWHM} \leq 0.5°$, and with $A_{90\%}$ denoting a portion taking up 90% of the whole area of the first emitting surface 28 which portion may be simply connected or not, $A_{10\ mm}$ denoting any circular area of 10 mm diameter at (X;Y) within A, $A_{diam}$ denoting a circular area at (X;Y) within A of 5 cm diameter, advantageously 10 cm diameter, more advantageously 20 cm diameter, $$\sigma_{x,y}$$

denoting the standard deviation of the argument with respect to the spatial coordinates, $$\mu_{x,y}$$

denoting the mean value of the argument with respect to spatial coordinates, and wherein the following definitions hold true:

$$L_{localmax}|_{x,y} \equiv \max_{\vartheta,\varphi} L_{direct}(\vartheta,\varphi)|_{x,y}$$

(i.e. a maximum luminance at given position) and $$\operatorname*{argmax}_{\vartheta} L_{direct}(\vartheta,\varphi)|_{x,y} \equiv \{\vartheta | \exists \ \varphi | L_{direct}(\vartheta,\varphi)|_{x,y} = L_{localmax}|_{x,y}\}$$

(i.e. a polar angle at which said maximum luminance at given position occurs)
and wherein $$L_{direct}(x,y)|_{\vartheta,\varphi} = L_{direct}(x,y,\vartheta',\varphi') \text{ for } \vartheta'=\vartheta, \varphi'=\varphi,$$

$$L_{direct}(\vartheta,\varphi)|_{x,y} = L_{direct}(x',y',\vartheta,\varphi) \text{ for } x'=x, y'=y$$

Summarizing, by the above constraints it is assured that for polar angles sufficiently spaced apart from the direct-light direction 32, $L_{direct}$ is fairly weak and uniform, while for polar angles close to direct-light direction 32, $L_{direct}$ is weakly dependent on azimuthal coordinate, and is peaked at the same direction, i.e. $\vartheta=0$, for any $(x,y) \in A$, at least substantially, so that the appearance of a round spot 40 is assured. As denoted above, by these constraints it is assured that the observer 38 will see only a bright and round spot 40, with full-width angular size 42 equal to, or similar to, $2 \cdot \vartheta_{HWHM}$, surrounded by a weak and uniform background.

In a certain embodiment, the direct-light source is configured to ensure dark and uniform background also when it is operated inside a fairly luminous environment, i.e. it is configured so that ambient light is not reflected or back scattered in an amount which may spoil the appearance of the first emitting surface 28 in terms of background luminance level and uniformity. In fact, in use, the first emitting surface 28 not only emits but also may receive light from, for example, the diffused-light generator 10 (if positioned downstream of it) and/or from the ambient. For example, in the ideal case of the artificial illumination device 20 illuminating a perfectly white room, the entire luminous flux generated by the direct-light source would return to the direct-light source itself.

The request of above translates into a request for the first emitting surface 28 to have a dark and uniform appearance under diffuse external illumination when the direct-light source 12 is off. Specifically, in the present embodiment the direct-light source 12 is configured so that the first emitting surface 28 has a total reflectance (average) factor $\eta_r \leq 0.4$, advantageously $\eta_r \leq 0.2$, more advantageously $\eta_r \leq 0.1$, even more advantageously $\eta_r \leq 0.04$, wherein the total reflectance factor $\eta_r$ is defined as the ratio of the luminous flux, reflected at all angles within the hemisphere bounded by the plane of the specimen, to the flux reflected from a perfect reflecting diffuser under the same geometric and spectral conditions of measurement, e.g. under diffuse illumination by a D65 standard illuminant which provides uniform illuminance (lux/m) onto the sample.

In a further embodiment, the request on the dark and uniform appearance of the first emitting surface 28 far from direction 32 is even more stringent, since it is necessitated that reflected light is upper bounded by direct light both for what concerns the absolute luminance value and its fluctuations. More precisely, the embodiment ensures that the first emitting surface 28 preserves the same characteristics in terms of the background light also as a passive optical element, i.e. with respect to light that it reflects and diffuses when it is made to operate inside a fairly luminous environment. In other terms, the direct-light source 12 guarantees dark and uniform appearance for any polar angle of observation outside the emitting cone 30 also in the presence of strong ambient light.

The request could be translated in saying that the direct-light source 12 should be configured such that, when the diffused-light generator 10 is removed from the artificial illumination device and the direct-light source 12 is off and the first emitting surface 28 is illuminated by an external diffused light which delivers onto the first emitting surface 28 a constant illuminance equal to the average of the illuminance delivered by the direct-light source 12 itself onto the first emitting surface when it is on, the external diffused light is reflected or back-scattered by the first emitting surface producing a reflectance luminance profile $L_R$ at the first emitting surface 28 which is weaker than $L_{direct}$ at any position and any angle within at last 90% of the first emitting surface 28, and wherein $L_R$ exhibits an amplitude standard deviation within any 10 mm diameter spatial circular area that lower than the corresponding standard deviations of $L_{direct}$ within at last 90% of the first emitting surface 28.

In formulas, the aforementioned constraints on the "weakness" and "uniformity" of $L_R$, read:

$$L_R(x,y,\vartheta,\varphi) < L_{direct}(x,y,\vartheta,\varphi)$$

for all x, y $\in A_{90\%}$, all $\varphi \in [0; 2\pi[$ and all $\vartheta \in [0, \pi]$ $$\sigma_{x,y}(L_R(x,y)|_{\vartheta,\varphi}) \leq \sigma_{x,y}(L_{direct}(x,y)|_{\vartheta,\varphi}),$$

for $(x,y) \in A_{10\ mm}(X,Y)$ all $\varphi \in [0;2\pi[$ and all $\vartheta \in [0, \pi]$
wherein all $(X,Y) \in A_{90\%}$
with $A_{90\%}$ denoting a portion taking up 90% of the whole area of the first emitting surface 28 which portion may be simply connected or not, $A_{10\ mm}$ denoting any circular area of 10 mm diameter at $(X;Y)$ within A, $$\sigma_{x,y}$$

denoting the standard deviation of the argument with respect to the spatial coordinates, and wherein $$L_R(\vartheta,\varphi)|_{x,y} = L_R(x',y',\vartheta,\varphi) \text{ for } x'=x, y'=y$$

In a different embodiment, the constraints on the spatial fluctuations in the direction and the width of the narrow peak 30 of light generated by the direct-light source 12 at the first emitting surface 28 are formulated differently, namely the luminance profile $L_{direct}$ shows a range of a distribution of a local direction of a maximum value over the first emitting surface 28, of less than 2°, and the mean value over the first emitting surface 28 of a HWHM of a local average polar angle profile of $L_{direct}$ averaged over all azimuthal angles is below 5°. Expressed in terms of formulas, this means:

$$\max_{x,y}\left(\operatorname*{argmax}_{\vartheta} L_{direct}(\vartheta,\varphi)|_{x,y}\right) \leq 2° \text{ for all } x, y \in A_{90\%}$$

$$\mu_{x,y}\left(\operatorname*{HWHM}_{\vartheta}\left(\frac{1}{2\pi}\int_{\varphi \in [0;2\pi[} L_{direct}(\vartheta,\varphi)|_{x,y}\ d\varphi\right)\right) < 5° \text{ for all } x, y \in A_{90\%}$$

wherein $$L_{localmax}\big|_{x,y} \equiv \max_{\vartheta,\varphi} L_{direct}(\vartheta, \varphi)\big|_{x,y}$$

(i.e. maximum luminance at given position) and $$\operatorname*{argmax}_{\vartheta} L_{direct}(\vartheta, \varphi)\big|_{x,y} \equiv \{\vartheta | \exists\, \varphi | L_{direct}(\vartheta, \varphi)|_{x,y} = L_{localmax}|_{x,y}\}$$

(i.e. polar angle at which said maximum luminance at given position occurs)
and wherein $$L_{direct}(\vartheta,\varphi)|_{x,y} = L_{direct}(x',y',\vartheta,\varphi) \text{ for } x'=x, y'=y$$

Figure 28:
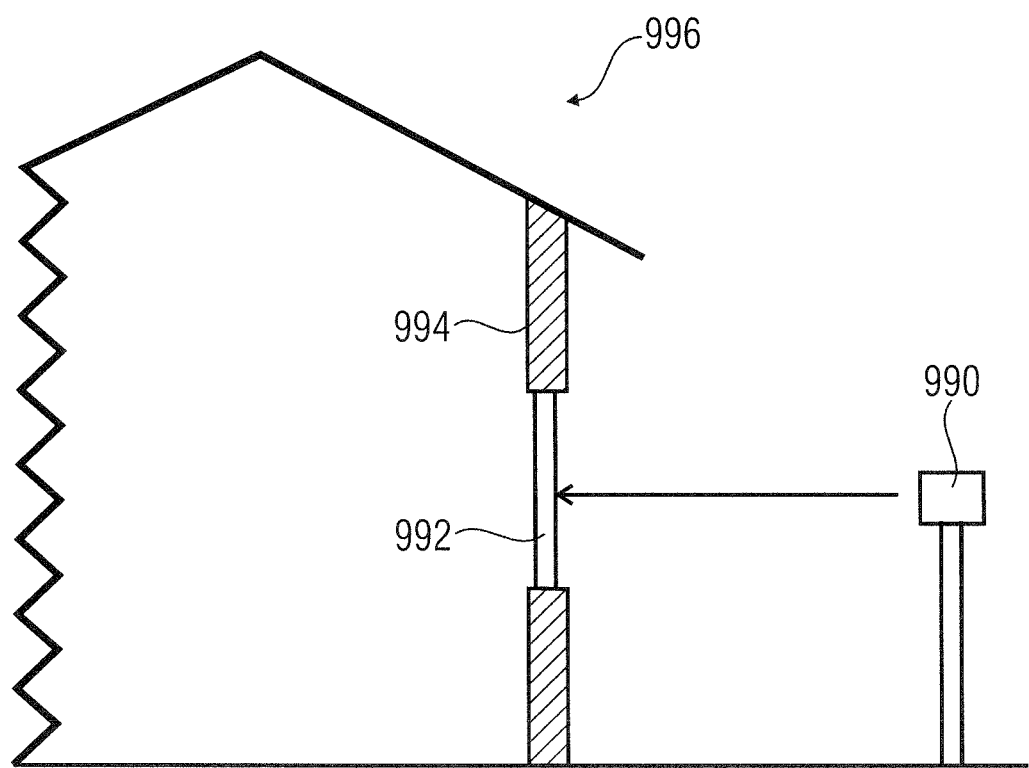

Naturally, the distribution of the direction of the maximum value of the luminance profile should differ from a radially symmetric vector field so that shadows cast by objects in the direct light are not aligned along converging directions, as it would be the case in the device of FIG. 25, FIG. 27 and FIG. 28. More precisely, the direct-light source is configured such that a plurality of elongated objects that are lit by the direct-light source and are oriented along direction 32 and parallel to each other cast onto an arbitrary plane a plurality of shadows that should not be featured by radially symmetric outwardly pointing behavior which is typical for illumination by a localized source at finite distance. To this end, the spatial fluctuations in the direction of the narrow peak 30, which may occur within the limitation of above, may be irregular or random.

By combining the direct-light source 12 and the diffused-light generator 10 in any of the manners described above, the artificial illumination device 20 provides a luminous, advantageously bluish background that mimics the sky and stems from the diffused-light generator 10, while light caused by the direct-light source 12 which leads to the bright spot 40 has lower CCT. When walking in front of the first emitting surface 28, this spot 40 moves across it as the sun would across a real window.

Notably, once the direct light of the direct-light source 12 is seen by the observer 38 with both eyes, the observer 38 will perceive the bright spot 40 at infinite distance. In fact, the outlined features of the luminance profile $L_{direct}$ impose that the eyes are parallel in order to perceive equally positioned bright spots on the two retinas as depicted in FIG. 1. This is the condition which guarantees the device 20 to provide large depth perception. These conditions will be ideally guaranteed if $L_{direct}$ is independent from x, y and φ and virtually null for $\vartheta > \vartheta_0$ and has a constant value for $\vartheta < \vartheta_0$, where $\vartheta_0$ is, for example, 3° or more advantageously 1° or even more advantageously 0.5°. However, some discrepancy from this ideal regime is obviously acceptable as the above examples for possible constraints showed. The amount of acceptable discrepancy is mainly dictated by the need of guaranteeing the above-mentioned large (virtually infinite) depth perception to occur in absence of visual perception conflicts, or at least in absence of conflicts which lead to a prevailing depth perception at finite distance. This condition is ensured by the above examples for possible constraints.

The visibility of the real image of direct-light source at finite distance translates into a given contribution to the luminance profile $L_{direct}$, which therefore should be within some limit in order not to spoil the depth effect. In other terms, if the above listed ideal constraints on $L_{direct}$ are fulfilled, the direct-light source 12 is not visible, the only visible object being the bright spot 40. In order to clarify the acceptable discrepancy, one should account that the observer 38 easily perceives very weak spatial variations on the object luminance as well as color distribution, provided that the angular frequency is not larger than the limit imposed by the eye resolution, i.e. 0.07°. This means that assuming a minimum distance of the observer 38 from the device 20 of 1 meter, for example, spatial variations of the direct-light source 12 are acceptable providing that they occur on a scale smaller than approximately 1 mm. The occurrence of luminance variation over large scale can be easily spotted by the eyes of the observer, at least if it occurs for $\vartheta > \vartheta_0$, where the vision is not saturated.

It is noticed that a background luminance of 10% of the maximum is a very high figure, which might, however, be acceptable in certain conditions such as conditions aimed at reproducing the sky and sun illumination at the very sunrise or sunset, i.e. when the luminance of the sun is not as high with respect to the luminance of the sky as during day time.

With any of the above outlined constraints, it is clear that these constraints are not fulfilled with the setup shown in FIG. 25, as the light source 902 would have to be placed incredibly far away from panel 906 in order to ensure the spatial uniformity of $L_{direct}$ and prevent shadows to be featured by radially symmetric outwardly pointing behavior. Moreover, the setup of FIG. 26, which represents an array of LEDs with dome concentrators, does not fulfill the constraints, both because the HWHM of the luminance is more than one order to magnitude larger than necessitated and because the resulting luminance shows strong spatial fluctuations for angles larger than the HWHM cone emission angle due to the pitch of the LED array and on a scale by far larger than 1 mm. It is worth noting that the desired specifications can also not be achieved even if the LEDs of the setup of FIG. 26 would be coupled, e.g. with TIR optical concentrators, or more generally, by any among the standard concentrators used in the field of non-imaging optics such as, e.g. compound parabolic concentrators (CPCs) devices. In fact, the transverse size that these optical elements should have in order to ensure the desired low divergence is fairly large, namely several centimeters if one considers the minimum size of currently available general lighting LED chips of about 1 mm and the need of coupling most of the LED general light to the optics. This means that, at least close to the first emitting surface, i.e. for observers as close as 1 m away from the first emitting surface, for example, the observer's eyes will see the bright spot 40 inside each single optics, i.e. the spot size is smaller than the optics size such as, for example, the spot is roughly 2 cm at 1 m distance for 1° full divergence. The observer who looks at such low divergence non-imaging optics at a short distance from it (see above) cannot perceive a true image of any round spot, and moreover cannot experience any infinite focal depth, because the luminance generated by such non-imaging optics is neither truly uniform (i.e. shift invariant) nor invariant with respect to the azimuthal angle. As a consequence, the two eyes will capture two images which (i) are in general not round, even if the emitting source, e.g. a LED, coupled to the optic is round and are not equal. The fact that the two eyes perceive different images is very detrimental with respect to what forces the two eyes to be set in parallel directions. Under this circumstance, it is much easier for the two eyes to focus on what, in contrast, is really seen as equal by both, i.e. the direct-light source object at finite distance. This spoils not only the roundness of the sun appearance, but also the infinite depth perception.

The just mentioned thoughts suggest that a further embodiment for the direct-light source 12 could even be construed in line with the structure of FIG. 26, if the following constraints could be fulfilled by the LEDs:

(i) The size of each LED (including the lens dome) in the direction perpendicular to the emission direction would have to be substantially reduced, i.e. it should be reduced down to 3 mm, advantageously 1 mm, most advantageously 0.5 mm. This would obey the uniformity constraint both in the on and off mode.

(ii) The ratio between the size of the LED emitter, i.e. the size of the phosphor or dye zone, i.e. its linear dimension which is typically about 1 mm for the smallest currently available general lighting LEDs, and the dome lens focal length, should be about 1/10 to 1/50 in order to guarantee divergences in the range of 1° to 5°. By considering for example 1° divergence and assuming a focal length of 1 mm and a dome diameter comparable to the focal length as would be needed to ensure maximum throughput, one would end up with LED emitter sizes below 20 μm.

(iii) Moreover, each LED emitter and its associated dome should be embedded into a micro dark box. This box should be covered by an absorber which substantially absorbs all the ambient light which crosses the dome lens apart from the ambient light which returns onto the LED emitter. In this case, the LED matrix would appear dark when lit by external light. Moreover, it should avoid scattered light from the surrounding of the LED (e.g. from the LED board) to be coupled with the lens dome.

(iv) The LED dome lenses could be antireflection coated in order to minimize reflection of ambient light back to the ambient.

Summarizing the above, the direct-light source 12 could be construed such that it comprises a 2-dimensional array of LEDs of special structure set out in more detail herein below with respect to FIG. 5. In particular, each of LEDs 44 comprise a light emitter 46, such as a light emitting diode comprising phosphor and/or dye or the like and a collimator, e.g. a dome lens 48, wherein the dome is positioned at a distance 49 from the light emitter 46 substantially equal to the dome focal length. Advantageously, the light emitters 46 have a circular cross section in a plane perpendicular to direction 32, in order to facilitate the achievement of a luminance distribution independent of the azimuthal coordinate. All internal surfaces of domes 48, but the windows 52 at the upstream side thereof through which the light emitters 46 emit their light, and the downstream ends thereof where the light collimating lens surfaces 54 are formed, are covered by a light absorber so as to form micro dark boxes as indicated at 56. As just described, surface 54 may be antireflection coated and the lateral dimension or width of the light emitting zones of the light emitters 46, i.e. 58, should be small enough so that the ratio between width 58 on the one hand and length 49 on the other hand is smaller than 1/10, advantageously smaller than 1/20, most advantageously smaller than 1/50. Additionally, pitch 50 should be smaller than 3 mm, advantageously 1 mm, most advantageously 0.5 mm. As mentioned before, the LEDs 44 may be packed closely such as in a hexagonal manner. The array of LEDs 44 would cover an area as wide as the first emitting surface 28.

Figure 4:
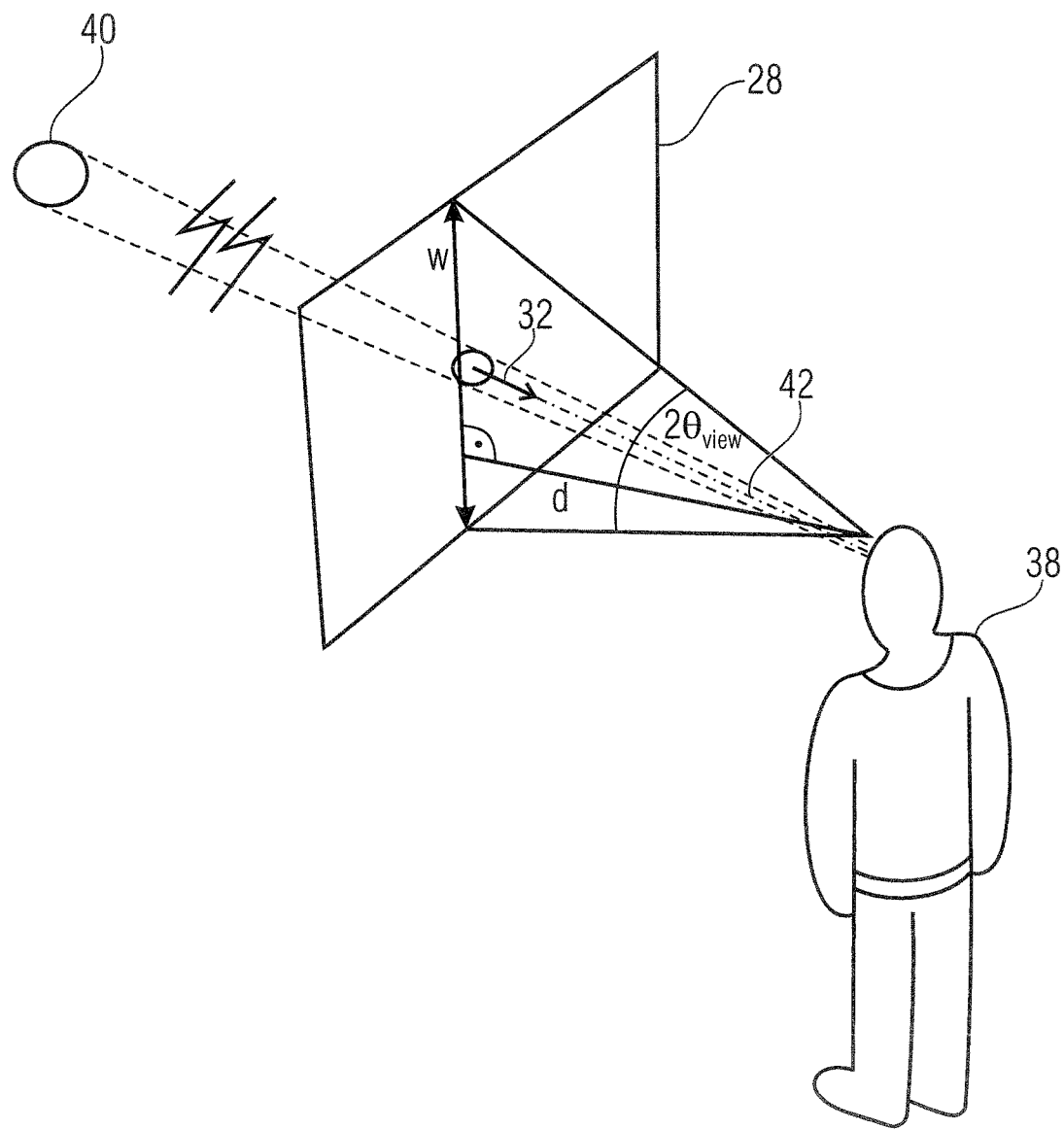
FIG. 4 shows schematically an observer looking onto the emitting surface of a direct-light source and the bright spot appearing for the observer when looking onto the emitting surface.

It should be mentioned that above characteristics of the direct light source's luminance profile are inherently met as long as direct-light source 12 and diffused-light generator 10 are construed such that an observer sees, when looking towards the first emitting surface (as well as the outer emitting surface), a bright spot which, when the observer 38 (co. FIG. 4) moves relative to the light-first emitting surface, moves relatively to the first emitting surface 28 as if the bright spot 40 stemmed from an object positioned at infinity. The first light component 241 has a correlated color temperature (CCT) which is lower than a CCT of the second light component 243. Note that the fact that the spot/sun which, when the observer moves relative to the first emitting surface, moves relative to the first emitting surface as if the bright spot stemmed from an object positioned at infinity, also entails that the "width" w of the first emitting surface which defines the "window" through which the viewer 38 feels to view, is greater than the spot/sun 40 such as, for example, for a target distance d of the viewer's eyes from the first emitting surface as large as 0.5 m (i.e. in the range 0-0.5 m), advantageously as large as 1 m, more advantageously as large as 3 m.

The latter distances stem for typical application sceneries of artificial illumination devices of embodiments of the present invention. In fact, if installed in the ceiling, considering that (i) typical ceiling heights are in the range 2.4-3.5 meters, (ii) typical height of a person is in the range 1.2 (considering children) to 1.9 m, and (iii) acceptable angles for the direct-light direction 32 with respect to the horizontal direction are in the range 45°-90° (in order to prevent the glare occurring when the light source is lower on the horizon), it emerges that, for an observer looking into the beam formed by the first light component 241 (the "sun beam"), the typical distance of the eyes from the first emitting surface ranges from 0.5 m (low ceiling, vertical light, tall observer) to 3 m (high ceiling, 45° light, child observer). In the case of window-like, wall-type, application, closer distances are possible (up to contact) whilst larger figures are virtually prevented, the height of the first emitting surface with respect to the floor being inherently lower for the wall than for the ceiling case.

In other terms, independently from the specific application, there is a typical maximum distance from which the device can be observed by an observer standing into the "sun beam" (i.e. the light beam formed by the first light component, 241). The condition for the first emitting surface of being greater than the perceived width of the spot/sun has to be fulfilled up to device-observer distance as large as said typical maximum distance. Note that, since the observer perceives the spot/sun under a given angle of view, the relative size of the perceived spot/sun with respect to the size of the first emitting surface naturally increases with the increase of the distance of the observer from the emitting surface, as it happens for the case of the real sun seen through a real window. However, said distance does not typically arbitrarily increase, for the reasons mentioned above.

Further, the fact that the spot/sun which, when the observer moves relative to the first emitting surface, moves relative to the first emitting surface as if the bright spot stemmed from an object positioned at infinity, also entails that when the viewer sees the artificial illumination device from a direction so that the "spot/sun" has "left" the first emitting surface, merely the "sky", i.e. the diffuse light, is visible. In even other words, when comparing, for each angular direction (θ,φ), the "background of the direct light 236" i.e. the tail of direct light's luminance profile outside the direct light's convergence cone, with the diffused light 242 produced by the diffused-light generator 10 (e.g. the outer light 239 along direction well separated from the direct light direction 32), then a crossover angle $\theta_{cross}$ measured relative to the direct light direction 32 may be encountered above which the luminance of the former falls below the luminance of the latter. $\theta_{cross}$ may, for example, be 3° or more advantageously 1° or even more advantageously 0.5°. This crossover angle should be smaller than the "view angle" $\theta_{view}$ (see FIG. 4) of the artificial illumination device, i.e. the half width angular aperture at which the device—to be more precise, the first emitting surface—is typically seen from viewers that are standing with theirs eyes under the beam formed by the first light component 241 (the "sun beam"). Applying above exemplary distances d, the view angle $\theta_{view}$ may be defined as the angular aperture for viewer's eyes at 0.5, 1 or 3 meter distance from the first emitting surface with the viewer concurrently seeing sun and sky. For example, the crossover angle may be X times the divergence angle of the direct light 236 with X being e.g. between 2-3, both inclusively, and the divergence angle being defined, for example, as the HWHM. The divergence angle may be smaller than 2.5°, 1.5° or 0.5°. This would imply that an artificial illumination device's first emitting surface larger than 2-3 times the bright spot would guarantee the viewer seeing both sun (first or low-CCT light component) and sky (second or high-CCT light component) concurrently, when the viewer's eyes are within the projection of the first emitting surface of the artificial illumination device along the direct light direction 32, or seeing merely the sky if the viewer's eyes away from the projection of the first emitting surface of the artificial illumination device along the direct light direction. Alternatively, the concurrence of the sky/sun visibility results when selecting the view angle of the device (i.e. the angle under which an observer standing into the "sun beam" sees the first emitting surface) to be greater than the crossover angle, such as greater than X times the crossover angle, wherein X may be 1.5, or 2 or even 3 ($\theta_{view} > X \cdot \theta_{cross}$). For example, the full width of the first emitting surface could be set to be larger than 2 times the product of: (i) 2 times the tangent of the crossover angle, and (ii) 0.5 m, 1 m or 3 m, with 0.5 m, 1 m or 3 m being chosen to be a typical maximum distance between viewer and artificial illumination device. For example, assuming a device featured by a crossover angle of 3°, the minimum width of the first emitting surface should be 10 cm, 20 cm or 60 cm (for the selected maximum distances of 0.5 m, 1 m or 3 m, respectively). This implies that an observer at some distance such as 0.5 m, 1 m or 3 m will see both sun and sky, where sky (or the "window") is sufficiently larger than the sun.

It should be briefly noted that above thoughts representatively referred to the first emitting surface assuming that the width thereof will substantially coincide with the width of the second and outer emitting surface, but these thoughts shall be interpreted as being readily transferable onto the outer emitting surface as well. Further, in case of different "widths" of the first emitting surface depending on the lateral direction inspected, same may, for example, denote the minimum width, i.e. in case of a rectangular shape of the first emitting surface the shorter side length.

Figure 5:
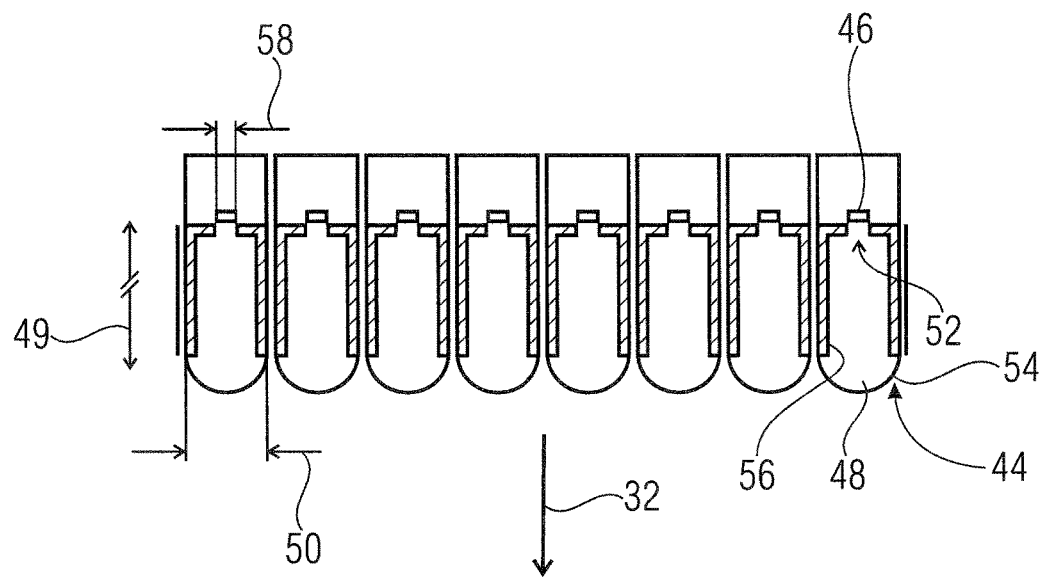
FIG. 5 shows a sectional view of an array of LEDs appropriately configured to result in an appropriate direct-light source in accordance with an embodiment.
Figure 6:
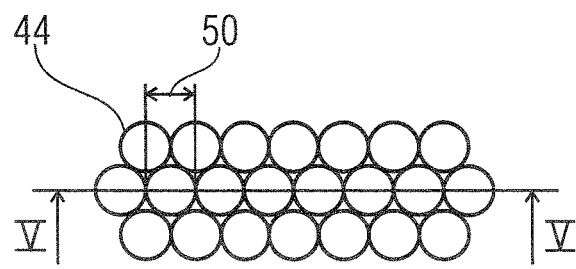
FIG. 6 shows a top-view of the array of FIG. 5.

Naturally, it is not necessary to implement the first light-emitting device/collimator pairs of FIG. 1 into individual LED devices 44 as shown in FIGS. 5 and 6. This is explained by way of the following embodiments.

Figure 7:
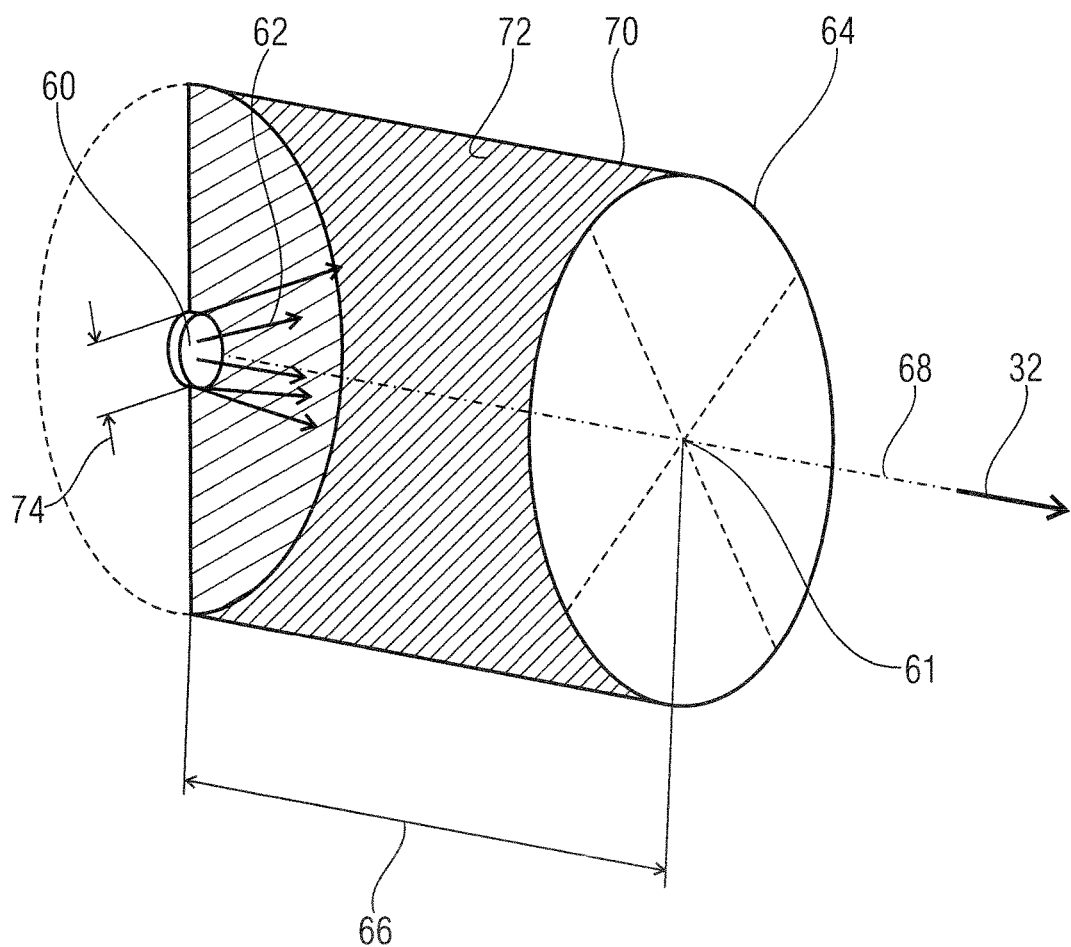
FIG. 7 shows a schematic partial perspective view of a direct-light source in accordance with an embodiment, comprising a pair of a first light-emitting device and a collimating lens.

FIG. 7, for example, shows the direct-light source 12 as comprising a first light-emitting device 60 configured to emit primary light 62 and a collimator in the shape of a collimating lens 64 positioned downstream to, and at a focal distance 66 from, the first light-emitting device along an optical axis 68 which coincides with the direct-light direction 32. Differently from standard lighting devices, e.g. the case of the LED dome lens featuring the embodiments of FIG. 25, in the present embodiment the lens 64 may be an imaging optical component, in the sense that the lens quality with respect to the given optical lay out parameters (i.e. the system numerical aperture, the distance between lens and emitting device, the ratio between focal length and transverse size of the emitting device, etc.) may be such as to ensure the lens to perform an image of the first light-emitting device 60 at infinity.

In order to achieve lower fabrication costs and structural compactness, the collimating lens 64 may be a Fresnel lens. The first light-emitting device 60, in turn, may be embodied as an LED.

With regard to the description of FIG. 7, it should be noted that the optical axis 68 may coincide with the optical axis of the collimating lens 64 or may be oblique thereto with the optical axis 68 then being defined by a line connecting the intersection 61 between the collimating lens' 64 principal plane (in case of two principal planes, the one positioned nearer to the first light-emitting device 60) and the lens' 64 optical axis, with a barycenter of the first light-emitting device's 60 light emitting zone. In the case of Fresnel lens 64, the Fresnel lens 64 may be oriented in parallel to the first emitting surface 28 or may lie within the same as further outlined below. In case of other collimating lenses 64, the same may apply for the principal plane. In any case, the lens' 64 aperture covers an area as wide as the first emitting surface 28.

The first light-emitting device 60 may have a circular aperture so as to result in a circular shape of the bright spot 40, in the observer's eyes focused at infinity.

As also shown in FIG. 7, the direct-light source 12 of FIG. 7 may additionally comprise an absorber forming a dark box 70 housing the first light-emitting device 60 and having an aperture where the collimating lens 64 is positioned, wherein an internal surface 72 of the dark box 70 is formed by a light absorbing material having an absorption coefficient for visible light greater than 70%, advantageously 90%, more advantageously 95%. An internal surface does not mean 100% of the internal surface but may relate to more than 90%, more than 80% or even more then 50% only. This results in obeying the reflectance luminance angular profile constraints.

It should be noted that FIG. 7 is illustrative with respect to many features and could be varied accordingly. For example, the collimating lens' 64 aperture does not need to be circular as depicted in FIG. 7. Alternatively, it may be rectangular, hexagonal or have some other polygonal shape. With respect to the shape of the dark box 70 and its internal surface 72, it should be noted that same does not need to be cylindrical with a top face coinciding with the collimating lens' 64 aperture and the first light-emitting device 60 being integrated into an aperture of the bottom face of the cylinder or positioned within the cylinder. Any other shape may also be valid as long as any direct light paths between the first light-emitting device 60 and the collimating lens' 64 aperture is left unblocked. For example, the internal surface 72 could extend between the cylinder shown in FIG. 7 and the frustum being non-concave, having minimum volume and extending between the light emitting zone of first light-emitting device 60 on the one hand and the aperture of the collimating lens 64 on the other hand.

In order to fulfill the above outlined possible constraints regarding the luminance profile $L_{direct}$, the ratio between the focal length 66 of collimating lens 64 on the one hand and the width 74 of the first light-emitting device's 60 aperture may be greater than 10 and advantageously greater than 50. The focal length 66 may, for example, be greater than 10 cm and advantageously greater than 20 cm. The area of the collimating lens' 64 aperture may, for example, be greater than 80 cm² and advantageously greater than 300 cm². The downstream face of collimating lens 64 may form the first emitting surface.

With respect to the values presented regarding the embodiments of FIGS. 5 to 7, it should be noted that the values presented for these embodiments with regard to for example the ratio between the focal length and the light emitting aperture, do not need to result in a complete obedience of the previously outlined constraints regarding the luminance profile. The embodiments of FIGS. 5 to 7 may be combined for example with subsequently described embodiments for micro-optics beam-homogenizer layer so as to fulfill the constraints. Accordingly, embodiments of FIGS. 5 to 7 may also form merely a part of the direct-light source 12, namely a collimated light source for generating pre-collimated light, e.g. a light beam with limited HWHM angular divergence (for example with HWHM angular divergence smaller than 2.5°) but featured by the presence of stray light at larger angles, as for example stray light leading to secondary peaks or spikes in the light-beam angular profile.

In any case, for a typical size of the Fresnel lens 64 of about 20 cm and for a typical distance between the lens 64 and the observer of about 1.5 m the configuration of FIG. 7 results in the angular divergence of the virtual image of the first light-emitting device 60 being smaller than the angular aperture with respect to the observer of the collimating lens 64, thereby ensuring that the image of the bright spot 40, i.e. the image of the first light-emitting device 60, appears as a luminous dot beyond the collimating lens' 64 aperture. That is, the image of the sun appears smaller than the aperture of lens 64 and the lens 64 itself is interpreted as a transparent window between the eye and the virtually distant object 40. An advantage of using a Fresnel lens as lens 64 is the technical possibility of achieving smaller output divergence angles. As an example, typical divergence angles of combinations of LEDs plus TIR lenses, for example, are of the order or larger than 8° to 10°. One of the main limits is due to the focal distance of the optical element, i.e. the TIR lens, which is of the order or less than 1 to 5 cm. In the case of the Fresnel lens, the focal length of such a lens may be of the order of 20 to 30 cm, for example. The output angular divergence is thus given by the ratio between the spatial aperture 74 of the first light-emitting device 60 (including or not including a primary optics element, such as an LED dome) and the above mentioned focal length 66. For a 1 to 2 mm LED as an example for the first light-emitting device 60, and a focal length of 20 to 30 cm, the divergence is of the order or lower than 1°.

A further advantage of the configuration of FIG. 7 is the absence of pixelation of the sun image. In the case of FIG. 26, the output divergence is likely to be larger than the angular aperture of the LEDs' optics with respect to the final observer in the final setup for a viewing distance, for example, of the order of, or larger than, 1 m and an aperture of the primary optics, i.e. domes, of the order of 1 cm resulting in an angular aperture of 0.6° to be compared to the output divergence of 8° to 10°. This determines a pixelation of the image over the different lens elements. Such a pixelation features an angular period definitely larger than the limit period for which the eye is not able to distinguish each single element. This fact along with the additional sensitivity of the eye to contrasts spoils the image effect of the infinite distance source by enabling the observer to actually see each single lens element of the structure of FIG. 26. This does not happen in the case of FIG. 7.

Figure 8:
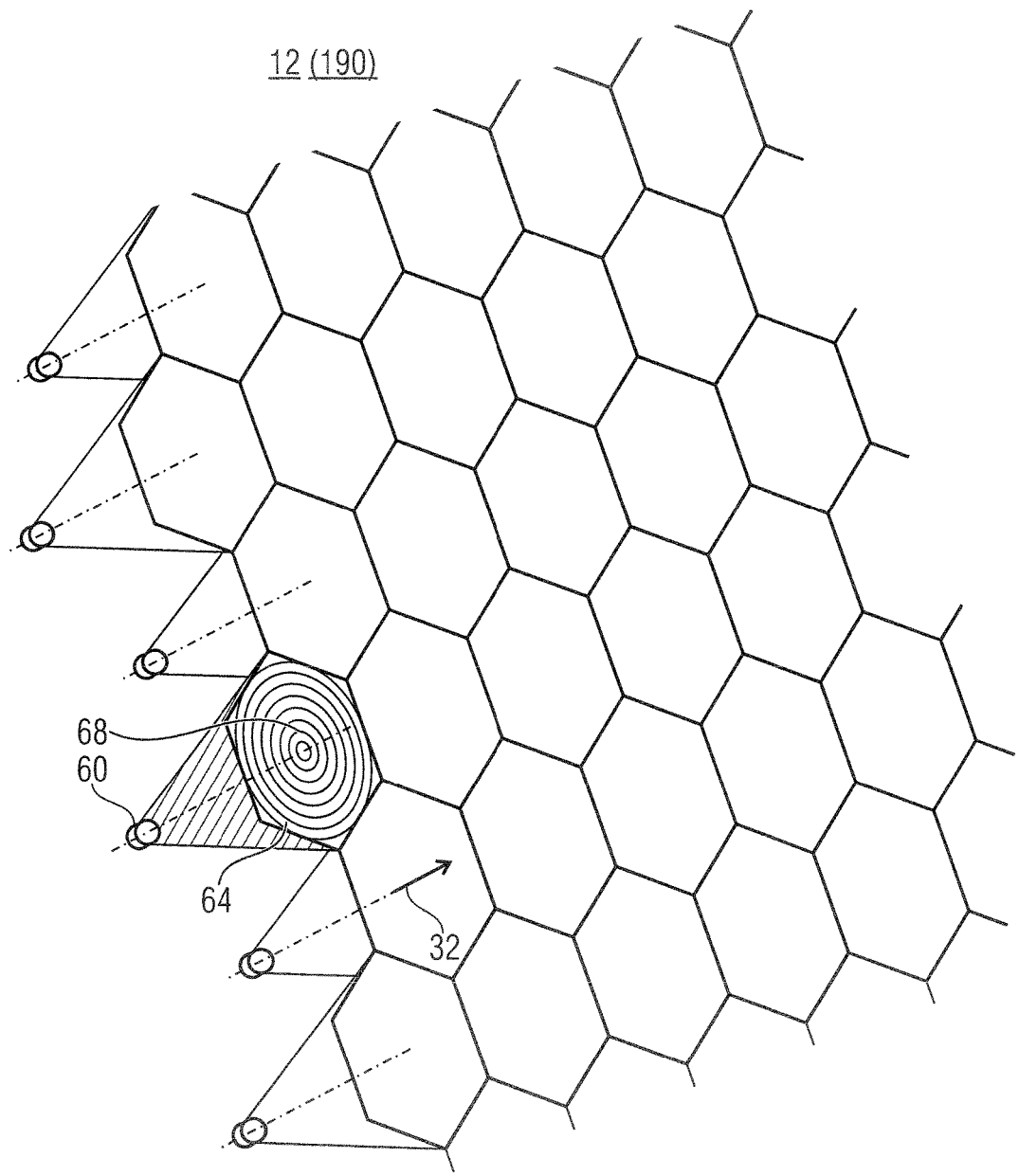
FIG. 8 shows 3-dimensionally an array of pairs in accordance with FIG. 7 so as to result in a direct-light source in accordance with a further embodiment.

As shown in FIG. 8, pairs of first light-emitting devices 60 and lenses 64 may be combined together and positioned in juxtaposition so that the collimating lenses 64 of the pairs abut each other so as to form a joined continuous surface. If the collimating lenses 64 are formed as Fresnel lenses as illustrated in FIG. 8 by circular lines within one of the lenses 64, then the array of Fresnel lenses may be easily formed by one continuous monolithic object such as plastic or glass. As in the case of FIG. 6, the pairs of first light-emitting devices 60 and collimating lenses 64 may be packed together along the 2-dimensional array of pairs in a hexagonal manner. Accordingly, the apertures of the individual collimating lenses 64 may be formed hexagonally. The optical axis 68 of the individual pairs of device 60 and lens 64 can be arranged to extend parallel to each other and the direct-light direction 32, respectively. The downstream face of lenses 64 could form the first emitting surface 28 or have, at least, an area being as great as the surface 28.

That is, in the case of FIG. 8, the direct-light source 12 comprises a 2-dimensional array of first light-emitting devices 60 which, as described above with respect to FIG. 7, may comprise a circular aperture in order to provide for a circular appearance of spot 40, a 2-dimensional array of collimating lenses 64, which are advantageously formed as Fresnel lenses, wherein the two arrays are registered to each other so that the optical axes 68 are parallel to each other and parallel to the direct-light direction 32. As described with respect to FIG. 7, the array of lenses and the array of first light-emitting devices may be displaced relative to each other such that the optical axes of the lenses 64 are offset from the positions of the first light-emitting devices so as to result in a direct-light direction 32 which is oblique relative to the plane within which the apertures of lenses 64 are positioned and distributed, respectively.

As already described above, by placing each collimating lens 64 at a distance from the first light-emitting device 60, which corresponds to, or is of the order of, the focal length of the collimating lenses 64, it is possible to achieve the low divergence constraint previously formulated. Since each collimating lens 64 is coupled to a single associated first light-emitting device, the first light-emitting device pitch is sizably increased relative to the configuration in accordance with FIG. 26, which means that higher luminous flux per first light-emitting device 60 is needed in order to have the same lumen per unit area. Notably, the collimating lenses 64 make with the eye lens of the observer a telescope which forms the first light-emitting device and its aperture, respectively, onto the retina. This is the reason why each first light-emitting device should have a circular aperture in order to form a circular image in the observer's eye, i.e. form the roundness of spot 40.

So far, the embodiments for direct-light source 12 showed the actual light emitting zone to be positioned downstream relative to some collimating lens along an optical axis coinciding with a direct-light direction. It should be mentioned however that the direct-light source 12 may comprise an edge-illuminated lightguide emitter panel comprising a wave guiding panel, operated via total internal reflection, one or more light source(s) coupled to an edge of the wave guiding panel, and a plurality of micro-optical elements such as microlenses. which contribute in extracting the light from micro mirrors within the wave guiding panel into the direct-light direction. Thus, while the embodiments of FIGS. 5 to 8 could be called "back-illuminated emitters", it should be noted that embodiments formed out of a "edge-illuminated lightguide emitter panel" could be used alternatively.

In particular, such an edge-illuminated light-guide emitter panel could have a light guide layer which, in turn, comprises a plurality of micro-reflectors at an interface between a light absorbing layer at an upstream/backward-facing side of the light absorbing layer on the one hand and the light guide layer on the other hand so as to redirect light internally guided within the light guide layer toward a light exit layer 124 at a downstream/forward-facing side of the light absorbing layer at an angle with respect to the normal to the interface between light-guide layer and light exit layer which is smaller than the limit angle for total internal reflection for the light guided within layer. Each micro-reflector would be positioned at a focal point of a respective lens formed on an outer, downstream facing, surface of the light exit layer facing away from the light guide layer. The combination of the micro-reflector and lens arrays thus constitutes a collimator to reduce the divergence of the output light.

Some of the embodiments for the direct-light source outlined above may suffer from strong spatial luminance modulation over the first emitting surface 28. For example, in case of the embodiments of FIGS. 7 and 8, the light illuminance over each collimating lens 64 is featured by such spatial modulation being, for example, a few times more intense at the center of the lens aperture than at the border of each lens 64. However, this leads in the embodiment depicted in FIG. 8 to an illuminance periodic modulation which is a problem in the case of using a Rayleigh-like diffuser as the diffused-light generator 10, which generates the diffused light by diffusing a portion of the direct light generated by the direct-light source at the first emitting surface with a Rayleigh-like dependency of the diffuse efficiency on the wavelength, i.e. the diffusion efficiency being stronger for shorter wavelengths than for longer wavelengths within the visible region. In such case, the just mentioned illuminance periodic modulation of the collimating lens 64 automatically translates into a periodic luminance modulation of the high CCT background of diffused light generated by the diffused-light generator 10 owing to the very high visual sensitivity to periodic luminance modulation. Such effect is detrimental with respect to the quality of the natural illumination.

A first solution to this problem is that of adding downstream to the outer emitting surface 37 a coffered ceiling structure, this structure having the same pitch, for example, as the collimating lenses 64 in case of the embodiment of FIG. 8 or having a pitch which is an integer multiple or a unit fraction of the pitch of collimating lenses 64.

For example, the coffered ceiling structure comprises a network of cells, which are formed by void volumes separated by walls, wherein said walls have negligible total transmittance and wherein said cells have an input facet F_IN lying in a plane parallel to the plane of outer emitting surface 37 and an output facet F_OUT, and wherein F_IN and F_OUT may or may not have the same shape and the barycenter of F_OUT may be offset relative to the projection of the barycenter of F_IN onto F_OUT along the direction 32 and each cell faces a lens 64, in the sense that F_IN is inscribed in the projection of the lens 64 or lens' 64 aperture onto the plane containing F_IN along the direction 32.

Figure 9:
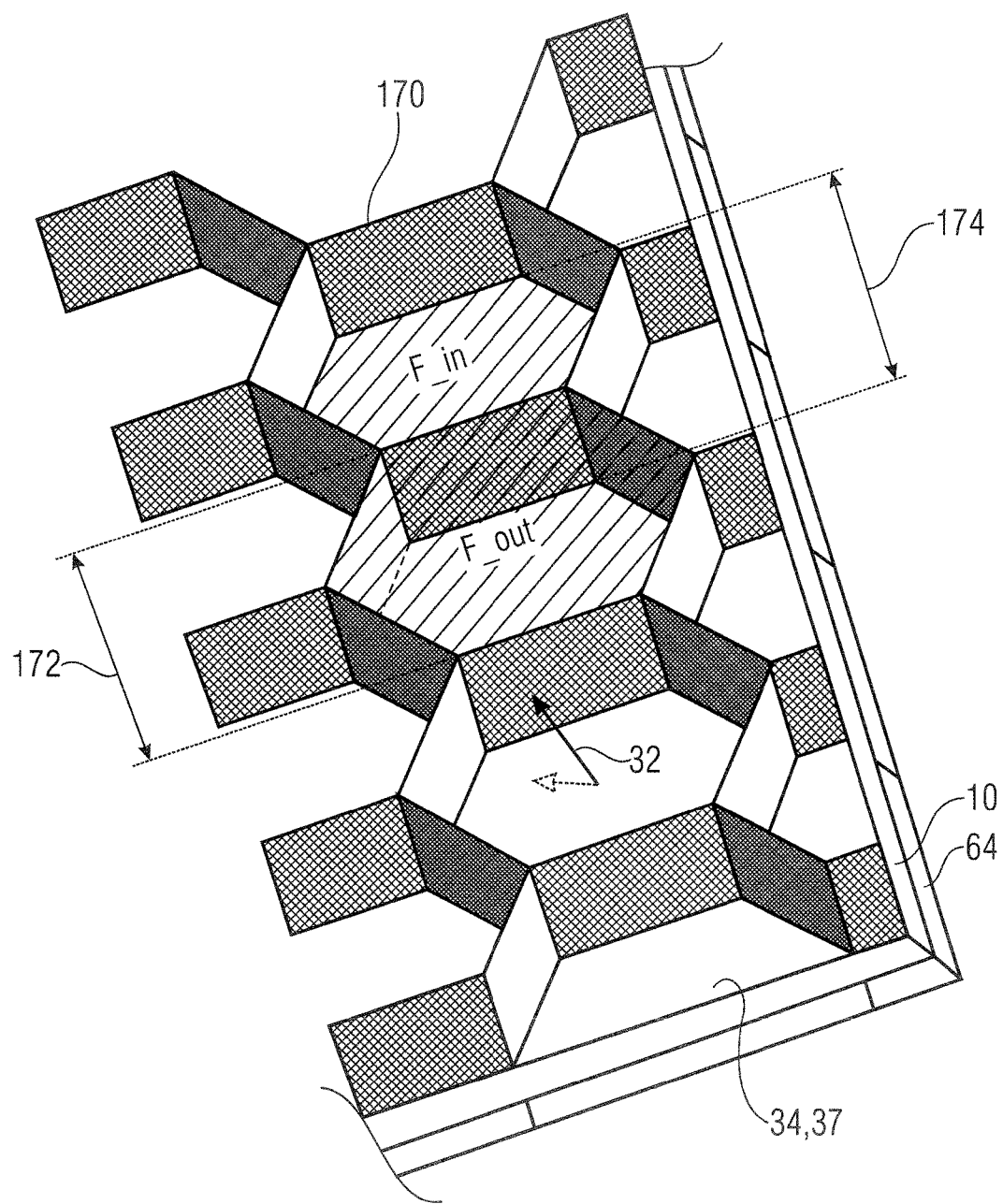
FIG. 9 shows a 3-dimensional view of a coffered ceiling structure for obfuscating luminance variations in lateral directions along the emitting surface.

See, for example, FIG. 9 which shows such a coffered ceiling structure 170 positioned downstream to the diffused-light generator 10 which is, exemplarily, embodied as a Rayleigh diffuser panel with regard to which further details are described below using the direct-light source 12 of FIG. 8. As can be seen in FIG. 9, the coffered ceiling structure 170 has a first periodicity 172 being identical to the periodicity 174 at which the collimating lenses 64 and their corresponding first light-emitting devices (not shown in FIG. 9) are distributed along the emitting surface 28 which extends between diffused-light generator 10 and the plane of the collimating lenses 64 in the case of FIG. 9. For sake of clarity, in the embodiment depicted in FIG. 9 the diffused-light generator 10 is positioned downstream of the first emitting surface 28 and thus constitutes the outer emitting surface 37. In general, the presence of the coffered ceiling structure 170 is not to be intended as limited to this case, but it applies also to the case in which the first emitting surface 28 is positioned downstream of the diffused-light generator 10, and constitutes the outer emitting surface 37, or to the case in which the first emitting surface 28 and the second emitting surface 34 of the diffused-light generator 10 coincide to form the outer emitting surface 37.

Moreover, the direct-light direction 32 could be taken into account to increase the effect of distracting the observer from realizing the illuminance periodicity originating from the illuminance modulation of the collimating lenses 64. For example, the walls or side surfaces of the coffered ceiling structure 170 could be oriented perpendicular to the outer emitting surface 37, while the direct-light direction 32 is tilted or oblique with respect to a direction parallel to the normal of the outer emitting surface 37. More generally, the direct-light direction 32 is tilted or oblique with respect to more than 90% of the outer surface of the coffered ceiling structure. In this manner, the observer sees alternate lit (low CCT) side surfaces of the coffered ceiling structure 170 (illustrated white in FIG. 9), and shaded (high CCT) side surfaces of the coffered ceiling structure 170 (illustrated with a shading in FIG. 9). This setting creates a strong intensity and color luminance spatial modulation, which is fully compliant with a natural effect, which will dominate over the luminance modulation caused by the inhomogeneous illumination of the collimating lenses 64. The same effect, however, may also be achieved by tilting the outer surfaces of the walls of the coffered ceiling structure 170. For example, the coffered ceiling structure's outer surface could be oriented such that in a projection along the direct-light direction 32 at least 30% of the outer surface of the coffered ceiling structure 170 is facing and at least 30% of the outer surface of the coffered ceiling structure 170 is averted. The latter circumstance would even be possible by arranging the direct-light direction 32 to be parallel to the normal direction of the first emitting surface.

Although FIG. 9 shows the coffered ceiling structure in connection with the embodiment for the direct-light source 12 in accordance with FIG. 8, it should be mentioned that the coffered ceiling structure is combinable with any embodiment of the direct-light source 12 including those described next. Moreover, periodicities such as periodicity 174 may also occur with other embodiments for the direct-light source and accordingly, the periodicity dependency could also be optionally applied to such other embodiments. Moreover, alternatively, the periodicity dependency could be selected such that the periodicity 172 is an integer multiple or a unit fraction of periodicity 174.

Figure 10:
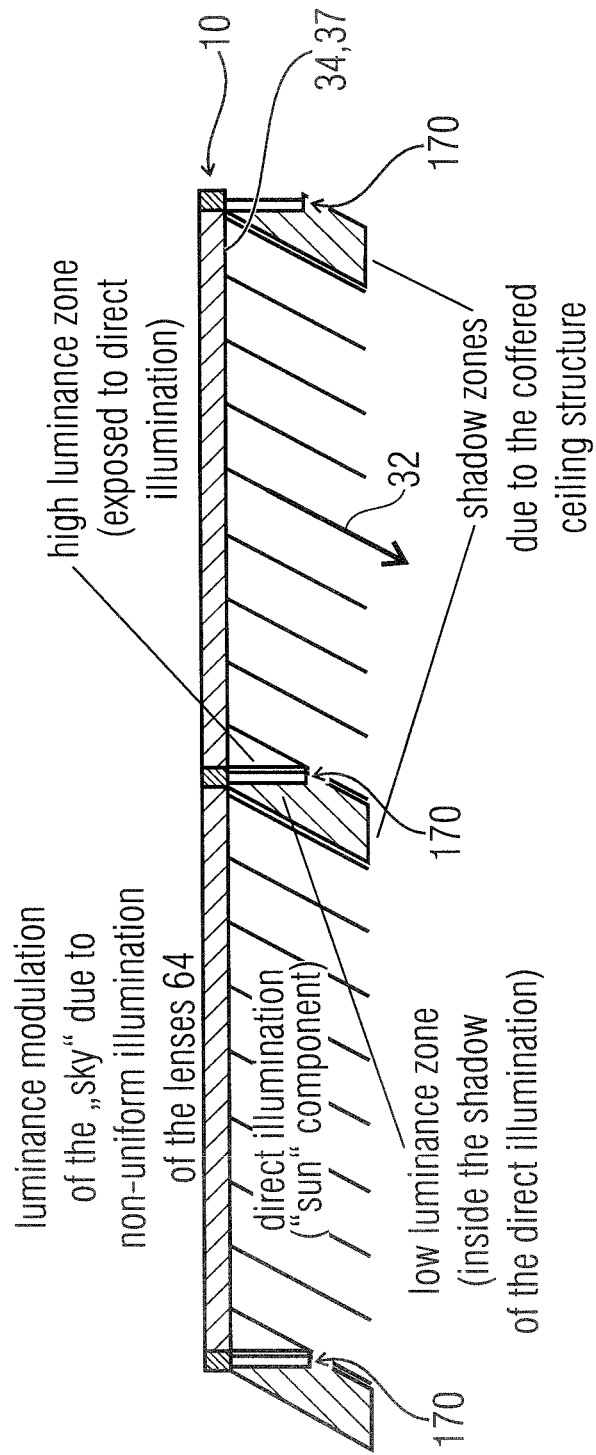
FIG. 10 schematically shows the way the coffered ceiling structure is seen by the observer and causes the obfuscation.

In order to clarify the coffered ceiling structure effect in more detail, reference is made to FIG. 10. FIG. 10 refers to the embodiment depicted in FIG. 9, in which the second emitting surface 34 of the diffused-light generator constitutes the outer emitting surface 37. The diffused-light generator 10 is again assumed to be a Rayleigh-like diffuser as will be outlined in more detail below. In particular, the coffered ceiling structure 170 overcomes the problem of intensity modulation of the artificial sky due to non-uniform illumination of the collimating lenses 64. In fact, a non-uniform illumination determines a non-uniform output light intensity along the spatial dimension of the lenses 64 themselves. Thus, non-uniform light impinging on the diffuser panel 10 determines a series of brighter and darker areas in the blue diffused light, i.e. brighter and darker zones in the "sky". Moreover, the array of collimating lenses (in the exemplary case of FIG. 8) plus diffuser panel determines a periodicity of such intensity modulations, which is easily spotted by the eye of the observer. The coffered ceiling structure 170 consists of a series of barriers extending between the individual zones of diffuser panel 10 (the second emitting surface 34 of which constitutes in this case the outer emitting surface 37) overlapping the individual lenses 64, and elongate outside the outer emitting surface 37, i.e. protrude therefrom. Since the direction of the collimated direct light component with lower CCT originating from the artificial sun, i.e. direction 32, may be tilted with respect to the direction perpendicular to the outer emitting surface 37, such direct light component can illuminate only one half of the side faces of the barrier structure 170. When looking at the ceiling, an observer will see the sky and part of each barrier 170. In particular, the observer will see between each high CCT zone of sky illumination either a part of the barrier 170 lit by direct illumination and thus with lower CCT, which may be called "white" barriers, or a part of the barrier falling into the shadow zone (thus partially illuminated by the diffused high CCT component, which may be called "dark" barriers). In both cases, the luminance of the barrier will be very different from the average luminance of the sky, much higher for the "white" case and much lower for the "dark" case. This alternation between sky zones and barriers with very different luminance helps in masking the modulation of the artificial sky, since the sky-to-"white" or sky-to-"dark" modulation is much stronger than the internal modulations of the sky itself, which stem from the unintended illumination modulations illustrated above. Such sky modulation then appears highly attenuated. The coffered ceiling structure 170 will then appear as a "white" and "dark" grid between the observer and an apparently uniform sky.

With regard to FIGS. 9 and 10, it should be mentioned that the term "coffered ceiling structure" as used herein so far should not be understood to restrict these embodiments to cases where the first emitting surface is arranged horizontally to form, for example, an artificial illumination device on the ceiling of a room. Rather, the term shall merely be understood to structurally describe the structure 170. Further, an outer surface of the coffered ceiling structure 170 may be selected such that same has an absorption coefficient for visible light less than 50%. That is, the ceiling structure is not an absorber. A projection of the coffered ceiling structure 170 onto the plane in which the first emitting surface lies, along the direct-light direction may cover less than 50% of the area spanned by the first emitting surface, i.e. the overall area of the first emitting surface, or even less than 35%, or even 15%. In this regard, please note that the apertures of the collimators 64 may be separated from each other by the coffering-ceiling structure—with the periodicities of the emitter/collimator pairs and the coffered-ceiling structure being equal to each other—rather than being partially covered thereby. The coffered ceiling structure 170 may protrude, perpendicular to the first emitting surface, by less than a period length of the coffered ceiling structure 170 from the first emitting surface, meaning that the aspect ratio between (as the numerator) the width of the "shining" areas not overlaid by the projection of the coffered ceiling structure 170 onto the first emitting surface along the direct-light direction, and (as the denominator) the "depth" of the coffered ceiling structure 170, i.e. its height along a direction perpendicular to the first emitting surface, is relatively large, such as greater than ¼ or even greater than ½.

Some interesting features of above embodiments are summarized below:

Both the sky and the sun are simultaneously visible by an observer watching the luminaire, i.e. an observer can see the same sky-sun image as he sees when looking at a window of the same size as the luminaire or first (as well as outer) emitting surface. To this end, the divergence of the direct light 236 is selected to be smaller than the view angle under which the observer sees the luminaire from some appropriately selected maximum distance between luminaire and viewer's eyes. As motivated above, such typical maximum distance may be 0.5 m, 1 m, or 3 m. The half width divergence may be smaller than X times the half width view angle at the respective maximum distance, i.e. $\theta_{HWHM} < X \cdot \theta_{view}$, wherein X may be, for example, 2, 3, or 4. In accordance with some embodiments, the full width divergence may be set to be in the range given by 3 times the full width view angle under which an the observer's eyes lit by the first light component see the first emitting surface from a distance in the range of 0.5 m-3 m, advantageously 1 m-2 m, more advantageously from 1.5 m.

As to the relative luminance of the two sources (direct light and diffuse light) at specific angles, above description revealed the fact that the "tail" of the direct light's luminance profile is sufficiently below the diffuse light luminance. In fact, if the luminaire is seen by an observer under a 30° full-width view aperture angle, for example, and the direct light has only 10° full-width divergence, but the tails of the direct light at 15° far from the direct light direction 32 still provide the first emitting surface with a luminance which is comparable or higher than the luminance caused by the diffused light onto the second emitting surface, no sky would be visible for the given observer under the sun beam. Therefore, to achieve the sky/sun effect, independently from the divergence of the direct light 32, an angle should exist, called crossover angle in the above description, above which the overall luminance of the device should be dominated by sky contribution (high-CCT contribution), this angle being smaller than the view angle under which an observer sees the entire system at an appropriately selected maximum distance for which examples have been given above. In accordance with some embodiments, the crossover angle may be set to be in the range given by 2 times the half width view angle under which the observer's eyes lit by the first light component see the first emitting surface from a distance in the range of 0.5 m-3 m, advantageously 1 m-2 m, more advantageously from 1.5 m. By this measure, a viewer may see both sky and sun.

As to the spatial uniformity of the high CCT light (diffuse light) it should be noted that some sort of variation may be admissible without the above-described infinity-depth impression being destroyed. For example, if the collimator's aperture of the collimators of the emitter/collimator pairs is large enough, a luminance change range of 3 times the minimum luminance could be acceptable. As we know, a poor uniformity in the sky luminance becomes really detrimental when the sky element gets small because what is detrimental is the spatial gradient of luminance and, even worse, when an array of modules is implemented, thus leading to a periodic modulation. In this case, in fact, the eyes of the observer will unavoidably focus and converge onto the luminaire, thus spoiling our infinite depth effect. However, in in that case, some modulation may be allowed using, for example, the coffered ceiling structure described above.

As to the angular distribution of the direct light, i.e. the presence of stray white light at large angles (i.e. at angles that compete to the sky, and not to the sun image formation), the intensity of the sun light should not overcome that of the blue light. In addition, considering the fact that the eyes are mostly sensitive to luminance variation, the occurrence of relevant luminance gradients due to stray light caused by the direct light contribution at large angle at large are very detrimental both for what concerns the natural appearance of the sky and the effectiveness of the mechanism producing the infinite depth perception. Notably, this limitation may occur even stay light luminance contribution below the luminance produced by the diffused light generator. This issue may arise, for example, when using Fresnel lenses for collimating the direct light, due to the imperfection or inherent non-ideality of the Fresnel lenses leading to stray light caused by scattering, secondary internal reflections, etc. Such stray light may cause the lens to be seen and perceived as a physical object, thereby causing the viewer to accommodate his view at the luminaire, instead that at the infinity. Possible counter measures for stray light have been described above such as the use of the filter 260 or the homogenizer.

In particular, for preventing the just-outlined stray light effect to occur above embodiments revealed: (i) an antireflection coating of the Fresnel lens; (ii) a beam homogenizer made as a tandem lens array, which smears the luminance peaks at large angles over a broad angular domain, thus bringing the said stray light luminance below the luminance of the sky, and markedly reduces stray-light spatial luminance fluctuations too; (iii) a angularly selective filter which absorbs the undesired stray light occurring at angles over some threshold; (iv) the low angle white light diffuser, which (on average) produces a convolution of the angular spectrum with the filter impulse-response function; any combination of the means of above. Note that aliasing effect can occur due to the beating in the periodicity of the Fresnel lens, which has radial symmetry, with the periodicity of any of these homogenizer settings. The just-mentioned aliasing effect may be reduced by appropriately selecting the ratio of periodicityies of the Fresnel and homogenizer micro-milli structure.

In order to enhance spatial uniformity of both direct and diffused light, a free-form optical element (e.g. a free form lens or mirror) positioned between the direct light source and the lens, as well as the combined design of free-form and Fresnel lens profile, can be appropriately selected.

A further problem of using a Fresnel, as well as of any refractive element, concerns the chromatic aberration. With this respect, one can address special design of the Fresnel (e.g. which comprises both refractive and diffractive patterns, which have chromatic aberration of the opposite sign) which minimize this effect. In addition or in alternative, one can consider to position downstream the lens a low-angle diffuser which washes out the aberration, which typically occurs over 1 deg, by means of the convolution of above In addition, the above concept of the coffering structure allow the device to properly perform even in the absence of said desired sky and sun uniformity.

As also described above, to obtain a natural appearance of the artificial light, the sun light should be stronger than the sky light such as for example, the low-CCT light should be 8 to 2 times stronger than the high-CCT light when integrated over all angles, while the peak luminance should be much stronger such as 50-100 times.

Again for the implementing the natural effect, the Fresnel lens should, as described above, not be round but square or better hexagonal and abutting each other, to cover the full ceiling area.

Finally, it should be noted that the coffered ceiling structure 170 is advantageous not only with respect to combinations of the direct-light source 12 with a Rayleigh-diffuser as the diffused-light generator 10, but also with respect to other embodiments where the diffused-light generator 10 is composed of a diffused-light source, embodiments for which are described in more detail below. And again, the structure 170 is also combinable with any other source 12, and also in the cases in which the diffused-light generator 10 is positioned upstream relative to the first emitting surface 28, provided that the structure 170 is positioned downstream of the outer emitting surface 37.

With respect to the embodiments of FIGS. 7 and 8 it should also be mentioned that the problem just described, namely the problem regarding the non-constant illumination across the collimating lens' aperture, might also be addressed by the usage of primary lenses or mirrors, such as freeform lenses or free-form mirrors, placed downstream the first light-emitting device 60 between the first light-emitting device and the collimating lens 64, advantageously nearer to the first light-emitting device 60, in order to provide a homogeneous illumination of the collimating lens 64 across its aperture. In other terms, the freeform lens is configured to flatten the illuminance distribution of the primary light onto the collimating lens.

Figure 11A:
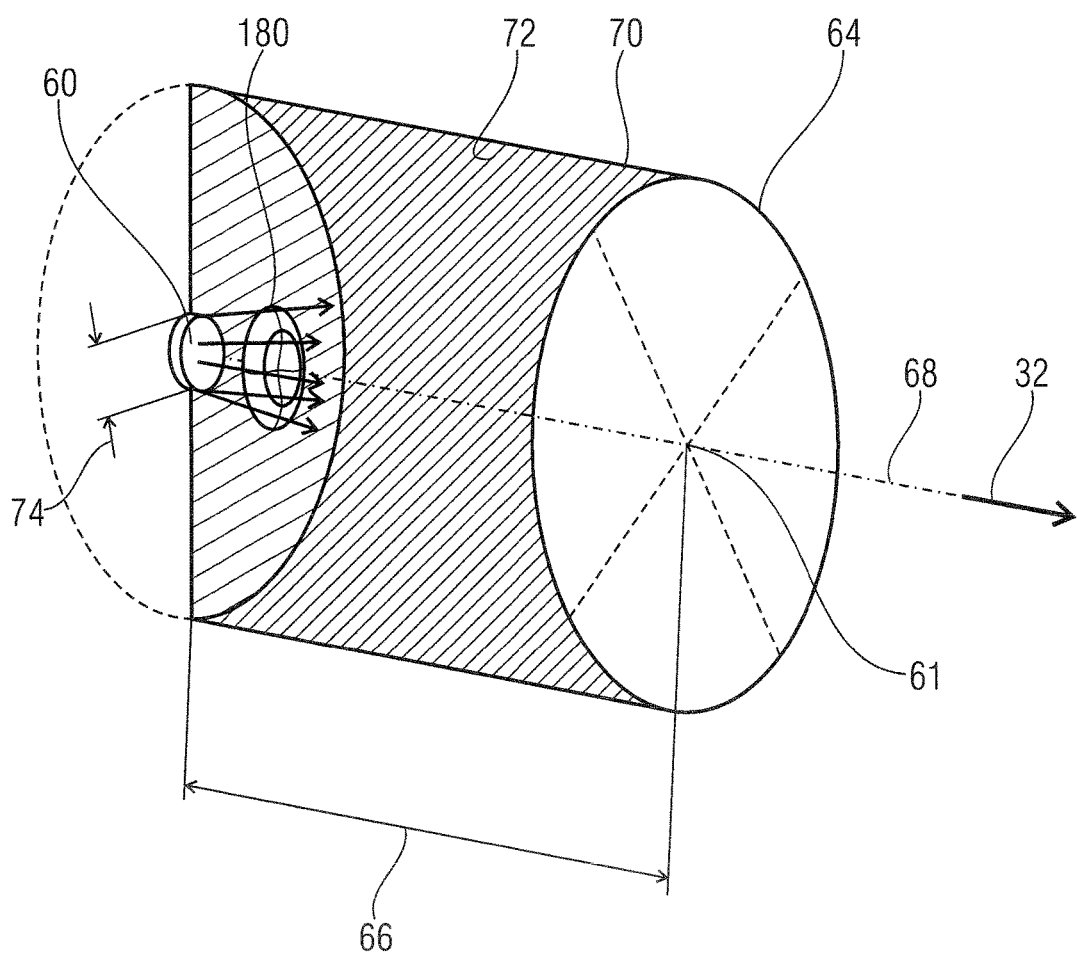
FIG. 11a schematically shows the direct-light source of FIG. 7 including a freeform lens for achieving a homogeneous illumination.

Exemplarily, FIG. 11a shows a freeform lens 180 positioned between the first light-emitting device 60 and its collimating lens 64 along optical axis 68. Naturally, such freeform lenses 180 may also be used in the embodiment of FIG. 8 with respect to each pair of first light-emitting device 60 and collimating lens 64.

Figure 12:
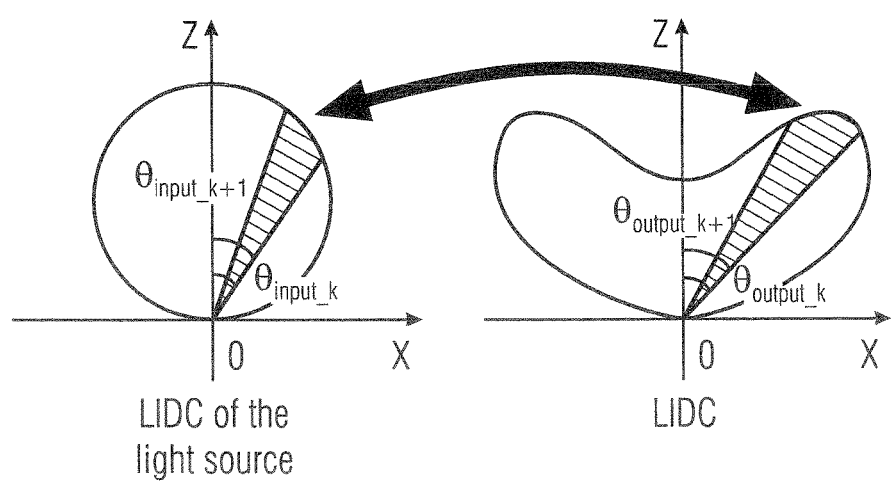
FIG. 12 schematically shows the targeted influence of the freeform lens and the light concentrator of FIGS. 11a and 11b onto the light intensity distribution curve of the first light-emitting device with the left hand side showing the original distribution curve and the right hand side showing the target distribution curve for achieving a homogenous illumination in lateral dimensions along the emitting surface.

In order to understand the issue of the freeform lens better, reference is made to FIG. 12. The requirement of uniform illumination improves the final perception of the artificial illumination device by means of a uniform sky appearance as already described above with respect to FIGS. 9 and 10. However, due to the propagation of light between the first light-emitting device 60 on the one hand and the collimating lens 64 on the other hand, the illumination distribution over the input surface (aperture) of lens 64 is in general non-homogeneous. Moreover, in order to minimize loss of light, a further requirement for the light distribution at the input surface of the lens 64 is that the illuminance rapidly decreases outside the area of the aperture of lens 64.

A second important point is the visual appearance of the source 60 in the observer's eye. Since a circular image of the artificial "sun" shall be obtained, a circular appearance of the first light-emitting device 60 is needed. Freeform lenses could achieve one or possibly most of the previous requirements. In particular, the requirement of uniform illumination may be tackled by using an optical element which redirects light propagating around the axial direction with low propagation angle towards the outer region of emission, as shown on the left hand side of FIG. 12.

After a certain propagation distance, such intensity profiles achieves a sufficient uniformity on the target.

In a particular embodiment, the freeform lens 180 features a circular shape in order to facilitate the visual appearance of a round source of light when the freeform lens 180 is imaged by the eye of the observer through the lens 64.

Finally, it should be mentioned that optical components different from freeform lenses could also be used for the previous requirements. For example, reflective compound parabolic concentrators CPCs may be used to achieve uniform illumination onto lens 64. Analogously to the freeform lens case, the output aperture of such CPC elements may be circular in order to facilitate the visual appearance of a round source of light when the output aperture of the CPC is imaged by the eye of the observer through the lens 64.

Figure 11B:
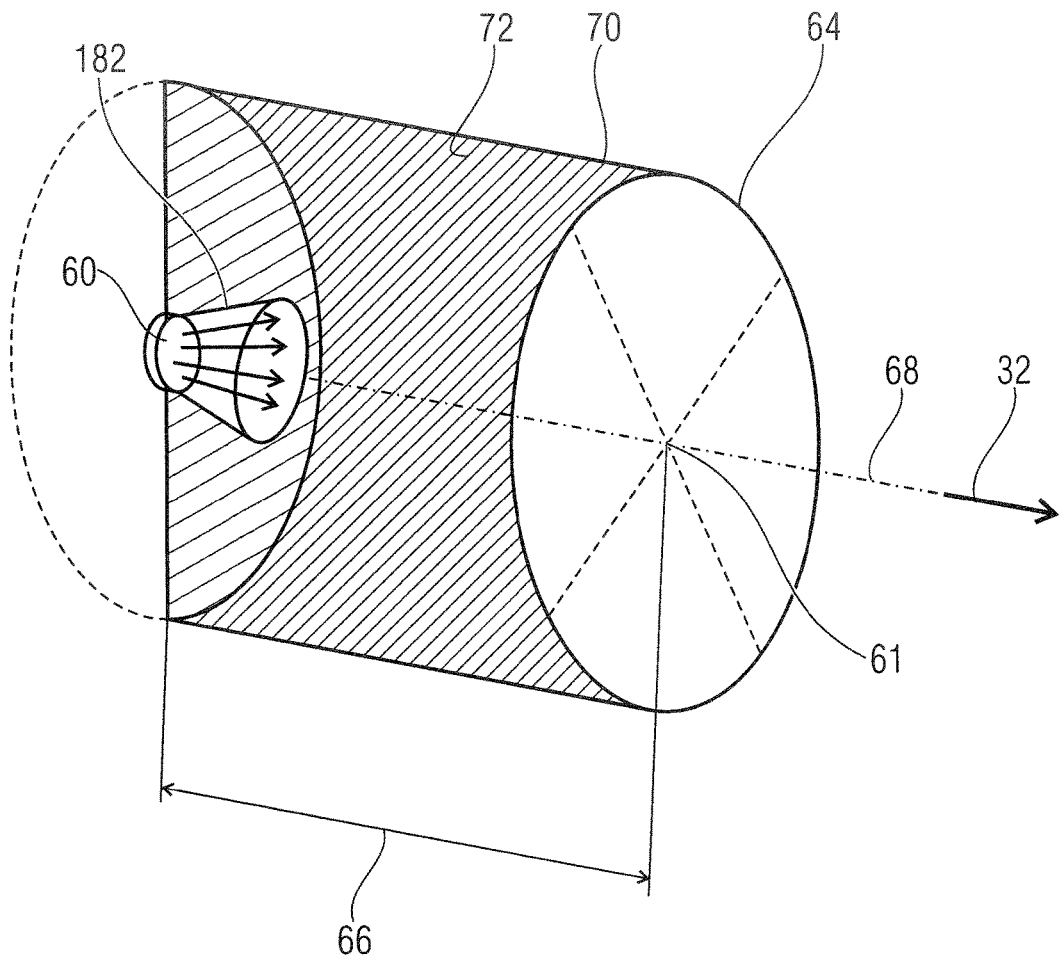
FIG. 11b schematically shows a direct-light source of FIG. 7 including a light concentrator for achieving a homogeneous illumination.

For the sake of completeness, FIG. 11b shows the alternative of using such a reflective CPC 182 in front of, i.e. downstream, the first light-emitting device 60.

In the cases of the embodiments shown in FIGS. 11,b and 12 the width 74 of the first light-emitting device 60 and distance 66 between first light-emitting device 60 and lens 64 are corrected in order to account for the differences in construction, due to the presence of the freeform lens 180 or CPC 182.

Notably, the embodiment of FIGS. 11,b and 12 are also combinable with the embodiment of FIG. 8. Further, the embodiments of FIGS. 11,b and 12 are also combinable with the embodiments of FIGS. 9 and 10.

Figure 13:
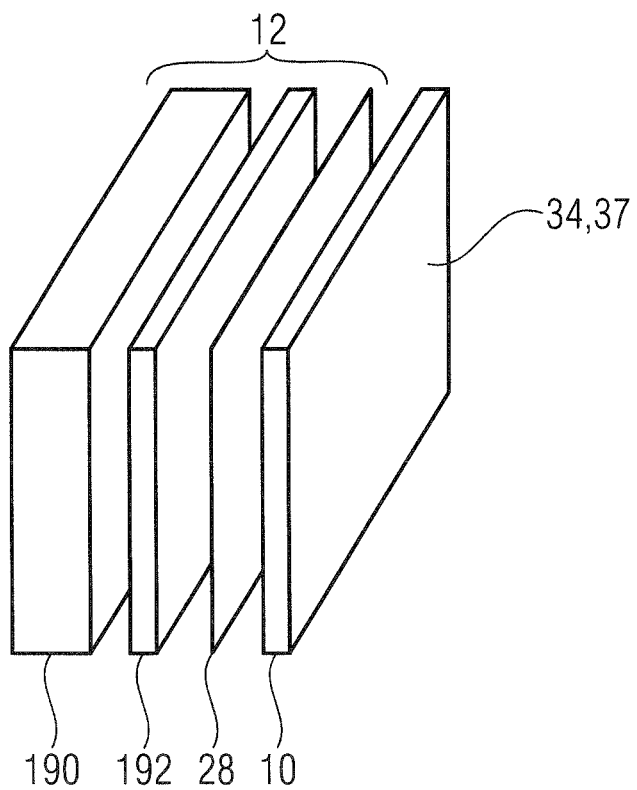
FIG. 13 schematically shows an artificial illumination device with a direct-light source 12 including a micro-optics beam-homogenizer layer.

The embodiments for the direct-light source 12 provided so far may in some cases exhibit minor problems in achieving the sky/sun-window appearance or above identified luminance angular profile constraints due to, for example, scattering problems or the like. In accordance with the embodiments further outlined below, these problems are addressed by using any of the above outlined embodiments for the direct-light source 9, namely the ones described with respect to FIGS. 5 to 8, 11a,b and 12, with any of the micro-optics beam-homogenizer layers described next in that the aforementioned embodiments for direct-light source 12 are used as a collimated light source 190 for generating a pre-collimated light front with a micro-optics beam-homogenizer layer 192 being positioned downstream the collimated light source 190 and upstream the diffused-light generator 10 with the first emitting surface 28 being positioned between beam-homogenizer layer 192 and diffused-light generator 10, or positioned downstream of the diffused-light generator 10. The micro-optics beam-homogenizer layer 192 thus positioned is able to transform a first collimated beam featured by the presence of stray light that impinges onto said homogenizer layer 192 from the collimated light source 190 into a second collimated beam with divergence equal to or larger than the divergence of the first collimated beam and which is free from stray light. Such second collimated beam thus exit the first emitting surface 28 towards the diffused-light generator 10 as depicted in FIG. 13. In a different embodiment, the first emitting surface 28 is positioned downstream of or coincides with the second emitting surface 34 of the diffused-light generator 10, thus this second collimated beam exiting the beam-homogenizer layer 192 impinges onto the diffused-light generator 10 towards the first emitting surface 28.

Stray light as just described may for example stem from non-ideal behavior of some Fresnel lenses in the case of using Fresnel lenses in order to embody the collimating lens 64. Owing to scattering from the groove tips of such Fresnel lenses 64, multiple internal reflection, etc., the Fresnel lens 64 lit by the first light-emitting device 60 may have a luminance profile which does not go to zero out of the narrow peak 30. In contrast, it may be featured by a residual profile, which is also structured both in angle and in position, which finally might make the Fresnel lenses 64 a clearly visible and luminous object in embodiments of FIGS. 7 and 8, where in contrast a complete dark or uniform background would be needed. Problems like this may also occur with respect to the other embodiments for the direct-light source and collimated light source 190, respectively, described so far.

Even if such luminance background is low, e.g. below 1% of the peak luminance value, due to its inhomogeneity and due to the transparency of the diffused-light generator 10, such luminance background may be visible thus spoiling the quality of the natural sky. In order to solve such a problem, a micro-optics beam-homogenizer layer 192 may be used, for which specific embodiments are described further below.

Figure 14A:
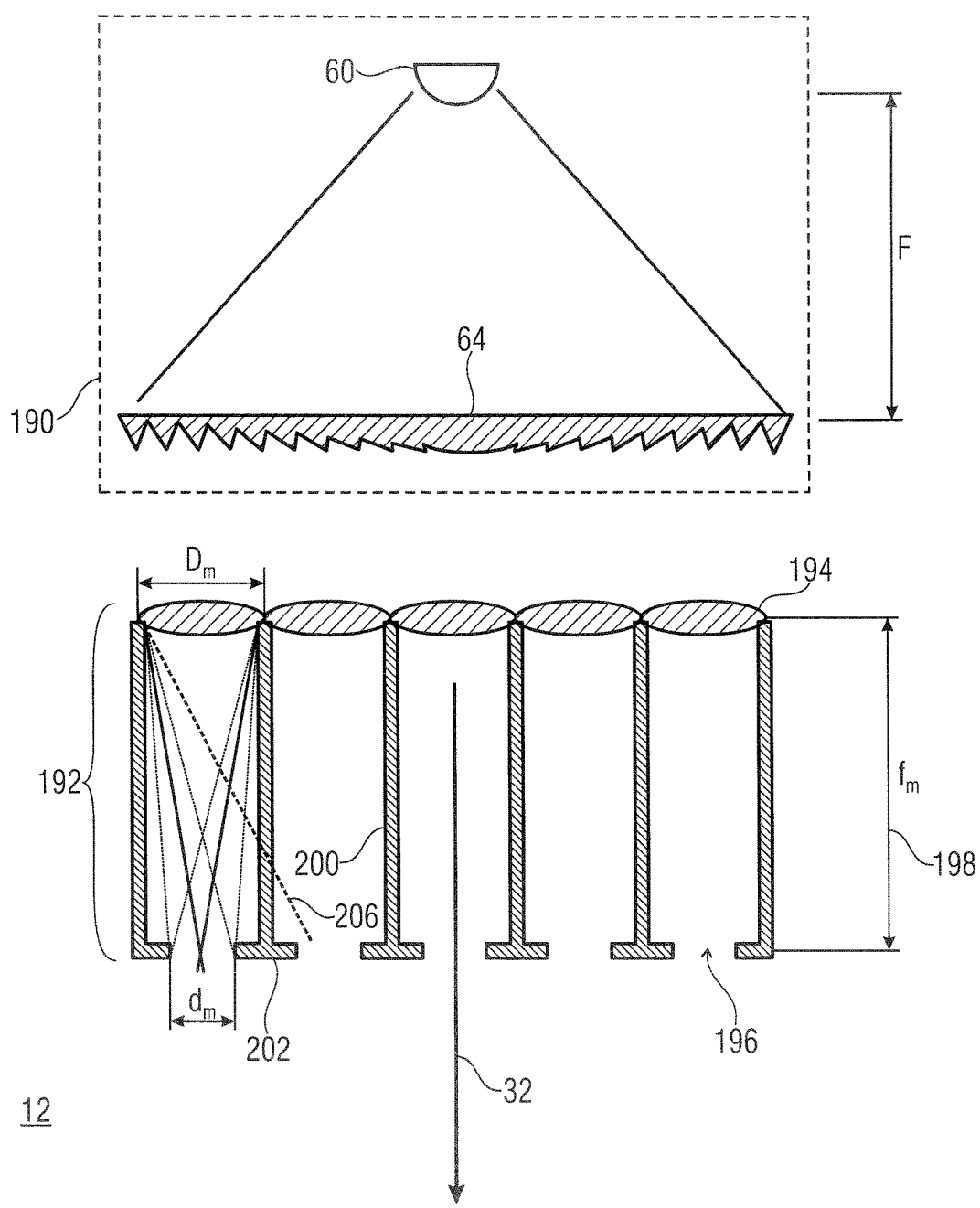
FIG. 14a schematically shows a cross section of a micro-optics beam-homogenizer layer in accordance with a first embodiment where same comprises one lens array and one pinhole array.
Figure 14B:
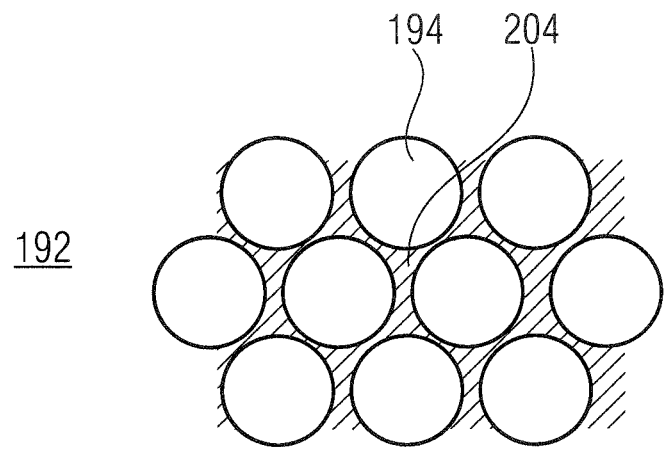
Figure 14C:
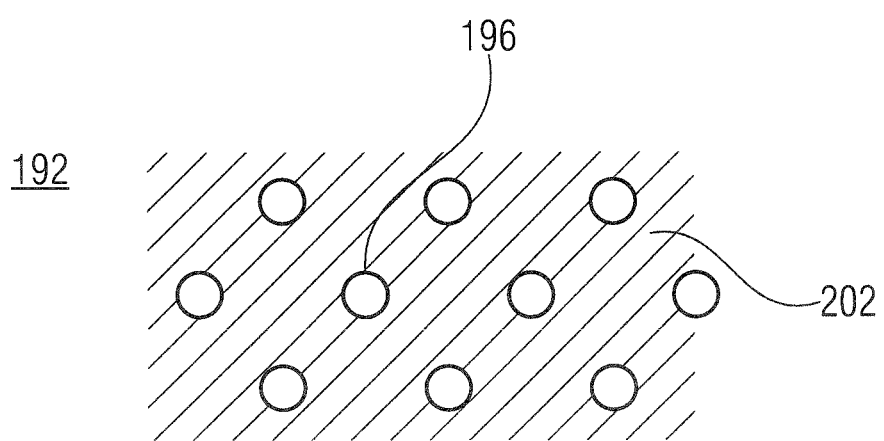

A first embodiment for the micro-optics beam-homogenizer layer 192 is described with respect to FIG. 14a-c. FIG. 14a-c shows exemplarily a combination of a light emitter and a collimator such as a first light-emitting device 60 and a Fresnel lens 64 as an example for the collimated light source 190, but as already stated in the preceding paragraph, the beam-homogenizer layer 192 exemplified in FIG. 14a-c is combinable with any of the embodiments for the direct-light source 12 described so far above in order to result in further embodiments for the direct-light source 12 comprising a combination of collimated light source 190 and beam-homogenizer layer 192.

The micro-optics beam-homogenizer layer 192 of FIG. 14a-c comprises a 2-dimensional array of microlenses 194 and an absorber shaped as an absorbing layer 202 perforated by a 2-dimensional array of pinholes 196 positioned and extending downstream the 2-dimensional array of microlenses 194 so that each microlens 194 has a pinhole 196 associated therewith. The embodiment of FIG. 14a exemplarily refers to the case in which the direct-light direction 32 is perpendicular to the plane containing the 2-dimensional array of microlenses 194. Each pinhole 196 is positioned at a distance to the respective microlens 194 corresponding to a focal length 198 of the respective microlens and at a direction coincident with a direct-light direction 32. For reasons set out in more detail below, the microlenses 194 advantageously have a circular aperture with a diameter $D_m$. Advantageously, the diameter $D_m$ is smaller than 5 mm, more advantageously smaller than 3 mm, even more advantageously smaller than 1.5 mm. Advantageously, the microlenses 194 are packed together into the 2-dimensional array as closely as possible, i.e. at the highest possible density, and accordingly the number of microlenses 194 facing one collimating lens 64 in accordance with any of the embodiments of FIGS. 7 and 8 as a collimated light source 190 will very likely be higher than illustratively shown in FIG. 14a-c. For example, the pitch at which microlenses 194 and pinholes 196, respectively, are arranged within their 2-dimensional arrays, may be equal to diameter $D_m$ or at least smaller than $1.5 \times D_m$.

Further, the focal length $f_m$ 198 of the microlenses 194 may be chosen so as to obey $D_m/f_m < 2 \cdot \tan(7.5°)$, advantageously $<2 \cdot \tan(5°)$, most advantageously $<2 \cdot \tan(2.5°)$. The diameter of the pinholes 196, which exemplarily may also be of circular shape, is chosen in accordance to the HWHM divergence $\vartheta_{IN}$ of the collimated light impinging onto the beam-homogenizer layer 192 from the collimated light source 190, e.g. $d_m$ may obey $d_m \geq 2f \tan(\vartheta_{IN})$.

Using these constraints, the above constraints put onto the luminance profile $L_{direct}$ could be achieved at the downstream side of the beam-homogenizer layer 192 which would, in accordance with the embodiment of FIG. 14a-c, form the first emitting surface 28. In a different embodiment, as described below, the first emitting surface 28 may be positioned downstream of the beam-homogenizer layer 192, so that the constraints on the luminance profile $L_{direct}$ would be achieved only at this surface. In case of the shape of the pinholes 196 being non-circular, $d_m$ may denote the diameter of a circle having the same area as the pinholes 196.

As also shown in FIG. 14a-c, the micro-optics beam-homogenizer layer 192 may further comprise an absorber shaped as channel separation structure 200 configured to reduce crosstalk between neighboring pairs of microlenses 194 and pinholes 196. In particular, the channel separation structure 200 may be formed by tubes, each extending along direction 32 with one of the microlenses 194 positioned at an upstream side of the respective tube and one of the pinholes 196 positioned at a downstream side thereof. Advantageously, the channel separation structure 200 absorbs light in the visible region and has, for example, in the visible an absorbance of higher than 70%, advantageously 90%, more advantageously 95% for light impinging onto the channel separation structure 200. The channel separation structure 200 may also fill space 204 between the microlenses 194 as shown in FIG. 14b.

The embodiment of the beam-homogenizer layer 192 thus employs the use of a layer of lenses 194 facing the inbound collimated light front emitted from the collimated light source 190, followed by an absorbing mask 202 placed in the focal plane of these lenses 194 with a series of pinholes 196. The center or very center of each pinhole 196 corresponds to the center or very center of a lens 194 of the lens array under direction 32, i.e. the lens 194 and pinhole 196 arrays are registered one with respect to the other. By means of this configuration, the output angular profile $L_{direct}$ exhibits a flat-top distribution featuring the same shape of the aperture of lenses 194, i.e. it is a square flat-top if square type lens apertures were used or hexagonal if hexagonal apertures were used for lenses 194. In order to have a circular image of spot 40 in the observer's eyes, it is thus necessitated to have lenses 194 with circular aperture. The space between the apertures, i.e. space 204, should be light absorbing such as blackened with an absorbing layer. The divergence as measured, for example by $\vartheta_{HWHM}$, of the output beam is related to the focal length $f_m$ and the full diameter $D_m$ of the lenses 194 as $\vartheta_{HWHM} \approx \arctan(D_m/(2f_m))$.

The divergence of the beam impinging from the collimated light source 190 onto the array of lenses 194 affects the output divergence $\vartheta_{HWHM}$ by introducing a blur of the flat-top distribution, thus smoothing the sharp order of the circular image. The diameter of the pinholes 196 also affects the sharpness of the output angular distribution $L_{direct}$: smaller pinholes 196 imply a sharper image; however, smaller pinholes 196 with a concurrently relatively large divergence before the array of lenses 194 also mean higher losses at the absorbing mask 202.

The beam-homogenizer layer 192 of FIG. 14a-c has the advantage that the last layer, i.e. the one arranged at the downstream end of the beam-homogenizer, is a black (absorbing) layer perforated by a 2-dimensional array of pinholes, which masks the presence of the array of lenses 194 to the observer's eyes. Therefore the embodiment of FIG. 14a-c ensures optimal performance with respect to the goal of minimizing the reflected luminance, i.e. of ensuring the black appearance of the direct-light source 12 when the device is off.

However, in order to avoid the pixelation of the image in correspondence of the pinholes layer 202 due to the alternation of transmitting and absorbing zones, a low-angle white-light diffuser 230 may be positioned downstream the pinholes layer 202, as described also below, in order to blur the image of the pinholes 196 and ensure uniform luminance at the low-angle white-light diffuser 230 plane, which would then coincide with the first emitting surface 28. In order to prevent excessive blurring in the narrow peak 30 of the luminance profile, the white-light diffuser 230 is taken with HWHM response function $\leq 10°$, advantageously $\leq 5°$, more advantageously $\leq 2°$. In order to ensure luminance uniformity, the white-light diffuser 230 is placed sufficiently apart from the plane of pinholes layer 202, e.g. at a distance from 1 to 3 times the $f_m$. However, the usage of white-light diffuser 230 is not always necessary, e.g. it may be not necessary when the observer is supposed to observe the illumination device from a large distance (for example, from a 3-5 m distance) and it is not necessary when the diameter $D_m$ of lenses 194 is taken as sufficiently small for the foreseen distance of observation, e.g. smaller than 1 mm, advantageously smaller than 0.5 mm.

It is worth noting that the problem of registering the array of lenses 194 and the array of pinholes 196 is solved by directly manufacturing the array of pinholes 196 by means of the array of lenses 194 itself. For example, a high intensity laser focused by lenses 194 onto the absorbing layer 202 which is at the beginning of the fabrication process a continuous layer, i.e. without any holes/pinholes 196, etches the pinholes 196 into layer 202. By controlling the power and the divergence of such a laser beam, the pinhole dimension, i.e. the pinhole diameter $d_m$, is set as appropriate.

As an example, 1.5 mm apertures for the lenses 194 and focal length of the order of 1.7 cm results in a half angular output divergence of 2.5°, approaching the desired divergence of the direct light as described above.

The use of the described channel separation structure 200, the use of which is, though, optional, is to prevent crosstalk effects between neighbor pairs of lens 194 and pinhole 196. These crosstalk effects may manifest into a series of ghosts replicas of the sun image around the central high intensity one. These might occur in presence of intense stray light in the light beam impinging onto the beam-homogenizer layer 192 at sufficiently large propagation angles, for example larger than $(D_m/f_m)-(d_m/(2 f_m))$ radians, as illustrated by ray 206 in FIG. 14a. In this case, such intense stray light 206 propagating at large angle could be focused by one lens 194 into a pinhole 106 associated with a neighboring lens 194.

The channel separation structure, as explained above and shown in FIG. 14a-c, may be formed by an array of tubes of absorbing material, i.e. one tube per pair of lens 194 and pinhole 196, these tubes constituting a third array of elements positioned between the array of lenses 194 and the array of pinholes 196. Light impinging onto the array of lenses 194 at a large angle and which would, without the channel separation structure 200, be focused onto neighboring pinholes, i.e. pinholes belonging to neighboring lenses 194, is then absorbed by the channel separation structure 200, thus eliminating the crosstalk. The output pinholes layer 200 may also be eliminated in the latter case since these would be substituted by the apertures of the tubes of the channel separation structure 200 itself, at the cost of adding angular blur to the output luminance distribution.

Figure 15:
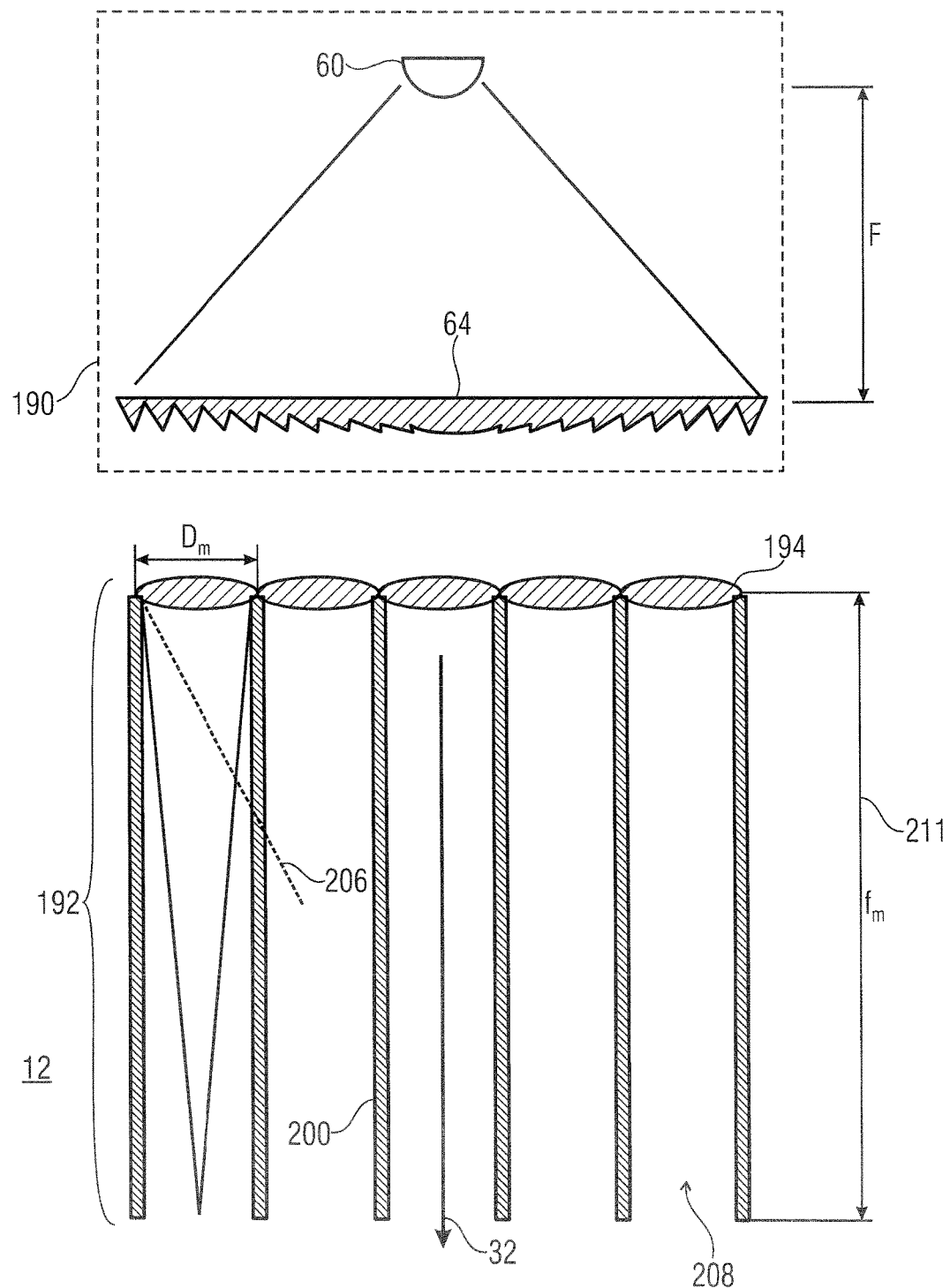
FIG. 15 schematically shows a cross section of a micro-optics beam-homogenizer layer in accordance with a further embodiment where same comprises one lens array and one tube array.

Therefore, a further embodiment for the micro-optics beam-homogenizer layer 192, as shown in FIG. 15, comprises a 2-dimensional array of microlenses 194 and an absorber shaped as a channel separation structure of a 2-dimensional array of micro tubes 200 extending downstream the 2-dimensional array of microlenses 194 so that each microlens 194 has a micro tube associated therewith which extends from the respective microlens 194 into the direct-light direction 32, just as it was the case with the embodiment of FIG. 14a-c. For what concerns the diameter $D_m$ of the microlenses 194 and the focal length $f_m$ of the microlenses 194 reference is made to the description of the embodiment of FIG. 14a-c. For what concerns the length l of the micro tubes 200 marked as 211 in FIG. 15, such length l may not necessarily be equal to $f_m$, but it may vary in the range $0.5\, f_m < l < 1.2\, f_m$.

Figure 16:
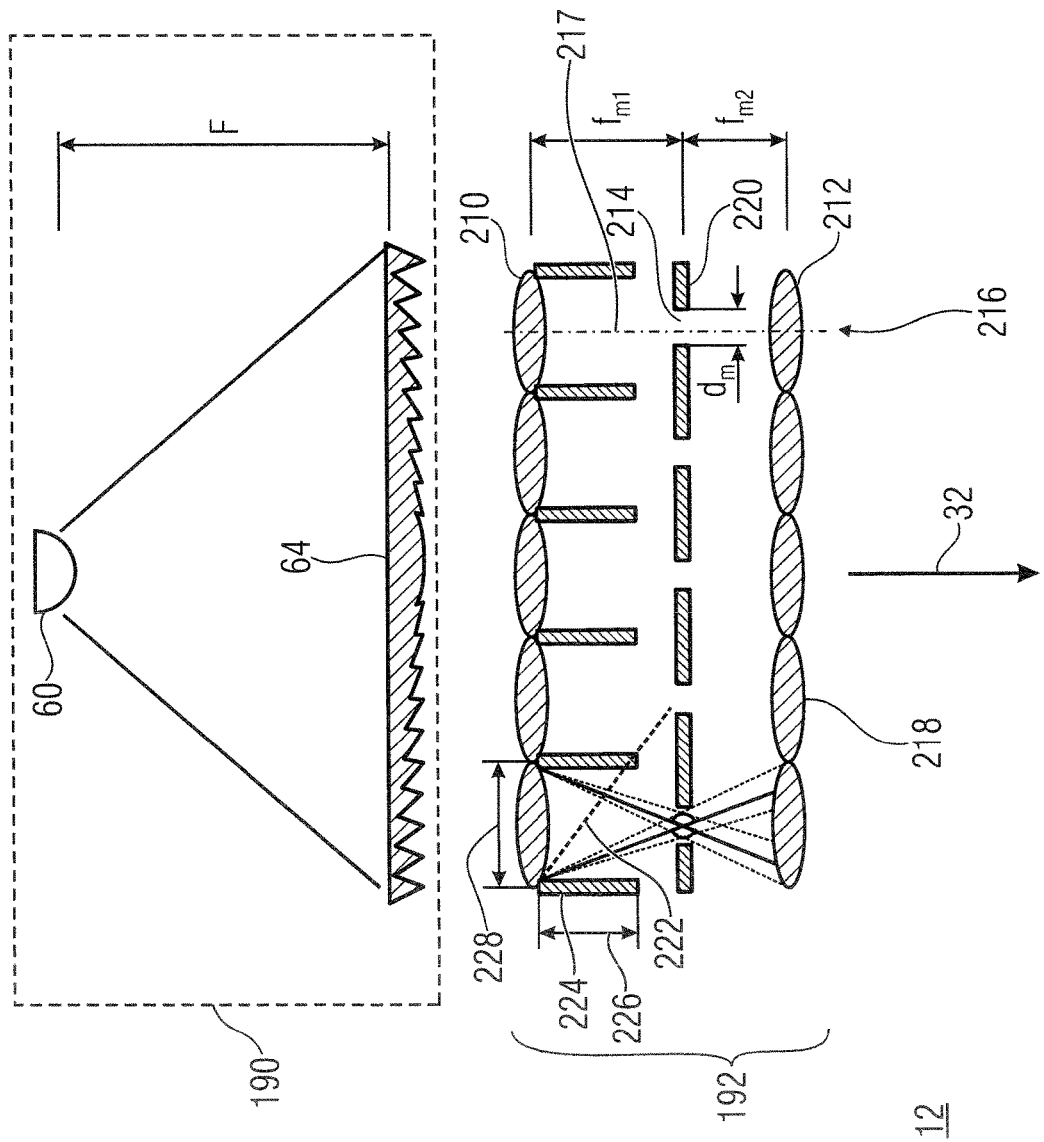
FIG. 16 schematically shows a cross section of a further embodiment of a micro-optics beam-homogenizer layer where same comprises two lens arrays and one pinhole or tube array.

FIG. 16 shows a further embodiment for a micro-optics beam-homogenizer layer 192. Just as it was the case with respective FIGS. 14a-c and 18, the micro-optics beam-homogenizer layer 192 is shown in combination with the collimated light source 190 so as to form a further embodiment for a direct-light source 12, but although the collimated light source 190, comprising an emitter and a collimator, is exemplarily shown to comprise a combination of a Fresnel lens 64 and a first light-emitting device 60 as it was the case in the example of FIG. 7, any of the previously described examples of FIGS. 5 to 8, 11 and 12 could be used for implementing the collimated light source 190.

The micro-optics beam-homogenizer layer 192 of FIG. 16 comprises a first 2-dimensional array of microlenses 210 of focal length $f_{m1}$, a second 2-dimensional array of microlenses 212 of focal length $f_{m2}$, and an absorber shaped as an absorbing layer 220 perforated by an array of pinholes 214 arranged between the first and second arrays of microlenses 210, 212 so as to form an array of telescopes 216 distributed laterally in an array-like manner such as hexagonally packed or the like, and having the telescope axes parallel to each other and parallel to the direct-light direction 32. In each telescope 216, the respective pinhole 214, the respective microlens 210 of the first 2-dimensional array and the respective microlens 212 of the second 2-dimensional array are arranged along the telescope axis with a distance between the respective pinhole 214 and the respective microlens 210 of the first 2-dimensional array being $f_{m1}$ and a distance between the respective pinhole 214 and the respective microlens 212 of the second 2-dimensional array be $f_{m2}$, wherein $f_m < \gamma \cdot f_{m1}$, with $\gamma < 1$, advantageously $\gamma \leq 0.9$, most advantageously $\gamma \leq 0.85$. A downstream facing outer surface 218 of the array of telescopes 216 may comprise an antireflection coating.

In the embodiment of FIG. 16, the beam-homogenizer layer 192 is thus composed of two arrays of lenses 210, 212 and a central array of pinholes 214. The pinholes 214, placed in the focal plane of both lenses 210 and 212, may be cut out of a thin layer of optical absorbing material. Accordingly, the construction of FIG. 16 is similar to the micro-optics beam-homogenizer systems shown in FIGS. 14a-c and 18, but with an additional array of lenses 212. The aperture of each lens 210 corresponds to the aperture of a lens 212 in the downstream array, and to a pinhole 214 centered on the axis 217 between the two lenses 210 and 212. The beam-homogenizer layer 192 thus forms an array of optical telescopic filters. The absorbing layer 220 within which the pinholes 214 are formed eliminate all spatial components, i.e. propagation angles, which in the focal plane fall outside the pinholes 214. The output divergence of this beam-homogenizer layer is, measured in full width, the lowest value between: $f_{m1}/f_{m2}$ times the input half width divergence of the light impinging onto the beam-homogenizer 192, and $\Delta\vartheta \approx \arctan(d_m/2 \cdot f_{m2})$, with $d_m$ being the pinhole diameter of pinholes 214. The image which is formed on the eye of the observer is the image of the focal plane of one single lens 212 of the downstream array. Accordingly, a circular image is given by a circular shape of pinholes 214. Moreover, in case of the presence of the collimating lens 64, the presence of same with the lenses 210 images the primary light source 60 onto the central pinholes 214. Accordingly, similar to the bare collimating lens case as shown in FIGS. 7 and 8, in the eye of an observer the direct-light source 12 of FIG. 16 images the primary light source 60, which might be clipped by the pinhole aperture 214. Since the light impinging onto the array of lenses 210 from the collimated light source 190 exhibits an initial divergence such as for example at the exit of the collimating lens 64, the focal length $f_{m1}$ and $f_{m2}$ should not be the same. A 1:1 telescope 216 indeed, given an input divergence of the light impinging on a lens of the first array 210, leads to the generation of a spot onto the plane of the second array 212 which is larger than the full aperture of the corresponding lens belonging to such array 212. This case thus leads to the undesired illumination of the neighbor lenses around such corresponding output lens. From geometrical considerations for given input divergence a shorter focal length $f_{m2}$ of the downstream array determines a full illumination of the output aperture of a single lens of array 212 without such effect.

In order to reduce the loss of light at the absorbing layer 220, the pinhole diameter $d_m$ could favorably be chosen according to the divergence of the beam inbound from the collimated light source 190. If the primary source 60, for example, does not exhibit a circular shape there could be loses in correspondence of the pinholes 214. Contrary to the case of the beam-homogenizer layer 192 of FIGS. 14 and 15, the example of FIG. 16 does not require the apertures of lenses 210 to be circular, nor does it require blackening of portions of its input surface. That is, the apertures of lenses 210 may abut each other so as to continuously phase and overlap with the lateral extension of the light front inbound from the collimated light source 190, such as the lateral dimension of collimating lens 64 or the array of such lenses 64 in the case of FIG. 8.

The pinholes 214 in the central absorbing layer 220 may be written by use of a high intensity laser beam focused by the first array of lenses 210 similar to the description of the fabrication process described above with respect to FIG. 14-c.

That is, laser printing could be used to form the pinholes of the above micro-optics beam homogenizer layers which relies upon a first realization of a component identical to the disclosed homogenizers apart from the fact that a continuous obscurant layer is deposited on the surface where the pinholes have to be positioned, followed by laser micro fabrication of the pinholes obtained by illuminating the above mentioned component by a suitably collimated laser beam trough the upstream microlens layer, so that the micro-lenses will focus the laser beam at the exact position where the pinholes have to be fabricated, and regulating the exposure time and the beam divergence so that the desired diameter of the pinholes is obtained.

The considerations about pixelation of the output layer of the beam-homogenizer layer of FIGS. 14a-c and 15 also apply in the case of FIG. 16. Accordingly, the aperture of lenses 212 may be smaller than 5 mm, advantageously smaller than 3 mm, most advantageously smaller than 1.5 mm. However, since the final divergence is not related to the ratio between the lens aperture of lenses 210 and 212 on the one hand and the focal length $f_{m1}$ and $f_{m2}$ on the other hand, the focal length $f_{m1}$ and $f_{m2}$ of lenses 210 and 212, respectively, can be of the order of the aperture of the lenses 210 and 212, i.e. much shorter than for the case of the embodiments in FIGS. 14 and 15.

It is noted that in presence of intense stray light in the light beam impinging onto the beam-homogenizer layer 192 at sufficiently large propagation angles, for example larger than $(D_m/f_{m1})-(d_m/(2\ f_{m1}))$ radians, where $D_m$ and $d_m$ are the diameters of the lenses 210 and the pinholes 214, respectively, crosstalk might occur also in the embodiment of FIG. 16 as described for embodiments of FIG. 14. Said crosstalk, originated from light 222 focused by one lens 210 into a pinhole belonging to a neighboring lens 210, may lead to faint replicas of the desired output spot at large propagation angles, which depend on the lens aperture of lenses 210, the focal length $f_{m2}$ and the pinhole diameter $d_m$. The angles at which said faint replicas of the desired output spot might be visible is by far larger for the embodiment of FIG. 16 than FIG. 14, e.g. of the order or 45°, the reason being the much larger value of the ratio between pitch and focal length and thus the much larger angle under which neighboring pinholes are seen by the lens 210 with respect to the lens 194. For the case of the embodiment of FIG. 16 and, for example, for the case of first-order crosstalk, the secondary telescope trough which said crosstalk is preformed (i.e. the telescope formed by an input lens 210 and an output lens which is the second neighbor to the lens 210 positioned in front of the input lens 210) is not able to transmit collimated light. In fact, being the axis of said secondary telescope strongly tilted with respect to direction 32 (e.g. of about 45°, for a typical case of $D_m \cong f_{m1}$), the distance between pinhole 214 and output lens 212 of said secondary telescope is much larger than $f_{m2}$ (e.g. about $\sqrt{2}$ times larger), whilst the actual focal length of lens 212 in the direction of the secondary-telescope axis is substantially shorter than the nominal value $f_{m2}$ due to the astigmatism caused by the large operating angle. In this circumstance, rays which might eventually exit lens 212 along parallel direction are blocked by the pinhole 214 since said pinhole is far from the actual focus of lens 212 in the direction of the secondary telescope axis. The fact that the secondary telescope is unable to transmit parallel rays prevents the crosstalk form leading to secondary narrow peaks in the luminance profile, i.e. to peaks of comparable width of the peak 30. In other terms, the secondary spot which might be formed due to crosstalk is much more blurred, and therefore much less visible, than primary spot, even in the case of non-collimated light impinging onto the beam-homogenizer layer 192. Higher order cross talk leads to an even larger blurring effect, due to larger telescope-axis angles with respect to direction 32. Therefore the embodiment in FIG. 16 has the advantage of generating a much weaker crosstalk with respect to the embodiment of FIG. 14 as long as the embodiment of FIG. 14 is operated without channel separation structure 200, the price to be played being related to the need of registering the array of lenses 212 with respect to the lenses 210.

In a further embodiment, an array of absorbing tubes, i.e. an absorbing channel separation structure 224, with one absorbing tube per telescope 216, is positioned downstream the array of lenses 210. As for the case of channel separation structure 200 the case of the embodiments of FIGS. 14a-c and 15, said absorbing channel separation structure 224 has the function of stopping crosstalk 222, which however is here much less detrimental than for the previous cases, as just described. The barriers of this absorbing channel separation structure 224 may form a grid in direct contact with lenses 210. Since the ratio between lens diameter and focal length may be much larger for the case of lens 210 in the embodiment in FIG. 16 than for the case of lens 194 in the embodiments in FIGS. 14a and 15, e.g. 3-30 times larger, the aspect ratio of the absorbing channel separation structure 224, i.e. tube length 226 divided by aperture 228 of lenses 210, of the individual tubes of the absorbing channel separation structure 224 could be much lower than in the case of FIGS. 14 and 15, e.g. in the range 0.5-3, thus leading to a much less demanding technological effort.

It is noted that tube length 226 shorter than $f_{m1}$, e.g. 25% shorter than $f_{m1}$ are sufficient for the cross talk removal, as evident from geometrical consideration (see FIG. 16).

For what concerns the characteristics of the light emitted by the outer surface 218 formed by the array of lenses 212 in the embodiment of FIG. 16, and particularly for what concerns the potential problem related to luminance modulation with spatial periodicity equal to the lens 212 pitch, the inventors realized that high uniformity is guaranteed providing that input lenses 210 are uniformly illuminated by the collimated light source 190 and that the ratio $f_{m1}/f_{m2}$ is chosen for properly matching the collimated light source 190 beam divergence, i.e. for achieving light spot onto the lens 212 which matches the lens size. In this case, in fact, the telescopes 216 reproduce onto the surface 218 the (axially reverted) luminance profile featuring the inner surface of lenses 210 but deprived from the large angular component, i.e. do not add a major luminance modulation at the lens pitch. This to say that, even if pitch values less than 5 mm are recommended, higher pitch values are also possible providing that telescopes 216 are suitably designed to match the features of collimated source 190.

For what concerns the appearance of the surface 218 formed by the array of lenses 212 when the collimated source 190 is off, i.e. under external illumination, the inventors noticed that owing to the presence of the absorbing layer 220 and the possible absorbing channel separation structure 224 light rays crossing lenses 212 in the upstream direction are absorbed but those connected to the first light-emitting device 60. This circumstance ensures that light rays crossing lenses 212 in the upstream direction do not produce reflected luminance except for a minor contribution which might arise from reflection by the source 60, which however falls within the narrow peak 30 and therefore does not produce any disturbance. A contribution to reflected luminance may arise from direct reflection by lenses 212. To this end, if large lens 212 aperture is chosen, i.e. larger than 1-3 mm, antireflection coating may be implemented onto the lenses 214 in order to avoid the risk of the occurrence of periodic modulation in the reflected luminance that the eye is able to spot.

Generally speaking, a beam homogenizer may also be formed out of 2-dimensional tandem lens array, i.e. two identical microlens arrays located at a focal length's distance of each other. The microlens pitch of the arrays would be set to be smaller than the emitter/collimator pair pitch as it is the case with the other beam homogenizer embodiments. The first (downstream) microlens array splits the incident light into individual beamlets. These beamlets are then redirected by the second microlens array. A uniform illumination, often referred as "flat-top" is achieved in the superposition plane (in the far field).

Figure 17:
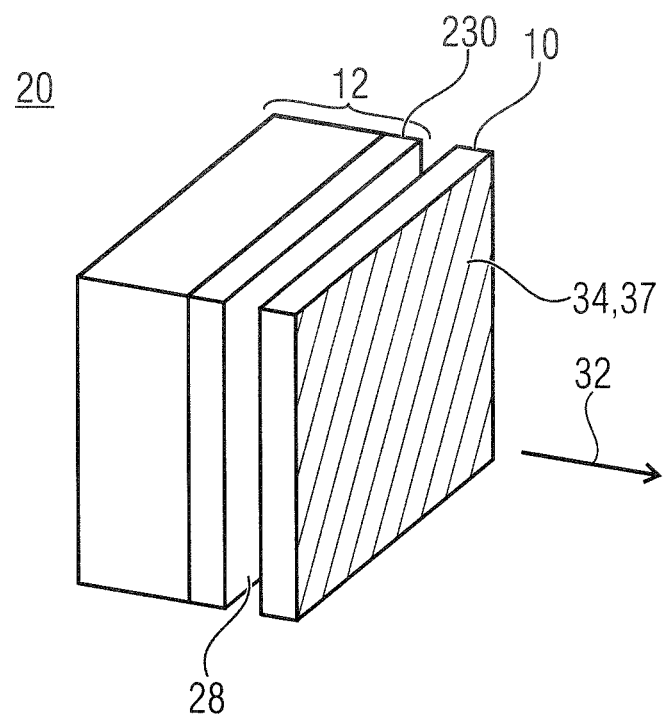
FIG. 17 schematically shows an artificial illumination device including a low-angle white-light diffuser positioned upstream the diffused-light generator.
Figure 18:
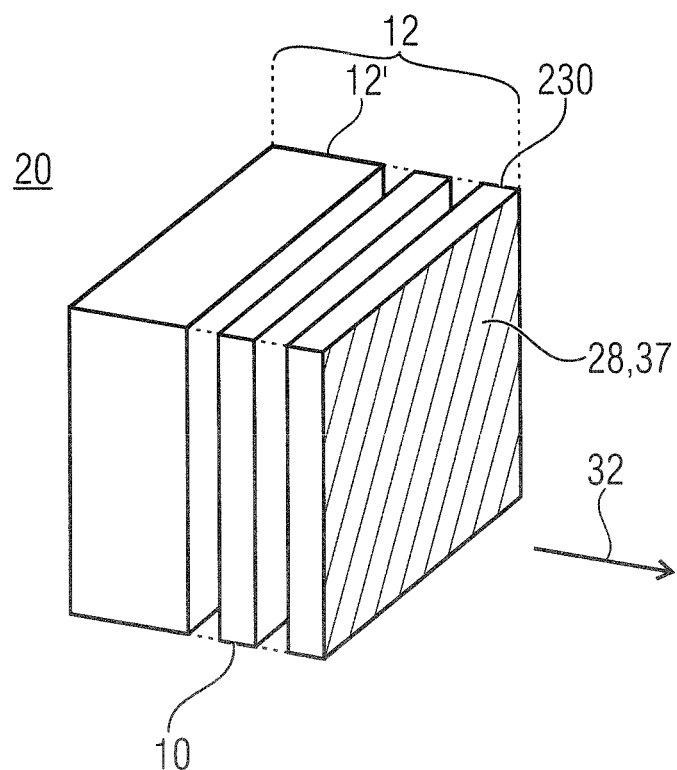
FIG. 18 schematically shows a further embodiment of an artificial illumination device including a low-angle white-light diffuser which is, however, positioned downstream the diffused-light generator.

All of the above described embodiments for the direct-light source 12 may be extended by additionally providing the direct-light source 12 of the artificial illumination device 20 with a low-angle white-light diffuser 230 which is, as shown in FIGS. 17 and 18, positioned either upstream or downstream of the diffused-light generator 10. In case of positioning the low-angle white-light diffuser 230 upstream the diffused-light generator 10, the latter is external and downstream the direct-light source 12 as shown in FIG. 17. In the other case, i.e. if the low-angle white-light diffuser 230 is positioned downstream the diffused-light generator 10, then the low-angle white-light diffuser 230 represents a device residing within, and positioned within the internal light path of the direct-light source 12. In both cases, the first emitting surface 28 of the direct-light source 12 is formed at the low-angle white-light diffuser 230, namely its outer face. In case of FIG. 18, however, $L_{direct}(x, y, \vartheta, \varphi)$ is intended to denote the luminance measurable at the low-angle white-light diffuser 230 outer surface (i.e. the surface 28 facing in the opposite direction with respect to diffused-light generator 10) when the diffused-light generator 10 is physically removed from the illumination device 20. In FIG. 18, the reference sign 12' has been used to identify the portion of the direct-light source 12 positioned upstream relative to the diffuse-light generator 10. Both parts 12' and 230 belong to the direct-light source 12 as indicated by the brace in FIG. 18. As far as the reflectance luminance profile $L_R$ is concerned, same may be defined with the diffused-light generator 10 remaining within the direct-light source 12 in case of FIG. 18. For example, the low-angle white-light diffuser 230 is configured so as to cause a blurring of the narrow peak 30 in $L_{direct}$. Such blurring occurs both when the white-light diffuser 230 is positioned upstream and downstream of the diffused-light generator 10.

The low-angle white-light diffuser 230 may comprise, for example, a random distribution of micro-refractors, e.g. micro-lenses, micro-voids, micro-prisms, micro-scratches, or a combination of these, formed in an outer surface of a transparent layer material, or a dispersion of transparent microparticles in a transparent bulk material where particles and bulk material experience suitable refractive-index mismatch. That is, in the case of the dispersion of transparent microparticles in a transparent bulk material, a refractive-index mismatch between the transparent microparticles and the transparent bulk material may apply. However, several other embodiments for the white-light diffuser are also possible.

Note that, since light rays impinging onto the low-angle white-light diffuser may experience only small-angle deviation (e.g. smaller than 2.5°), a small-angle white-light diffuser is typically a virtually transparent element according to the definition of transparency taken in the context of the present invention (an element is considered as transparent if light rays crosses the element without experiencing angular deviation larger than 2.5°; see below for details). Accordingly, rays that cross the diffuser suffering a small angle deviation are here considered as transmitted rays (see below for details). However, according to the needed functionality, the small-angle white-light diffuser that is here considered should typically ensure that most of the transmitted rays (e.g. at least 50%, advantageously 70%, most advantageously more than 95%) experience at least some angular deviation (e.g. a deviation of at least 0.5°). In other terms, the diffuser should ensure low regular transmittance (e.g. a regular transmittance lower than 50%, advantageously lower than 30%, most advantageously lower than 5%).

The low-angle white-light diffuser 230 may have the following positive effects onto the direct-light luminance profile $L_{direct}$. In particular, a scattering cross section of this white-light diffuser 230 may be set to 2° to 10°. A first scope is to blur any sharp angular peak in $L_{direct}$ profile, i.e. a peak featured by HWHM less than 1.5°-10°, which might occur outside the narrow peak 30. The scope is here therefore to reduce the visibility of sharp secondary angular peaks in $L_{direct}$. To this end the diffuser may be positioned at any plane downstream the plane where said luminance angular peaks are originated. A second scope is to blur and so reduce both luminance value and its spatial derivative caused by bright, spatially localized, spots, and improve spatial uniformity in the luminance profile. To this end the low-angle white-light diffuser should be positioned at a certain distance from the plane where said luminance spots occurs, e.g. the plane of the pinholes 196 in the embodiment of FIG. 14, in order to allow each localized spot to lead to a sufficiently large and so sufficiently weak blurred spot onto the plane. In so doing, the low-angle white-light diffuser causes a blur in the spatial luminance profile wherein (in the case of negligible regular transmittance) a point is blurred into a blurred spot with radius approximately equal to the product of the tangent of the diffuser angular response and the distance between the original-luminance plane and the diffuser.

Naturally, the new blurred luminance profile occurs at the diffuser plane. For example, an observer sees a localized spot of original size ds under a luminance reduced by a factor of $\cong \alpha^2$ if a 2.5° HWHM white-light diffuser 230 is positioned downstream said spot at a distance of $\cong 10\alpha \cdot ds$, wherein a proportionally larger distance is necessitated for white-light diffusers featured by narrow angular response.

Up to now, the various embodiments of the artificial illumination device 20 that have been presented concerned variations in the implementation of the direct-light source 12. Next, possible variations in the implementation of the diffused-light generator 10 are described. The description provided next is combinable with any of the embodiments described above.

Figure 19A:
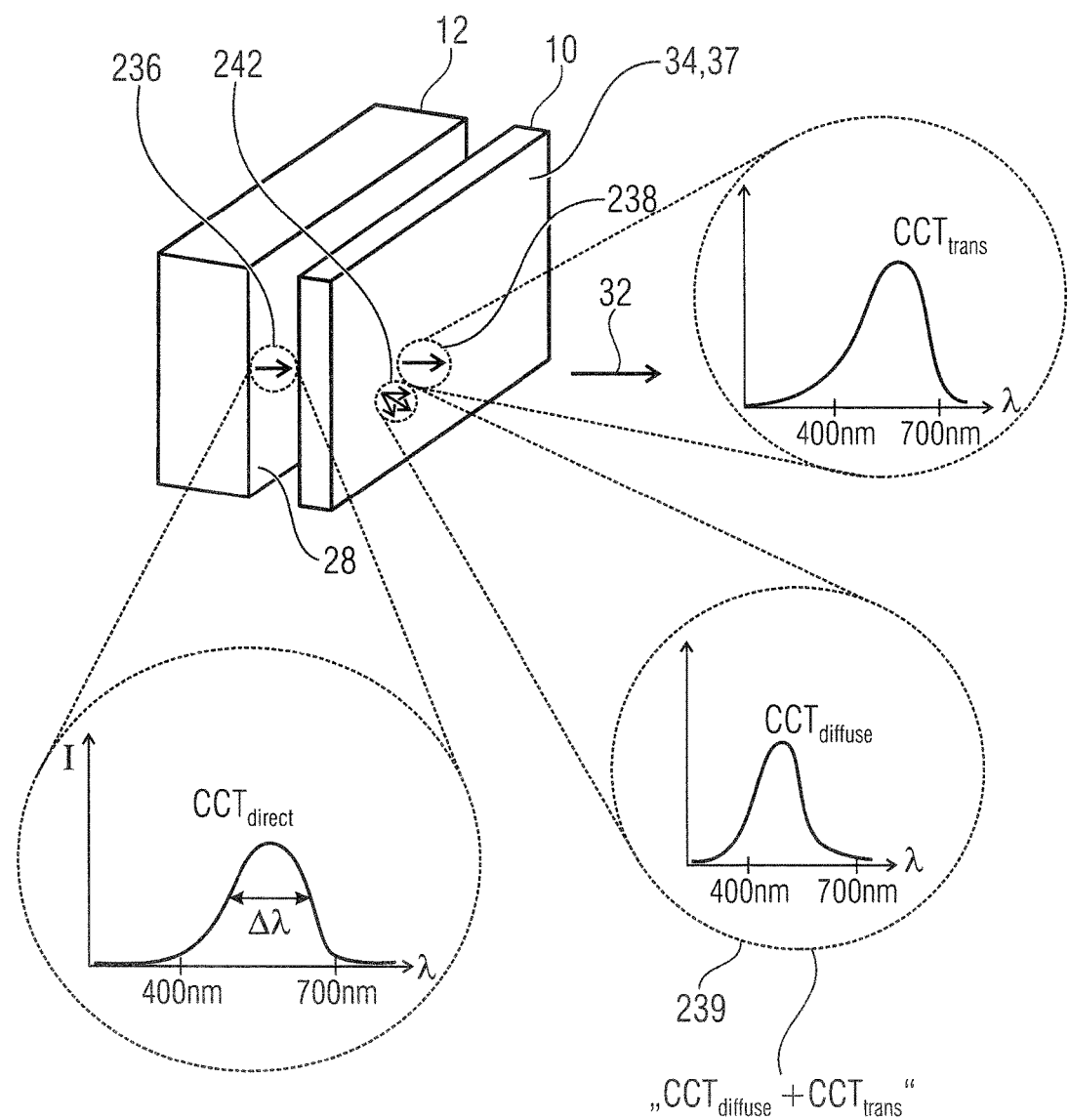
FIG. 19a-c schematically shows an artificial illumination device including a combination of a direct-light source and a diffused-light generator with additionally illustrating the CCT offset between direct, transmitted and diffused light.

FIG. 19a shows one of the possible general relative arrangements of direct-light source 12 and diffused-light generator 10. The diffused-light generator 10 is arranged downstream relative to the direct-light source 12 in this figure. Possible other relative configurations of these elements have already been described before and will be further discussed in the following. In FIG. 19a the backside of the diffused-light generator 10 is lit by the direct light 236 generated by the direct-light source 12 and the first emitting surface 28. As the diffused-light generator 10, as described above, is at least partially transparent to the direct light 236 or any intermediate light evolving from the primary light and resulting in the direct light 236, a transmitted light portion 238 results at the front face/outer emitting surface 37 of diffused-light generator 10.

Besides this, the diffused-light generator 10 generates diffused light 242. As outlined in more detail below, the diffused-light generator 10 may be configured to generate the diffused light 242 by way of diffusing a portion of an incident light, such as direct light 236 or an intermediate light evolving from the primary light and resulting in the direct light 236, and/or by additionally emitting diffused light as an additional contribution. As already described above, the diffused-light generator 10 may be embodied as a panel, as a layer or layer stack deposited onto, for example, the first emitting surface 28 or some other transparent substrate, but other implementations would also be feasible.

Advantageously, the direct light 236 emitted by direct-light source 12 covers the visible region of the spectrum, that is wavelengths between 400 nm and 700 nm. Advantageously, the spectrum of the direct light 236 has a spectral width $\Delta\lambda$ which is larger than 100 nm, more advantageously larger than 200 nm, where the spectral width $\Delta\lambda$ may be defined as the standard deviation of the spectrum of the direct light 236. The spectrum of the direct light 236 thus features an associated CCT value which is called $CCT_{direct}$ in the following.

It is preferred if the diffused-light generator 10 is configured such that same does not increase the CCT of the transmitted light 238, i.e. $CCT_{trans} \leq CCT_{direct}$, but deviations could also be feasible. As far as the diffused light 242 is concerned, same has a spectrum shifted towards smaller wavelengths and accordingly has a higher CCT compared to the direct light 236, and in any case a higher CCT than compared to the CCT of the transmitted light 238, i.e. $CCT_{diffuse} > CCT_{direct}$ and $CCT_{diffuse} > CCT_{trans}$. It is preferred if light 236 and 238 are collimated, i.e. have narrow angular distribution, and if spectra of direct light 236, 242 and 238 are substantially independent from the angular direction (when the spectra are normalized to their peak value). In this case, the definition of $CCT_{direct}$, $CCT_{diffuse}$ and $CCT_{trans}$ is straightforward. However, to be more precise and in the general case, $CCT_{direct}$ could be defined as the CCT relative to the mean spectrum of light generated by the illumination device 20 within the narrow peak 30, i.e. within, for example, $\vartheta_{HWHM}$, when the diffused-light generator 10 is not physically installed into the device 20; $CCT_{trans}$ could be defined as the CCT relative to the mean spectrum of light generated by the illumination device 20 within the narrow peak 30, i.e. within, for example, $\vartheta_{HWHM}$, when the diffused-light generator 10 is physically made to operate into the device 20; $CCT_{diffuse}$ could be defined as the CCT relative to the mean spectrum of light generated by the illumination device 20 at directions far from direction 32, e.g. for angles $\vartheta > 3\vartheta_{HWHM}$, when both direct-light source 12 and diffused-light generator 10 are made to operate into the illumination device 20; all means are preformed over all spatial and azimuthal coordinates.

As already described above, the diffused-light generator 10 could be embodied or could at least comprise a diffuser panel configured to diffuse the incident light more efficiently for shorter wavelengths within the visible region, i.e. within 400 to 700 nm, than compared to longer wavelengths, thereby behaving similarly to the Rayleigh scattering of the sunlight by the real sky. For example, the diffuser is configured such that the luminous flux of the portion diffused/scattered by same within the interval of 400 nm to 550 nm is at least 1.1 times, advantageously 1.2 times, more advantageously 1.3 times larger than the luminous flux of the portion of incident light within the wavelength interval within 550 nm to 700 nm, in the case of a D65 standard illuminant.

$CCT_{diffuse}$ is, for example, at least 1.2 times greater than $CCT_{trans}$, advantageously more than 1.3 times greater, more advantageously more than 1.4 times greater. Comparing $CCT_{diffuse}$ with $CCT_{direct}$, $CCT_{diffuse}$ may be 1.2 times greater than $CCT_{direct}$, or advantageously more than 1.3 times greater or more advantageously more than 1.4 times greater.

In case of the just mentioned Rayleigh-like diffuser, the diffuser may also decrease the $CCT_{trans}$ relative to $CCT_{direct}$, as the transmitted light 238 represents the residual component of the incident light not having been scattered/diffused, not belonging to diffused light 242.

Advantageously, the diffused-light generator 10, irrespective of same being a diffuser and/or a diffused-light source, does not absorb significant portion of the incident light. Advantageously, the diffused-light generator 10 absorbs less than 20% of the luminous flux of the incident light and more advantageously less than 10%. In this regard however, it should be mentioned that some of the incident light is scattered or reflected back into the direction pointing away from the input surface 33 in the upstream direction. When comparing the portion of incident light scattered back ion the one hand and the portion of incident light scattered into the forward direction, i.e. away from the second emitting surface 34 in the downstream direction, then the transmitted diffused light portion 242 should be advantageously greater such as, measured in luminous flux, at least 1.1 times greater or advantageously 1.3 times greater or even more advantageously 1.5 or even 2 times greater than the back-scattered portion.

As far as the sum of the reflected and back-scattered portion is concerned, i.e. the portion of incident light reflected back or scattered back by diffused-light generator 10, same should advantageously be lower than 40% of the luminous flux of the incident light and advantageously lower than 25% or even lower than 10% or even lower than 5% of the luminous flux of the incident light.

Figure 20:
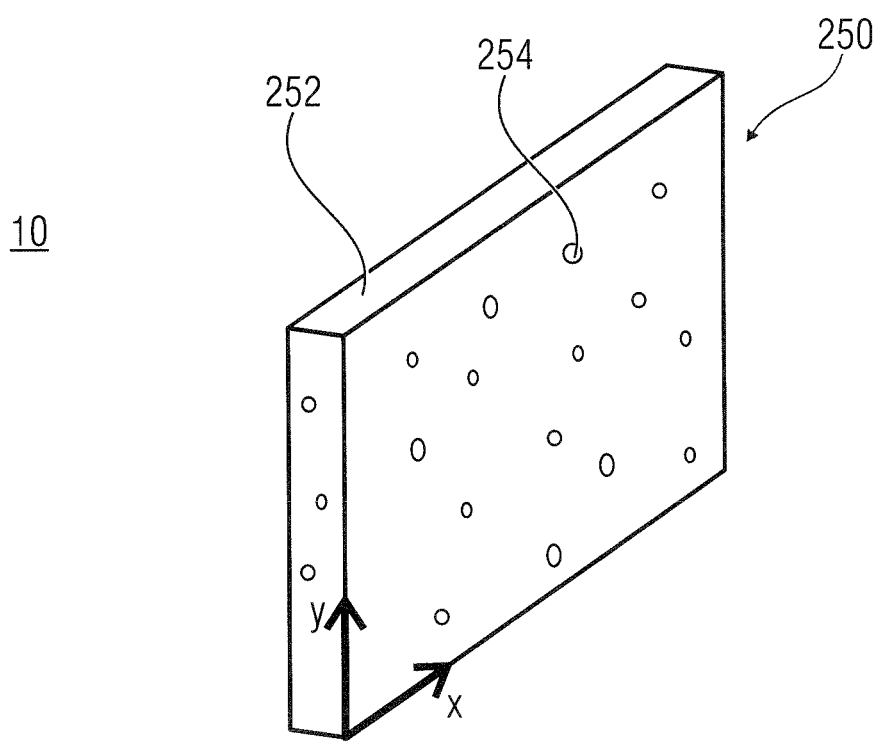
FIG. 20 schematically shows a diffuser panel for implementing the diffused-light generator.

FIG. 20 shows an embodiment where the diffused-light generator 10 is configured as a diffuser 250 comprising a solid matrix of a first material, wherein nanoparticles 254 of a second material are dispersed within the solid matrix 252. The refractive index of the nanoparticles material is different from the refractive index of the material of solid matrix 252. Both materials basically should not absorb electromagnetic radiation in the visible wavelength range. For example, the first material may be a transparent resin. For example, the second material may be an inorganic oxide such as ZnO, $TiO_2$, $ZrO_2$, $SiO_2$, $Al_2O_3$.

The nanoparticles 254 may be mono-dispersed. The nanoparticles 254 may be round shaped or shaped otherwise. The effective diameter D—for definition in non-round cases see below—may be within the range [5 nm-350 nm], advantageously [10 nm-250 nm], more advantageously [40 nm-180 nm], still more advantageously [60 nm-150 nm], where D is given by the diameter of nanoparticles 254 times the first material's refractive index.

Moreover, nanoparticles 254 may be distributed inside the diffuser 250 so that their number per square meter N, i.e. the number of such particles within a panel volume element delimited by a portion of surface S orthogonal to the direction of light propagation and with a 1 m² area, satisfies the condition $N_{min} \leq N$, where:

$$N_{min} = \frac{10^{-29}}{D^6} \cdot \left| \frac{m^2 + 2}{m^2 - 1} \right|^2 \quad \text{[Number/m}^2 \text{ with } D \text{ expressed in m]}$$

where the effective diameter D is expressed in meters (dimensional terms are comprised in the constant) and where m is equal to the ratio of the second material's refractive index to the first material's refractive index.

Advantageously, the nanoparticles 254 are distributed homogenously, at least as far as the areal density is concerned. The areal density varies, for example, by less than 5% or the mean areal density. Alternatively, the areal density may vary intentionally in order to compensate for an illumination variance over the panel 250 as lit the incident light. For example, the areal density N(x,y) at point (x,y) within the second emitting surface 34 may be related to the illuminance I(x,y) produced by the source 2 at point (x,y) via $N(x,y) = N_{av} I_{av} / I(x,y) +- 5\%$, where $N_{av}$ and $I_{av}$ are the averaged illuminance and areal density over the panel area.

In the limit of small D and small volume fractions (i.e. thick panels) an areal density $N \approx N_{min}$ is expected to produce scattering efficiency of about 5%. As the number of nanoparticles per unit area gets larger, the scattering efficiency is expected to grow proportionally to N, as long as multiple scattering or interferences (in case of high volume fraction) occur, which might compromise color quality. The choice of the number of nanoparticles is thus biased by the search for a compromise between scattering efficiency and desired color, as described in detail in patent application EP2304478. Furthermore, as the size of nanoparticles gets larger, the ratio η of the luminous flux of the forward scattered light 242 divided by the luminous flux of the back-scattered light grows, such ratio being equal to one in the Rayleigh limit. Moreover, as η grows, the aperture of the forward scattering cone gets smaller. Therefore, the choice of η is biased by the search for a compromise between having light scattered at large angles and minimizing the flux of backward scattered light. However, in a way known by itself, an antireflective layer can be deposited on the input and second emitting surface 33 and 34, respectively, with the aim of minimizing reflection; by doing so, the luminous efficiency of the device is raised and the visibility of the diffuser panel 250 to an observer due to ambient reflection on the panel surfaces is diminished.

Embodiments are however possible where nanoparticles 254 do not have spherical shape: in such case, the effective diameter D may be defined to be equal to the effective diameter of the equivalent spherical particles, namely to the effective diameter of spherical particles having the same volume as the aforementioned nanoparticles.

Furthermore, embodiments are possible where nanoparticles 254 are polydispersed, i.e. their effective diameters are characterized by a distribution N(D). Such distribution describes the number of nanoparticles per surface unit and unit interval of effective diameter in a neighborhood of the effective diameter D (that is, the number of particles per surface unit with diameter between $D_1$ and $D_2$ is equal to $N_{D1-D2}=\int_{D_2}^{D_2}N(D)dD$). Said effective diameters may be in the range [5 nm-350 nm], i.e. the distribution may be different from zero within that interval. In this case, considering that scattering efficiency grows approximately, i.e. in the limit of small particles, with the sixth power of the nanoparticle's diameter, the polydisperse distribution, with the aim of evaluating the minimum number per square meter of nanoparticles, behaves approximately as monodisperse with a representative diameter $D'_{eff}$ defined by:

$$D'_{eff} = \left\{ \frac{1}{N} \int N(D) D^6 dD \right\}^{1/6}$$

where $$N = \int N(D) dD$$

$D'_{eff}$ may be selected to lie within any of the above intervals, i.e. within the range [5 nm-350 nm], advantageously [10 nm-250 nm], more advantageously [40 nm-180 nm], still more advantageously [60 nm-150 nm].

Figures 21A, 21B:
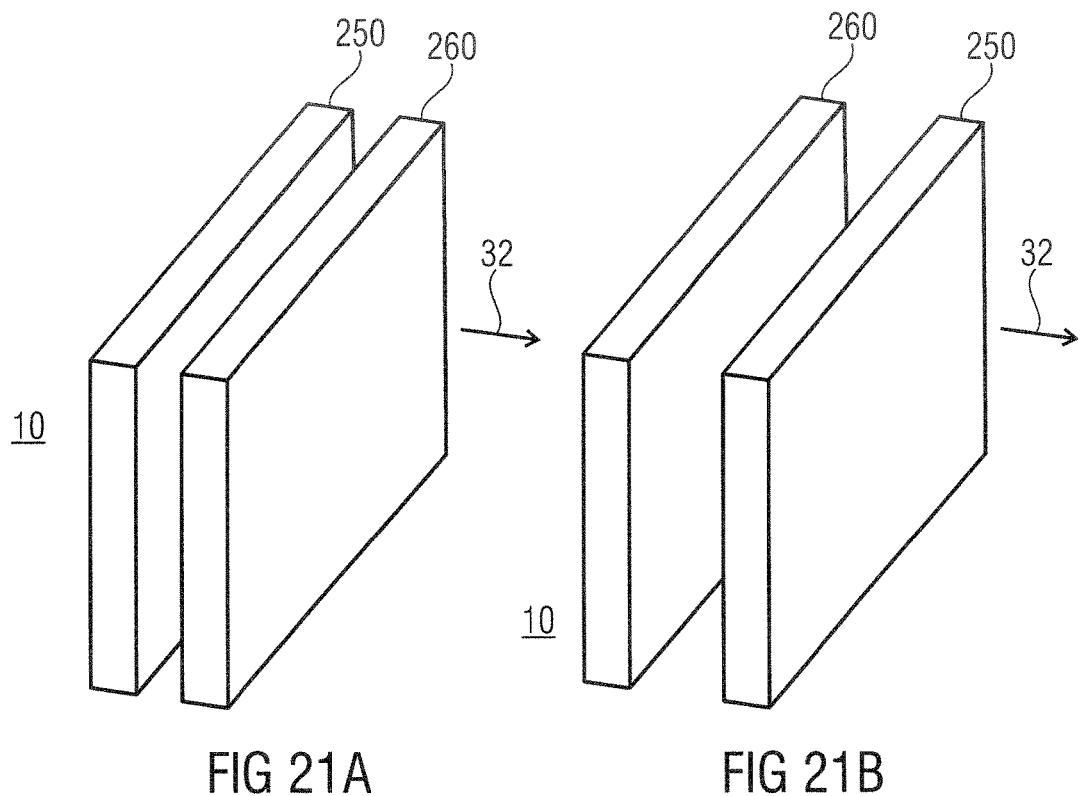
FIG. 21a,b schematically show combinations of a diffuser panel and a diffused-light source for implementing the diffused-light generator.
Figure 23:
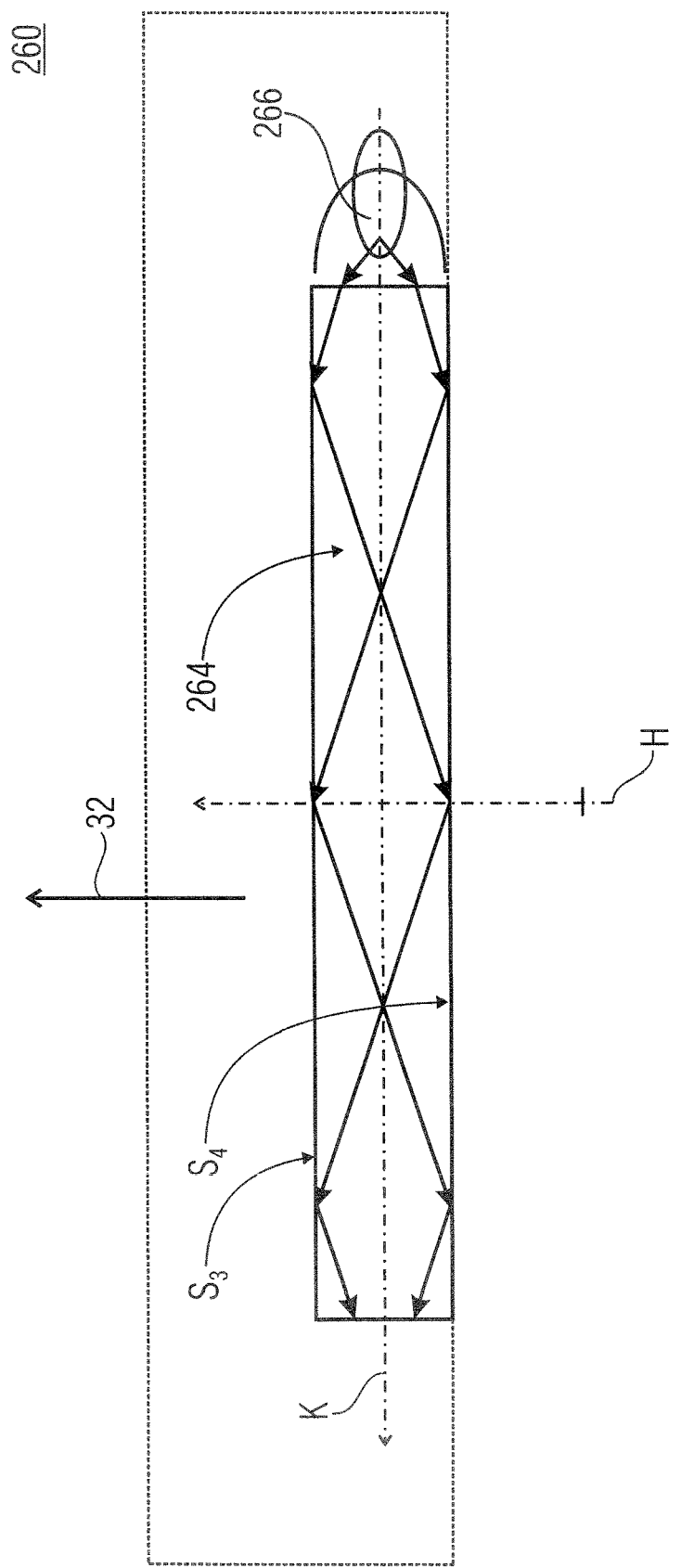
FIG. 23 schematically shows a side view of a diffused-light source in accordance with an embodiment.

However, alternatively, it is possible that the diffused-light generator 10 is constituted by or comprises a diffused-light source 260 in addition to the diffuser panel 250 of FIG. 20 as shown in FIGS. 21a and 21b, or individually as shown in FIG. 23. Differently from the diffuser panel 250, the diffused-light source 260 might emit diffused light independently from the direct-light source 12, since it comprises a second light-emitting device 266 which differs from the first light-emitting device of the direct-light source.

As shown in FIGS. 21a and 21b the diffused-light source 260 may be placed downstream or upstream relative to the diffuser panel 250. As described herein below, the diffused-light source 260 may be panel-shaped, shaped like a layer or be embodied as a layer stack. When combining any of the embodiments of FIGS. 21a and 21b with the embodiment of FIGS. 17 and 18, it should be noted that the low-angle white-light diffuser 230 may be positioned downstream or upstream both diffuser 250 and diffused-light source 260 or between them. Moreover, the functionality of the white-light diffuser 230 may be incorporated into the diffuser 250 and/or the diffused-light source 260. The diffused-light source 260 is capable of emitting light which is diffuse. Moreover, the diffused-light source is essentially transparent to the direct light 236 or an intermediate light evolving from the primary light and resulting in the direct light 236. As shown in FIGS. 21a and 21b, the diffused-light source 260 can be positioned parallel to panel 250 and be virtually in contact with it.

The diffused-light source 260 can be realized using a diffuser panel 264 shaped as a light guide edge-lit by the second light-emitting device 266 shaped as, e.g. a linear stripe of LEDs or a fluorescent tube lamp, so that light emitted by second light-emitting device 266 propagates in guided-mode inside the diffuser panel 264, which diffuses it homogeneously. Such panel 264 can be, for example, a commercial diffuser suitable for side-lighting as, e.g.: "Acrylite® LED" or "Plexiglas® LED EndLighten". Moreover, as shown in FIG. 23, the thickness along axis H of the diffuser panel 264 is negligible compared to thickness along direction K perpendicular to panel normal direction H.

In a particular configuration, the diffuser panel 264 is formed by a material, e.g., polymethylmethacrylate, wherein microparticles of a material such as zinc oxide, are dispersed; such materials advantageously do not absorb light with wavelengths in the visible range. In particular, the diameters of microparticles range from 2 μm to 20 μm.

When in use, part of the radiation guided by the diffuser panel 264 exits the diffuser panel 264 while propagating along the diffuser panel 264, e.g. due to diffusion by microparticles embedded into the diffuser panel 264. Since the diffuser panel 264 has negligible thickness along a direction H orthogonal to the panel major surfaces compared to edge-illumination direction K, the panel 264 is basically transparent to radiation propagating along direction H but works as diffuser for radiation propagating along direction K.

Moreover, assuming that the diffuser panel 264 is delimited on the upper and the lower side by a surface $S_1$, $S_2$, respectively, at least one out of such surfaces $S_1$, $S_2$ can be surface-finished to introduce roughness. Such roughness contributes in the diffusion by the diffuser panel 264 of the light generated by the second light-emitting device 266, the diffusion process being virtually homogeneous along any direction parallel to direction K. In a way known by itself, roughness can be designed so that great part of the light generated by the second light-emitting device 266 is scattered mainly through one between surfaces $S_1$, $S_2$, and in particular towards downstream direction 32. In the case in which at least one between surfaces $S_1$, $S_2$ features roughness, no microparticles may need to be dispersed in the diffuser panel 264. In any case, roughness may be present on both the surface $S_1$, $S_2$ of the diffuser panel 264.

In a different configuration, the diffused-light source 260 is not side-lit but comprises a second light-emitting device shaped as a substantially transparent and emitting layer obtained by means of an OLED film. Similarly to the side-lit panel source, the OLED film is also capable to generate diffused light with controlled color and intensity, being at the same time transparent to the light that crosses it along a direction perpendicular to its surface.

The diffused-light source 260 allows for changing the color and intensity of the diffused-light component 242, basically without changing the color and intensity of the transmitted component. For this aim, it is possible to act on the color and intensity of the light emitted by the second light-emitting device 266.

For example, aiming at reproducing the characteristics of late afternoon light, an incident light with low CCT, e.g. 2500 K, can be used; in this way, the color of the transmitted component 238 is similar to the color of sunlight before sunset when using a diffuser panel 250. Without the diffused-light source 260, the color of the component scattered by just the diffuser panel 250 would be remarkably different from the color of the corresponding natural component. As a matter of fact, what happens in nature is that the sky above the observer is lit by white sunlight, i.e. by sunlight that has not crossed the atmosphere yet, with CCT approximately equal to 6000 K, a much higher value than the lamp's CCT. As a consequence, the CCT of light scattered by the sky above the observer in the late afternoon hours is significantly higher than the CCT of light scattered by the diffuser panel 250, in the case in which the incident light has low CCT. However, if diffused-light source 260 is used, and particularly if the diffuser panel 250 is used together with the second light-emitting device 266, and this latter is made of an ensemble of red, green, blue LED emitters ("RGB"), it is possible to adjust the luminous flux of each of such three elements: this allows panel 264 to generate a scattered component with color and intensity such that the overall component that exits the diffused-light source 260 has the desired color. In other words, the diffused-light source 260 allows to uncouple the color of the transmitted component from the color of the scattered component. Moreover, if a lamp with adjustable CCT is used as source 260, the variation of natural lighting at different times of the day can be reproduced.

Panels 250 and 260 need not to be physically separated as depicted for ease of understanding. This applies also for the components drawn as being separated in other figures.

When the source 260 is used in the absence of the diffuser panel 250, the diffused-light generator 10 emits diffused light with higher CCT than the CCT of direct light 236 as long as source 260 is appropriately designed. Such diffused-light generator is, at least partially, light-transparent. In this context, the term "transparency" with reference to an optical element is used for indicating the so called "see through" property, i.e. the property of an optical element of transmitting image-forming light, i.e. of transmitting light rays which crosses the optical element without experiencing angular deviation or being deviated just by a small angle, e.g. by an angle smaller than 2.5°. In this context, therefore, the term "transmitted light" refers to the portion of the impinging light crossing the optical sample without experiencing relevant angular deviation, e.g. without experiencing angular deviation larger than 2.5°. Note that the present definition does not rely upon the concept of "regular transmittance", which in contrast accounts only for the light which is transmitted without any angular deviation.

More precisely, given a standard illuminant (e.g. a D65 source) which emits light uniformly from a circular emitting surface $S_s$, and given a standard observer $O_s$ who sees the emitting surface $S_s$ under a conical HWHM solid angle of 2.5°, advantageously 1.5°, most advantageously 0.5°, the diffused-light generator 10 is here defined as partially transparent if a luminance of the D65 emitting surface $S_s$ as perceived by the standard observer $O_s$ when the diffused-light generator 10 is interposed between the observer $O_s$ and the surface $S_s$ with its major surface oriented orthogonally to the line connecting the eye of the observer with the barycenter the surface $S_s$, is at least 50%, advantageously at least 70%, more advantageously at least 85% of a luminance perceived by the observer $O_s$ when the diffused-light generator 10 is not interposed between the observer $O_s$ and the surface $S_s$.

Summarizing, the diffused-light generator 10 may be embodied as a diffuser panel 250 and/or a diffused-light source 260, i.e. a light source that emits diffused light from a thin panel. In the case of using just the diffused-light source 260, the diffused-light source 260 does not operate for correcting the color of the diffused light as produced by the diffuser panel 250, but for generating the entire diffused component 242—with or without adjustability of the diffused light CCT. Here, the advantage is that of having one, instead of two, diffusing elements, and therefore less losses. A first disadvantage may stem from the difficulty of obtaining sufficiently large luminance from source 260, due to the limit of side illumination in case of FIG. 23, for example. Moreover, the fact that the diffusing mechanism in the diffuser panel is identical to the mechanism taking place in the real sky might result in a luminance spatial and angular distribution of the diffuser 250 being more similar to the natural than compared with the source 260.

In accordance with many of the above described embodiments, the artificial illumination device further comprises an absorber made of light-absorbing material arranged so that the first emitting surface 28 shows a total reflectance factor $\eta_r$<0.4.

Examples for such absorbers were shown with reference signs 58, 72, 200 and 224. The absorber may be made of light-absorbing material. This light-absorbing material may, although not mentioned every time in the above description, have an absorption coefficient for visible light greater than 95%, although 80% may also suffice. The light-absorbing material may be positioned downstream of the direct-light source's 12 first light-emitting device, i.e. 14, 46, 60, where the term "downstream" is then defined to follow the light propagation direction including light-bending at reflectors. On the other hand, the light-absorbing material is positioned upstream of the first emitting surface 28 as well as upstream the diffused-light generator 10 and the low-angle white-light diffuser 230 (if present) if they are positioned upstream of the first emitting surface 28. To be more precise, thus positioned, the light-absorbing material is configured to substantially absorb light rays which cross the direct-light source's first emitting surface 28 in an upstream direction and which in the absence of the absorber would not be directed toward the direct-light source's first light-emitting device. In many of the above described embodiments, for example, the artificial illumination device comprises a light collimator being an optical element positioned downstream the first light-emitting device of the direct-light source and configured to reduce the divergence of the primary light generated by the first light-emitting device. In the above embodiments, the light collimator was embodied, for example, as a lens 14, 48, 64, 13 (such as dome lens, Fresnel lens, or microlens, but in general the light collimator may be any refractive, reflective (including total internal reflective), diffractive optical component or any system comprising a plurality of such optical components. In that case, the absorber has its light-absorbing material positioned such that the absorber substantially absorbs light rays which cross the direct-light sources first emitting surface 28 in the upstream/reverse direction and are redirected by the light collimator toward somewhere else than the first emitting device of the direct-light source, where the term "substantially" may mean that at least 70%, advantageously 90%, or more advantageously 95% of such light rays may be absorbed. In this circumstance, the absorber substantially contributes in reducing the amount of stray light in the direct light 236, i.e. the amount of light generated by the direct-light source 12 out of the narrow peak 30. In fact, it is noticed that such an embodiment guarantees for the direct-light source 12 a black appearance when off for observation directions departing from direction 32 of an angle larger than the angle width of the narrow peak 30. In other terms, the embodiment ensures that, under external illumination and when the direct-light source 12 is off, the first emitting surface 28 may re-emit light only from those directions under which the bright spot is seen when the direct-light source 12 is on. Moreover, such an embodiment ensures that light rays originated by the emitter which are scattered or reflected by the collimator or by other components of the device 20 positioned downstream the emitter and which in the absence of the absorber would not be ascribable to the collimated light beam exiting the first emitting surface 28 are absorbed.

Figure 24A:
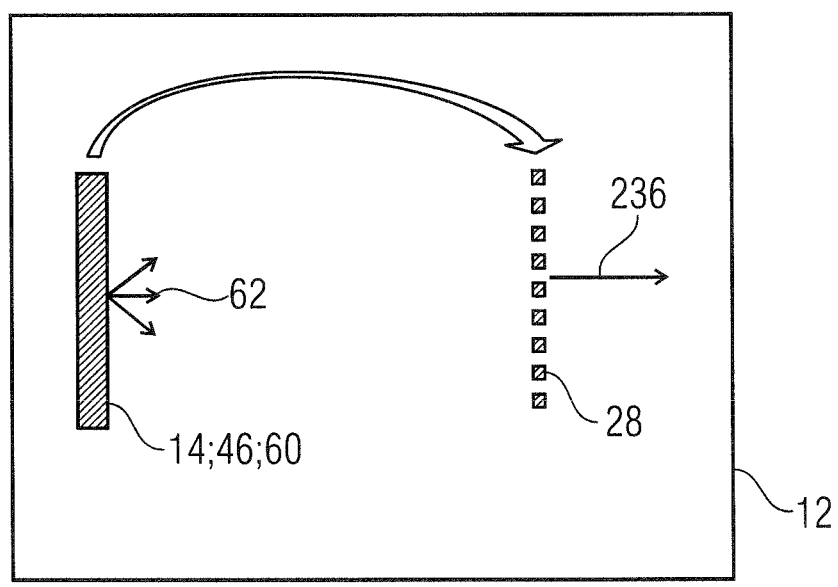

Summarizing the above, specific embodiments have been described as well as the thoughts underlying the same. In particular, FIGS. 5 to 8 and 11a to 18 concentrated on different exemplary implementations for the direct-light source 12. These embodiments have in common that the direct-light source 12 comprises, as schematically shown in FIG. 24a, a first light-emitting device which is embodied in element 14, 46, 60, respectively. This first light emitting device is configured to emit, i.e. actively generate, primary light 62. It might be an LED, an incandescent lamp, a fluorescent lamp, or a metal halide lamp or some other light source. Further, the direct-light source 12 comprises a first emitting surface 28 positioned downstream the light-emitting device. As far as the direct-light source's 12 ability to generate direct light 236 at the first emitting surface 28 is concerned, the diffused-light generator's 10 influence was left off by specifying the direct light 236 at the first emitting surface 28 in a state where the diffused-light generator 10 is removed. The removal has effects at least if the generator 10 is positioned upstream the first emitting surface 28. In the other case the diffused-light generator 10 does not influence the direct light generation from the primary light 62 anyway. In particular, as described above, the direct-light source 12 produces from the primary light 62 the direct light 236 such that the latter exits the first emitting surface 28 with a luminance profile which is uniform across the first emitting surface 28 and has a narrow peak 30 in the angular distribution around the direct-light direction 32.

Although in the above embodiments, the diffused-light generator 10 was at least partially light-transparent and positioned downstream of the first light-emitting device, alternative embodiments are in principle imaginable where this is different such as by placing the diffused-light generator upstream, or side by side to, the array of light-emitting devices. Thus, in that case, the diffused-light generator would generate the diffuse light in areal manner upstream to, or at focal distance of, the collimators. However, the collimators do have no effect, or do not change, the diffuseness. In fact, a diffuse light does not have a preferential direction or a preferential spatial distribution of direction which the collimator, by means e.g. of refraction of reflection, is able to modify. Therefore, the relative position of the source of diffuse light with respect to the collimator in the upstream and/or downstream direction is irrelevant for the scope of the present invention. Further, although not mentioned before, in each light-emitting-device/concentrator pair, the collimators' 64 aperture may be greater than 300 cm². The array size of the array of pairs may be greater than 4×4. Even further, although 2-dimensional array arrangements of the emitter/collimator pairs were shown in the above embodiments, other arrangements are imaginable as well such as one dimensional array arrangements. Further, in order to suppress the ambient reflections, a downstream-facing outer surface of the pairs' collimators may comprise an anti-reflection coating. Even further, as shown above, the first emitting surface may be upstream relative to the second first emitting surface and the artificial illumination device may further comprise an angularly selective filter configured to absorb light divergent relative to the direct-light direction by more than a predetermined threshold, for example to absorb the light which departs from the direct light direction 32 by more than 2°, advantageously more than 1°) and positioned downstream the first and upstream the second emitting surface. As to the collimators of the emitter/collimator pairs, it should be noted that same do not have to be implemented by a single component, respectively. Rather they may each be composed of a combination of two lenses, serially connected to each other, for example, or a combination of a concave mirror and lens. The combination, thus formed, may be described as an "effective collimator" having, for example, an effective focal length. The optical axis of the emitter/collimator pairs need not to coincide with the direct-light direction, or differently speaking, the optical axis may be bend somewhere. For example, ray bending elements such as mirrors, phase plates, wedge-shaped prisms or the like may result in bending the optical path between the first light-emitting device and the collimator in each pair, within the collimator of each pair or at the downstream side of the collimators. When using freeform lens or reflective CPC as described above, the distance between collimator and light-emitting device in each emitter/collimator pair may differ from a focal length. Moreover, due to optical path bending as described, the geometric arrangement of light-emitting device and collimator may differ from a serial arrangement along the direct-light direction.

Figure 22:
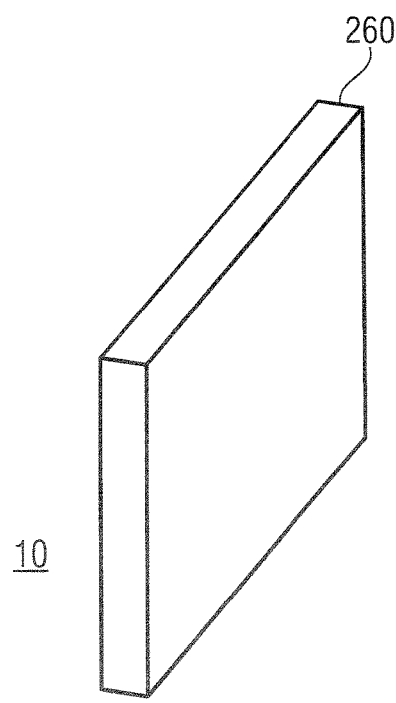
FIG. 22 schematically shows a diffused-light source for implementing a diffused-light generator.
Figure 24B:
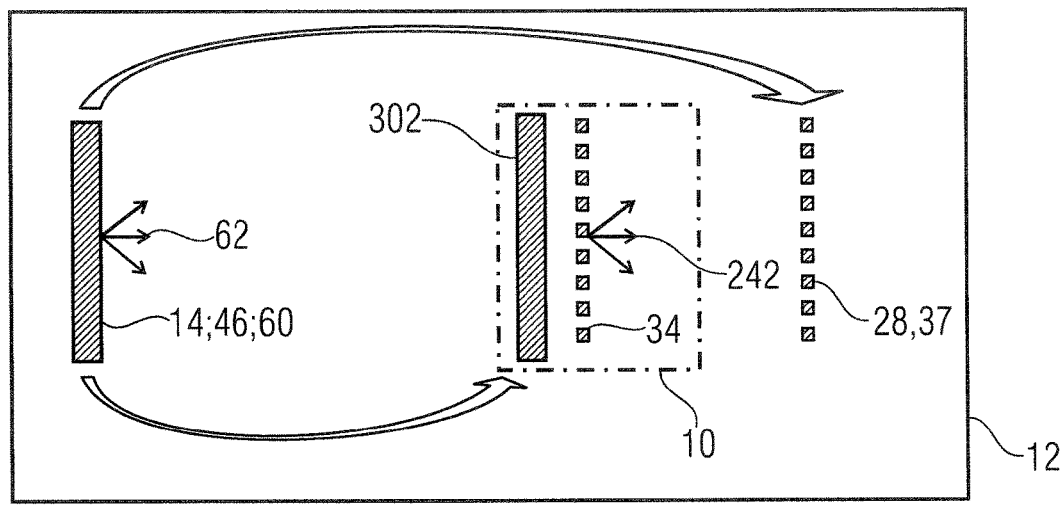
Figure 24C:
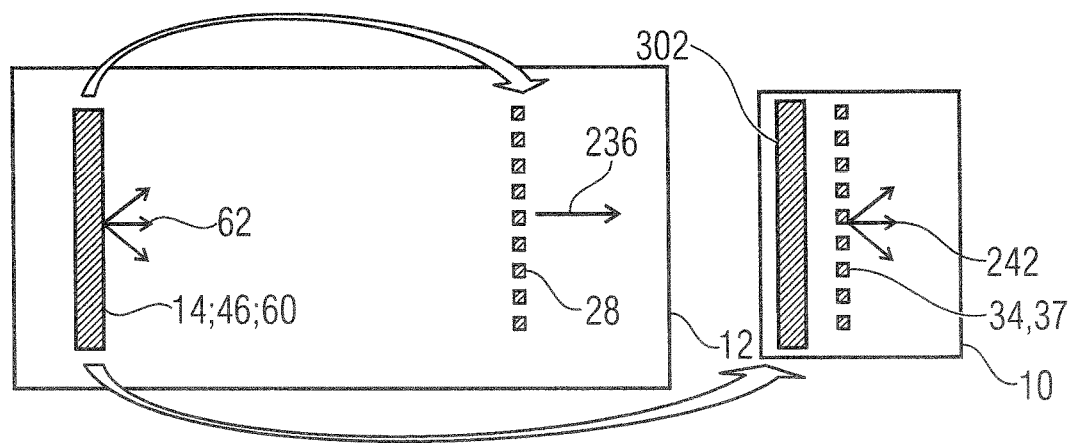

The above figures FIGS. 17 to 23 concentrated on possible implementations for the diffused-light generator 10 and its relative position with respect to the direct-light source 12 and its individual components. The CCT of different light components occurring in the artificial illumination device was also considered. In general, the diffused-light generator 10, as shown in FIGS. 24b and 24c, is positioned downstream of the first light-emitting device of the direct-light source 12 and is at least partially light-transparent. For example, generator lets, for example, more than 50% of the primary light 62, the direct light 236 or any intermediate light evolving from the primary light and resulting in the direct light 236, which hits the generator, pass without being substantially deviated, where substantially means that deviation might occur over small angles only, e.g. over HWHM angles smaller than 2.5°. The hatched box 302 in FIGS. 24b and 24c indicates that the diffused-light generator 10 may have its own second emitting device. One possible instantiation thereof is shown in FIG. 23 at 266. Another is formed by using an OLED as the diffused-light source 260. Alternatively or additionally, the light-diffuse generator 10 may be of passive nature which co-uses the first light-emitting device of the direct-light source. In other words, it may have a diffuser. Reference is made to FIGS. 20 to 22 for details regarding the possible alternatives. In case of the diffuser, same is positioned so as to be lit by the direct-light, the primary light or light corresponding to an intermediate version of the primary light on the way to its conversion into the direct light. Irrespective of the diffused-light generator 10 being of the passive and/or active type, same may be positioned upstream or downstream relative to the first emitting surface 28 of the direct-light source 12 and is configured to cause diffused light 242 at the second emitting surface 34 of the diffused-light generator 10. Again, the diffused-light generator 10 may or may not have its own light source 302. If the diffused-light generator 10 is positioned downstream relative to the first emitting surface 28 of the direct-light source 12, then the direct light 236 is available and its requirements imposed onto the direct-light source 12 are measurable without removing the diffused-light generator 10.

Figure 24D:
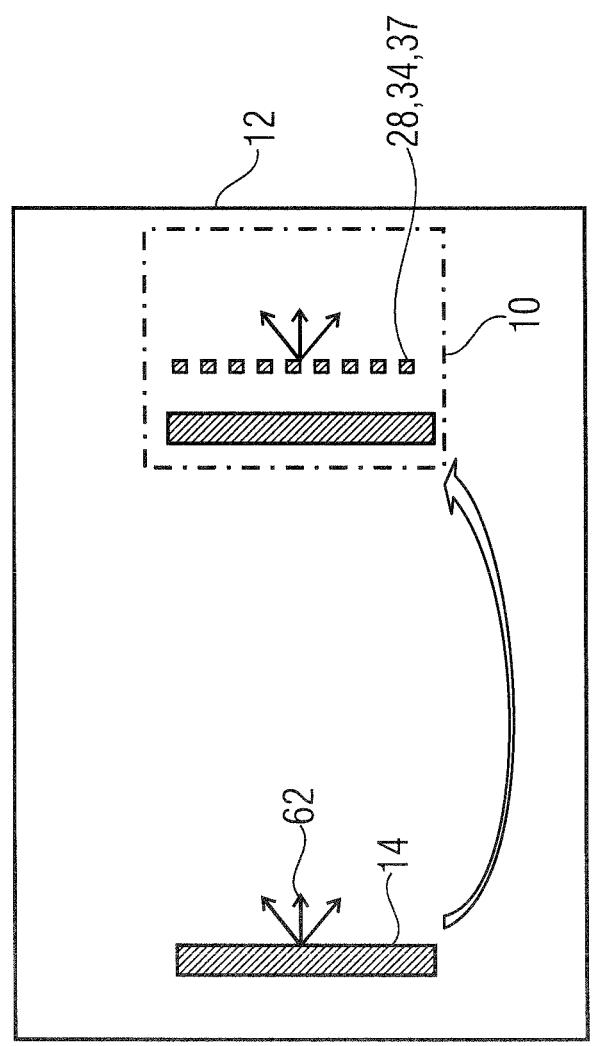

As also became clear from the above embodiments, one of the emitting surfaces 28 and 34 is positioned downstream with respect to the other. In the case of FIG. 24*b*, for example, the first emitting surface 28 of the direct-light source 12 is positioned downstream relative to the second emitting surface 34 of diffused-light generator 10 and forms, accordingly, the outer emitting surface 37 of the artificial illumination device, while in FIG. 24*c* it is the second emitting surface 34 of the diffused-light generator 10 which is positioned more downstream and forms the outer emitting surface 37. FIG. 24*d* shows, for the sake of completeness, a further alternative according to which the direct-light source's 12 and the diffused-light generator's 10 emitting surfaces 28 and 34 coincide so as to commonly form the outer emitting surface 37 of the artificial illumination device. Imagine, for example, that the particles of the diffused-light generator 10 in accordance with the embodiment of FIG. 20 would be interspersed within the material of a Fresnel lens 64 of any of the respective embodiments having the Fresnel lens. In that case, the lens 64 of the direct-light source 12 would concurrently act as the diffused-light generator 10. To be even more precise, the particles 254 interspersed within the Fresnel lens' material would form the diffused-light generator 10 and would have to be (fictively) removed in order to determine the luminance characteristic of the direct light produced by the direct-light source 12. In practice, such a Fresnel lens having particles 254 interspersed therewith could be replaced by an identical Fresnel lens without these particles 254. Accordingly, what is visible from FIGS. 24*b* and 24*d* is that wherever the diffused-light generator 10 is positioned upstream the first emitting surface 28 of the direct-light source 12, the direct light 236 obeying the luminance constraints explained above is not directly accessible in the situation where the artificial illumination device is built together. Rather, as just explained, the diffused-light generator 10 would have to be removed.

FIGS. 24*e* and 24*f* concentrate on the outer light 239 which is formed at the outer emitting surface 37 by the cooperation of the direct-light source 12 and the diffused-light generator 10 for the cases of FIGS. 24*b* and 24*c*. In FIG. 24*e*, where the diffused-light generator 10 is positioned upstream relative to the first emitting surface 28 of the direct-light source 12, thereby forming the outer emitting surface 37, the direct light 236 of the direct-light source 12 obeying the just-mentioned constraints may not directly occur at the first emitting surface 28. Rather, a transmitted variant thereof, having been passed by the diffused-light generator 10, occurs at the first emitting surface 28 wherein the transmitted variant may differ from the direct light as a consequence of the fact that the diffused-light generator 10 may be only partially transparent to the impinging light, e.g. to the primary light 62. For example, in the case where the diffused-light generator 10 is embodied as a diffused-light source 260 (see FIG. 23) based on a side-lit diffuser panel 264 featured by high regular transmittance along the H direction, the transmitted variant may be virtually identical to the direct light but being slightly weaker (for example, 10% weaker), mainly because of the reflection losses at the diffuser air-panel interfaces. In the case where diffused-light generator 10 is embodied as a diffused-light source 260 embodied as an OLED film, the transmitted variant may be substantially weaker than the direct light (for example, 40% weaker). In the case where diffused-light generator 10 is embodied as a passive diffuser panel 250 which scatters the impinging light in the Rayleigh regime, the transmitted variant may differ from the direct light just for the lower CCT, as explained below with respect to FIG. 19*a*. Finally, in the case where diffused-light generator 10 causes a slight deviation (i.e. deviation smaller than 2.5°) in the impinging light rays which pass through the generator, i.e. if it incorporates the function of the low-angle white-light diffuser 230, the transmitted variant may differ from the direct light also in the angular spectrum, which might be the convolution of the direct light angular spectrum with the low-angle white-light diffuser angular impulse-response function.

In the case of FIG. 24*e*, the outer light 239 at the outer emitting surface 37 is the result of the just mentioned transmitted variant of the direct light and the diffused light 242 emitted by the diffused-light generator 10. In an angular sense, the outer light 239 comprises a first light component 241 which propagates along directions contained within the narrow peak 30 such as within the aforementioned $\vartheta_{HWHM}$, and a second light component 243 which propagates along directions based apart from the narrow peak 30, with a first light component 241 having a CCT which is lower than the CCT of the second light component 243 such as into directions greater than $3\vartheta_{HWHM}$.

A comparison of FIG. 24*d* and FIG. 24*b* makes it clear that both cases merely differ in that the diffused light generated by the diffused-light generator 10 in the case of FIG. 24*d* is not directly accessible or separable from the direct light caused by the direct-light source 12, as the transmitted variant of the direct light and the diffused light both irreversibly fuse together to form the outer light 239 at the resulting outer emitting surface 37.

FIG. 24*f* depicts the situation of the outer light as resulting from the case of FIG. 24*c*. As the diffused-light generator 10 is positioned downstream the surface 28, the direct light 236 is accessible and its transmitted variant having $CCT_{trans}$ as shown in FIG. 19*a* contributes to the outer light 239 at the light emitting surface 37 formed by the second emitting surface 34 of the diffused-light generator 10. A composition of the outer light 239 in the angular sense is as shown in FIG. 24*e*.

Figure 19B:
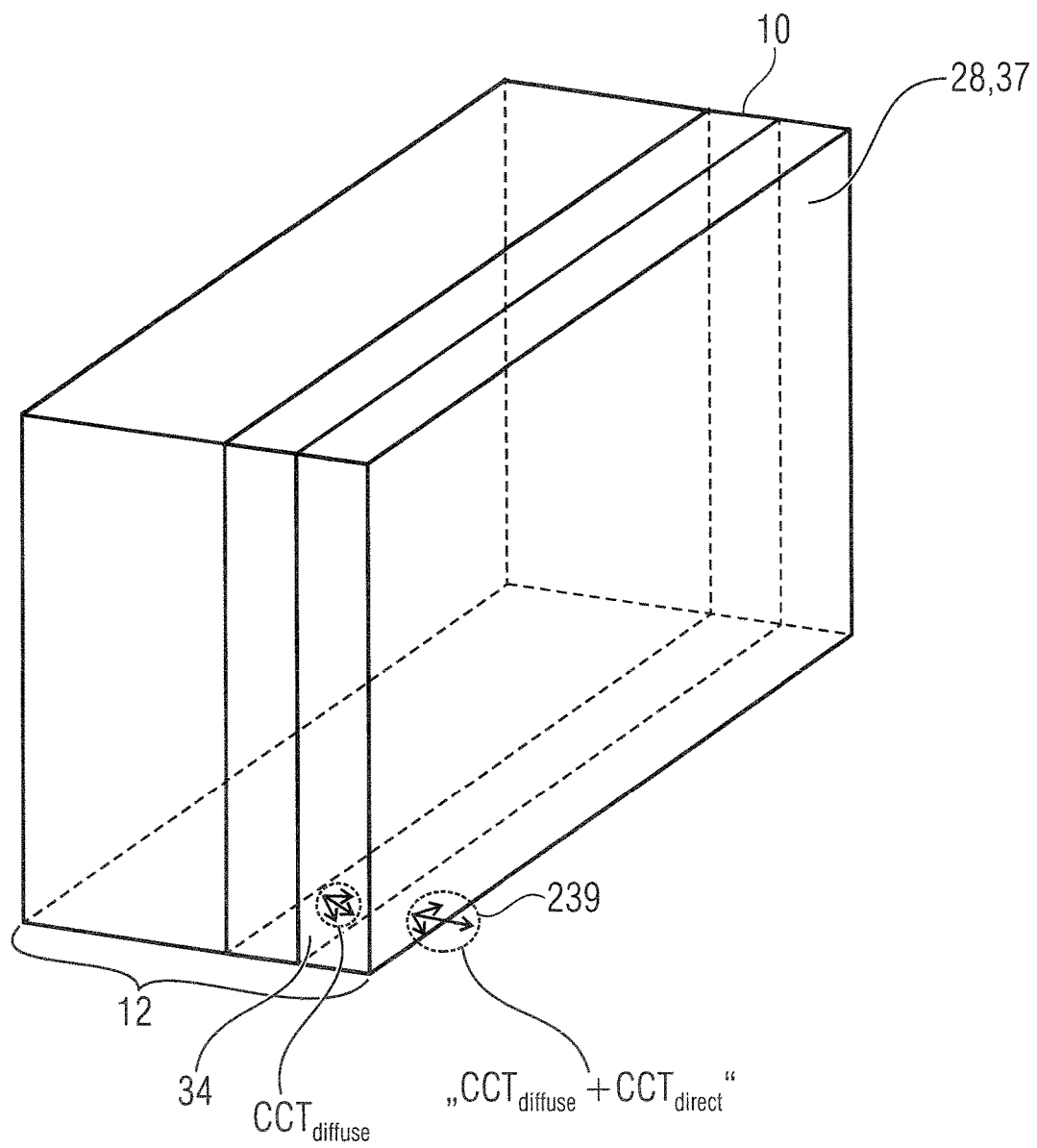
Figure 19C:
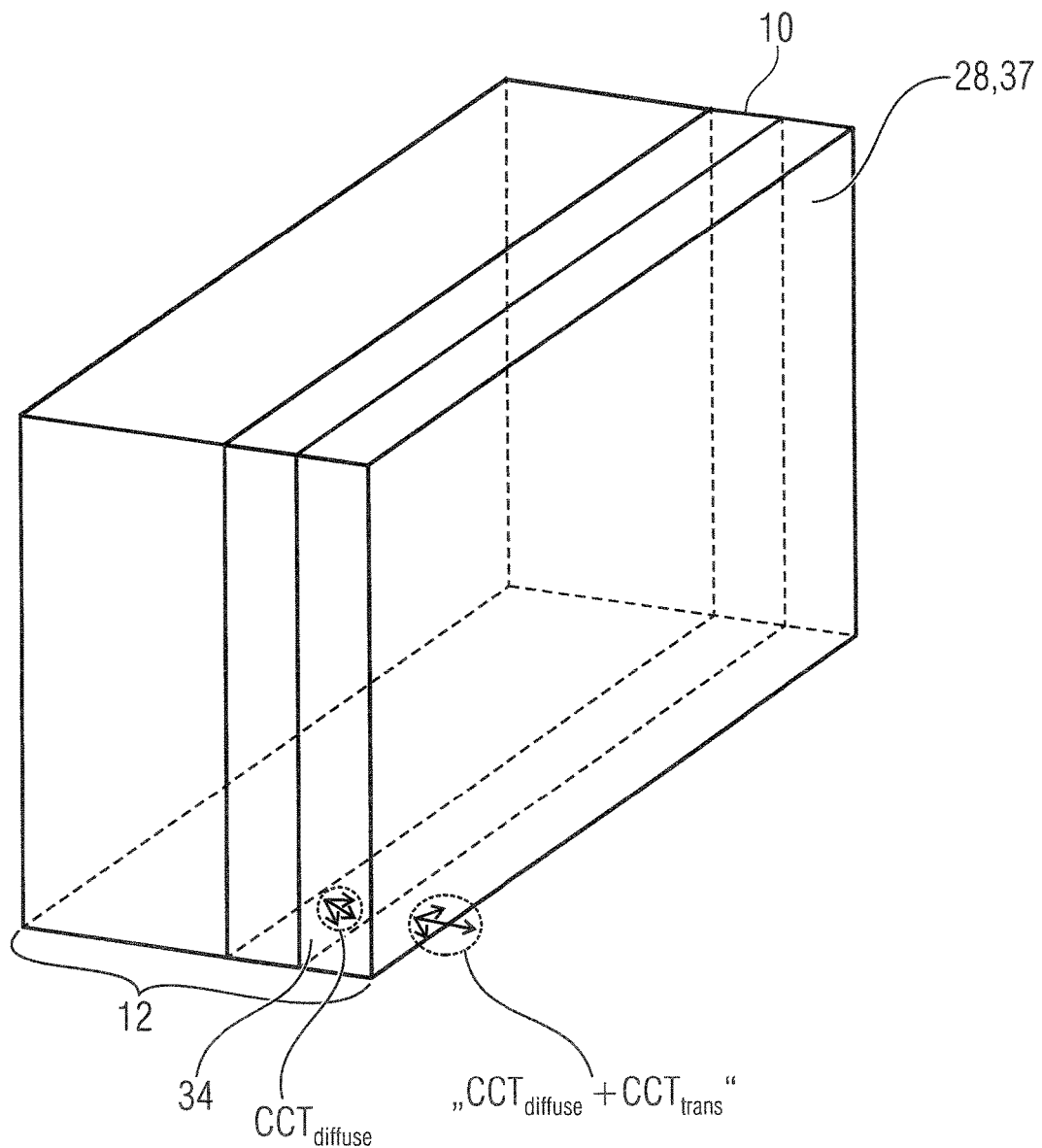

With regard to FIG. 24*e*, FIGS. 19*b* and 19*c* are to show two alternatives of positioning a diffused-light generator upstream relative to the first emitting surface 28 of the direct-light source 12. FIG. 19*b* illustrates the case of having a diffused-light generator 10 of the active type which is exemplarily almost completely transparent for the light impinging onto the input surface 33, e.g. for the primary light 62, so that the direct light would substantially directly contribute to the outer light 239 at the emitting surfaces 28 and 37, respectively. Nevertheless, however, it should be noted that the first angular light component 241 differs from the direct light in that the first angular light component 241 also comprises a contribution of the diffused light of the diffused-light generator 10. The latter contribution is, however, very small due to the small angular fragment covered by the narrow peak 30, and accordingly, all CCT relations relating the CCT of direct light 236 or CCT of transmitted light to the CTT of the diffused light 242 mentioned above shall insofar also apply to the first light component.

Moreover, the first angular light component 241 has a narrow angular support, being formed only by light rays propagating along directions within the narrow peak 30 (i.e. directions supporting the peak in the luminance profile). In contrast, the direct light 236 might feature the presence of background light at any angle.

FIG. 19*c* shows the case of the diffused-light generator 10 comprising a diffuser of wavelength selective diffusing efficiency as outlined above with, for example, a blur filter being placed between generator 10 and the outer emitting-surface formed by the emitting surface 28. In this case, merely the just mentioned transmitted variant of the direct light results at surfaces 28 and 37, respectively, and contributes to the outer light. Again, the angular light component 241 of the outer light 239 within the narrow peak 30 differs from the just mentioned transmitted variant of the direct light in that the light component 241 also comprises the respective angular fragment of the diffused light as generated by the diffused-light generator 10.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An artificial illumination device for generating natural light similar to that from the sun and the sky with making an observer experience a visual infinite depth perception of a sky and sun image when an observer directly looks at said artificial illumination device, the artificial illumination device comprising:
    a direct-light source comprising:
        a first emitting surface configured to produce, from a primary light, a direct light that exits the first emitting surface into a direct-light direction at low divergence,
        a plurality of pairs of: a first light-emitting device positioned upstream the first emitting surface and configured to emit the primary light and a collimator configured to collimate the primary light emitted by the first light-emitting device along the direct-light direction, and
        a micro-optics beam homogenizer layer positioned downstream the plurality of pairs of first light emitting device and collimator, wherein the micro-optics beam homogenizer comprises a 2-dimensional tandem lens array; and
    a diffused-light generator configured to cause diffused light at a second emitting surface,
    wherein one of the first emitting surface and the second emitting surface is positioned downstream with respect to the other and forms an outer emitting surface of the artificial illumination device or both the first emitting surface and the second emitting surface coincide to form the outer emitting surface of the artificial illumination device,
    wherein the artificial illumination device is configured such that the direct-light source and the diffused-light generator co-operate to form outer light at the outer emitting surface which comprises a first light component which propagates within a low divergence cone along the direct light direction and a second light component which propagates along directions outside the low divergence cone wherein the first light component comprises a correlated color temperature which is lower than a CCT of the second light component so that an observer sees, when looking towards the first emitting surface, a bright spot surrounded by a bluish background which mimics the sky, the bright spot comprising lower CCT, corresponding to the sun and moving, when the observer moves relatively to the first emitting surface as if the bright spot stemmed from an object positioned at infinity.

2. The artificial illumination device according to claim 1, wherein the tandem lens array comprises two identical microlens arrays located at a focal length's distance from each other.

3. The artificial illumination device according to claim 2, wherein a first microlens array of the two identical microlens arrays is configured to split the incident light into individual beamlets and the second microlens array of the two identical microlens arrays is configured to redirect the beamlets so as to achieve a uniform flat-top illumination in a far field superposition plane.

4. The artificial illumination device according to claim 1, wherein the direct-light source further comprises a low angle white light diffuser configured to produce a convolution of the angular spectrum with the filter impulse-response function.

5. The artificial illumination device according to claim 1, further comprising an absorber upstream the first emitting surface and made of light-absorbing material arranged so that the first emitting surface comprises a total reflectance factor $\eta_r \leq 0.4$.

6. The artificial illumination device according to claim 1, further comprising an absorber made of light-absorbing material positioned downstream the first light-emitting device and upstream the first emitting surface and configured to substantially absorb light rays which cross the first emitting surface in an upstream direction and which, in the absence of the absorber would not be directed toward the first light-emitting device.

7. The artificial illumination device according to claim 1, wherein the diffused-light generator is configured so that the bluish background is uniform with respect to spatial coordinates so as to cause a difficulty for the observer to estimate a distance between the observer and the second emitting surface and the direct-light source is of low divergence such that the eyes of the observer are forced to converge at infinity and the plane from which the diffused light is perceived to be originated is dragged to infinity as well, and the bluish background supports the observer' eyes converging at infinity because of an aerial perspective visual cue.

8. The artificial illumination device according to claim 1, wherein the diffused-light generator is positioned downstream the first emitting surface.

9. The artificial illumination device according to claim 1, wherein the direct-light source is configured to produce the direct light such that the direct light exits the first emitting surface with a luminance profile that comprises a narrow peak in the angular distribution around the direct-light direction the narrow peak being subtended by a solid angle smaller than 0.2 sr.

10. The artificial illumination device according to claim 1, wherein the plurality of pairs of first light emitting device and collimator is positioned such that the collimators abut each other so that the collimators form a joint surface.

11. The artificial illumination device according to claim 10, wherein, for each pair of first light emitting device and collimator, a collimator's aperture is greater than 300 cm$^2$.

12. The artificial illumination device according to claim 1, further comprising a coffered ceiling structure positioned downstream the outer emitting surface, wherein the coffered ceiling structure comprises a first periodicity being an integer multiple or unit fraction of a second periodicity at which the pairs of the first light emitting device and collimator are arranged along the outer emitting surface.

13. The artificial illumination device according to claim 12, wherein the direct light direction is oblique to a normal of the outer emitting surface.

14. The artificial illumination device according to claim 12, wherein the direct light direction is oblique with respect to more than 90% of the outer surface of the coffered ceiling structure.

15. The artificial illumination device according to claim 1, further comprising a freeform concentrator or freeform lens configured to flatten an illuminance distribution of the primary light onto the collimator.

16. The artificial illumination device according to claim 15, wherein the freeform lens is positioned between the first light-emitting device and the collimator.

17. The artificial illumination device according to claim 1, wherein the first light-emitting device defines a circular aperture.

18. The artificial illumination device according to claim 1, wherein the direct-light source comprises an angularly selective filter configured to absorb light divergent relative to the direct-light direction by more than a predetermined threshold.

19. The artificial illumination device according to claim 1, wherein the direct light direction is equal for the plurality of the artificial illumination devices.

* * * * *